(12) United States Patent
Sakaue et al.

(10) Patent No.: US 8,259,193 B2
(45) Date of Patent: Sep. 4, 2012

(54) IMAGE FILE REPRODUCTION APPARATUS AND IMAGE DATA REPRODUCTION APPARATUS

(75) Inventors: Shigeo Sakaue, Osaka (JP); Toru Takashima, Osaka (JP); Hisakazu Kobayashi, Hyogo (JP); Koji Amemiya, Osaka (JP); Yoshimasa Okabe, Osaka (JP); Hironori Katsuura, Osaka (JP); Kenji Maeda, Osaka (JP); Satoshi Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 878 days.

(21) Appl. No.: 12/274,716

(22) Filed: Nov. 20, 2008

(65) Prior Publication Data

US 2009/0154833 A1    Jun. 18, 2009

(30) Foreign Application Priority Data

Nov. 21, 2007  (JP) ................................. 2007-301519
Nov. 21, 2007  (JP) ................................. 2007-301520
Mar. 19, 2008  (JP) ................................. 2008-071023

(51) Int. Cl.
  *H04N 5/76*   (2006.01)
(52) U.S. Cl. .................................. 348/231.6; 348/231.2
(58) Field of Classification Search ............. 348/231.99, 348/231.2, 231.3, 231.6, 333.12, 333.13, 348/333.05, 220.1
See application file for complete search history.

(56) References Cited

U.S. PATENT DOCUMENTS

| | | | | |
|---|---|---|---|---|
| 6,147,703 A | * | 11/2000 | Miller et al. | ............... 348/220.1 |
| 6,233,015 B1 | * | 5/2001 | Miller et al. | ............ 348/333.05 |
| 2003/0193581 A1 | | 10/2003 | Miyata | |
| 2006/0050321 A1 | | 3/2006 | Takahashi | |

FOREIGN PATENT DOCUMENTS

| | | |
|---|---|---|
| JP | 2002-259942 | 9/2002 |
| JP | 2004-363829 | 12/2004 |
| JP | 2006-5952 | 1/2006 |
| JP | 2006-80652 | 3/2006 |
| WO | 02/41629 | 5/2002 |

OTHER PUBLICATIONS

International Search Report issued Mar. 3, 2009 in the International (PCT) Application No. PCT/JP2008/003437.

* cited by examiner

*Primary Examiner* — Tuan Ho
(74) *Attorney, Agent, or Firm* — Wenderoth, Lind & Ponack, L.L.P.

(57) ABSTRACT

An image file reproduction apparatus includes a reproduction unit that reads an image file from a storage medium storing image files capable of storing plural pieces of image data and reproduces the read image file, a first operation unit that receives a command for selecting any one of image files stored in the storage medium, and a second operation unit that receives a command for selecting any one of image data stored in the image file selected by the command received by the first operation unit. The reproduction unit controls selection of image data to be reproduced in a different way according to the operation made on the respective operation units.

4 Claims, 58 Drawing Sheets

Fig. 4

| START ADDRESS OF SUB-IMAGE DATA | SUB-IMAGE IDENTIFIRE | SUB-IMAGE DATA INFORMATION |
|---|---|---|
| 0X000000 | 0 | 1 |
| 0X000010 | 1 | 2 |
| 0X000100 | 1 | 3 |
| ... | ... | ... |

| | |
|---|---|
| | 100-0001-0 |
| | 100-0001-1 |
| FILE1 | 100-0001-2 |
| | 100-0001-3 |
| | 100-0002-0 |
| | 100-0002-1 |
| | 100-0002-2 |
| FILE2 | 100-0002-3 |
| | 100-0002-4 |
| | 100-0002-5 |
| | 101-0001-0 |
| | 101-0001-1 |
| FILE3 | 101-0001-2 |
| | 101-0001-3 |

— # IMAGE FILE REPRODUCTION APPARATUS AND IMAGE DATA REPRODUCTION APPARATUS

BACKGROUND ART

1. Field of the Invention

The present invention relates to an apparatus which processes image files capable of storing plural pieces of image data and, more particularly to an apparatus which reproduces image data stored in such an image file.

2. Related Art

JP-A-2006-005952 teaches a digital still camera (hereinafter, referred to as "a digital camera") which creates image files storing image data for display use (hereinafter, referred to as "display-image data") other than thumbnails.

The digital camera creates preview image data and thumbnail image data (for example, 160 horizontal dots×120 vertical dots) from captured image data (for example, 1920 horizontal dots×1440 vertical dots). Such preview image data has a pixel count matching the pixel count of the LCD monitor of the digital camera (for example, 320 horizontal dots×240 vertical dots). Thumbnail image data is image data for use in displaying a thumbnail on the LCD monitor of the digital camera. The digital camera manages the captured image data, preview image data and thumbnail image data within a single image file.

This enables the digital camera to instantly switch between a preview image displayed on the LCD and thumbnail images displayed on the LCD.

An advantage of storing display-image data other than the thumbnail image data in the image file is that either image can be displayed instantly. A disadvantage, however, is that because multiple versions of the same image data are contained in the image file, the processes for generating, reproducing, and transmitting the image files are complicated, and that because the size of the image file increases, the process including transmission takes longer. As a result, an image file processing device that is sufficiently easy to use cannot be provided by simply storing display-image data in the image file.

SUMMARY OF THE INVENTION

The present invention is directed to solving the foregoing problem and provides a user-friendly and easy-to-use image file reproducing apparatus, and so on, by improving an image file processing apparatus that reproduces image files storing display-image data which is not thumbnail image data.

An image file reproduction apparatus according to the invention includes: a reproduction unit that reads an image file from a storage medium storing at least one image file capable of storing plural pieces of image data and reproduces the read image file; a first operation unit that receives a command for selecting any one of image files stored in the storage medium; and a second operation unit that receives a command for selecting any one of image data stored in the image file stored in the storage medium.

If the first operation unit receives a command, the reproduction unit reproduces predetermined image data stored in the image file selected by the command. If the second operation unit receives a command, the reproduction unit reproduces image data selected by the command received by the second operation unit, among the image data stored in the image file selected by the command received by the first operation unit.

With this arrangement, there is no need for reproducing all pieces of image data stored in an image file when performing frame advance reproduction of image data, so that frame advance can be made while reproducing only some pieces of image data stored in the image file.

An image data reproduction apparatus according to the invention includes: a reproduction unit capable of reproducing image data stored in a first image file or a second image file, the first image file storing main image data and image data having a pixel count not equal to that of the main image data, the second image file storing main image data and image data having a pixel count equal to that of the main image data; a reception unit that receives a frame advance command for reproducing image data different from image data being currently reproduced; and a control unit that controls the reproduction unit. When the reception unit receives a frame advance command, the control unit controls the reproduction unit such that, when the reproduction unit is reproducing image data stored in the first image file, the reproduction unit reproduces image data stored in an image file different from the image file storing the image data being currently reproduced, and when the reproduction unit is reproducing image data stored in the second image file, the reproduction unit reproduces image data which is different from the image data being currently reproduced and is stored in the image file storing the image data being currently reproduced.

With this arrangement, the first image data reproduction apparatus according to the present invention, on receiving a command for frame advance reproduction of image data, can decide whether or not a new image file should be read, only by referring to information about the type of image file. This achieves speed-up of frame advance of image data.

In the first image data reproduction apparatus according to the present invention, the control unit may control the reproduction unit such that, when the reproduction unit is reproducing image data stored in the second image file and there is no image data to be reproduced next as instructed by the frame advance command in the image file storing the image data being currently reproduced, the reproduction unit reproduces image data stored in an image file different from the image file storing the image data being currently reproduced.

This achieves frame advance reproduction with excellent usability for users.

A second image data reproduction apparatus according to the present invention includes; a reproduction unit operable to reproduce image data stored in an image file capable of storing plural pieces of image data each having different feature; a reception unit that receives a command for changing image data to be reproduced by the reproduction unit, from the image data being currently reproduced, to image data stored in an image file different from the image file storing the image data being currently reproduced; a determination unit that determines whether or not the different image file stores image data having the same feature as that of the image data being currently reproduced, based on information stored in the header of the different image file; and a decision unit that decides image data to be reproduced by the reproduction unit from the image data stored in the different image file based on the result of the determination by the determination unit, when the reception unit receives a command.

With this arrangement, it is possible to perform frame advance reproduction of only image data having the same feature in plural pieces of image data stored in image files. This reproduction method would enable the user to select various types of reproduction methods.

According to other aspects of the present invention, there are further provided processing apparatuses as follows.

(1) A first image information output apparatus according to the present invention includes; a reading unit that reads all or some of image files stored in a storage medium capable of storing one or more image files which can store plural pieces of image data and include relationship information indicative of the relationship among the plural pieces of image data; a reproduction unit capable of reproducing all or some pieces of the image data stored in the image file read by the reading unit; an acquisition unit that acquires the relationship information contained in the image file storing the image data to be reproduced by the reproduction unit; and an output unit that outputs the relationship information acquired by the acquisition unit when the reproduction unit reproduces the image data.

This arrangement allows the user to recognize that there is an image relating to image data being currently displayed in the same image file.

(2) A second image information output apparatus according to the present invention includes; a reading unit that reads all or some of image files stored in a storage medium capable of storing at least image files which can store, as image data, main image data and one or more pieces of original image data having a pixel count equal to that of the main image data and storing relationship information indicative of the relationship between the main image data and the original image data; a reproduction unit capable of reproducing all or some pieces of the image data stored in the image files read by the reading unit; an acquisition unit which acquires the relationship information contained in the image files storing the image data to be reproduced by the reproduction unit; and an output unit that outputs the relationship information acquired by the acquisition unit when the reproduction unit reproduces image data.

This arrangement allows the user to recognize that there is an image relating to image data being currently displayed in the same image file.

(3) A first image data deletion apparatus according to the present invention includes; a storage medium that stores one or more image files each of which can store, as image data, main image data, one or more pieces of original image data and one or more pieces of display-image data; a deletion unit that deletes image data in the stored image files; and a reception unit that receives a command for selection of any of image data in the stored image files. The original image data is image data having a pixel count equal to that of the main image data. The display-image data is image data which is created based on the main image data or the original image data and has a pixel count smaller than that of the main image data or the original image data. The main image data and the one or more pieces of display-image data created based on the main image data are stored in the image files such that they are associated with each other. The original image data and the one or more pieces of display-image data created based on the original image data are stored in the image files such that they are associated with each other. The deletion unit, in response to a command for selection received by the reception unit, deletes the image data indicated by the received command for selection, and image data associated with the image data indicated by the received command.

This arrangement allows the user to delete image data without taking into consideration whether the image data being currently selected as image data to be deleted is main image data or original image data or display-image data.

(4) A second image data deletion apparatus according to the present invention is a camera to which a storage medium is loaded. The storage medium stores, as image data, one or more image files. Each image file can store main image data, one or more pieces of original image data and one or more pieces of display-image data. The second image data deletion apparatus includes: a deletion unit that deletes image data in the stored image files; and a reception unit that receives a command for selection of any of image data in the stored image files. The original image data is image data having a pixel count equal to that of the main image data. The display-image data is image data which is created based on the main image data or the original image data and has a pixel count smaller than that of the main image data or the original image data. The main image data and the one or more pieces of display-image data created based on the main image data are stored in the image files such that they are associated with each other. The original image data and the one or more pieces of display-image data created based on the original image data are stored in the image files such that they are associated with each other. The deletion unit, in response to a command for selection received by the reception unit, deletes the image data indicated by the received command for selection, and image data associated with the image data indicated by the received command.

This arrangement allows the user to delete image data without taking into consideration whether the image data being currently selected as image data to be deleted is main image data or original image data or display-image data.

(5) An image file restructuring apparatus according to the present invention includes; a storage unit capable of storing image files capable of storing, as image data, main image data, one or more pieces of original image data, and one or more pieces of display-image data in a predetermined order; a deletion unit capable of deleting all or some pieces of the image data stored in the image file stored in the storage unit; a selection unit that selects, as new image data, original image data stored at a position closest to the file head among the original image data stored in the image file, when deleting the main image data among the image data stored in the image file by the deletion unit; and a reconfiguring unit that stores the new main image data selected by the selection unit at the head position of the image file and reconfigures the image file. The main image data is image data stored at a position closest to the file head among the image data stored in the image file. The original image data is image data having a pixel count equal to that of the main image data. The display-image data has a pixel count smaller than that of the main image data or the original image data, and it is created based on the main image data or the original image data and is stored following the main image data or the original image data which is the basis thereof.

This arrangement prevents the display-image data from being selected as main image data, when main image data is deleted and display-image data created based on the deleted main image data is stored at a position closest to the file head. Therefore it prevents a situation in which clear print image can not be obtained due to smaller pixel counts, when main image data is printed with a printer.

According to the present invention, it is possible to easily reproduce image files storing plural pieces of image data other than thumbnail image data. Therefore, the present invention can provide an image file reproduction apparatus and the like, which has excellent usability for users.

BRIEF DESCRIPTION OF DRAWINGS

FIG. 4 is a schematic view of a management table.

FIG. 39 is a schematic view of an ID management table.

DETAIL DESCRIPTION OF PREFERRED EMBODIMENTS

Table of Contents

1. First Embodiment
1-1. Configuration
    1-1-1. Configuration of Digital Camera
    1-1-2. Configuration of the Back of Digital Camera
    1-1-3. Data Structure of Image File Format
        1-1-3-1. Structure of Entire File
        1-1-3-2. Main Header Part
            1-1-3-2-1. Structure of Entire Main Header Part
            1-1-3-2-2. Management Table
            1-1-3-2-3. Thumbnail Image Data
            1-1-3-2-4. Mode Information Storage Part
            1-1-3-2-5. Other Stored Information
        1-1-3-3. Main Image Data Part
        1-1-3-4. Sub-image Part
    1-1-4. Correspondence to the Present Invention 1-2. Recording Operation (Continuous Shooting Mode)
   1-2-1. Flow of Recording Operation
   1-2-2. Various Settings for Recording
      1-2-2-1. Setting of Aspect Ratio of Display-Image Data
      1-2-2-2. Setting of Image File Format
      1-2-2-3. Setting of Pixel Count of Display-Image Data
1-3. Reproduction Operation (Continuous Shooting Mode)
   1-3-1. Operation for Reproducing Image Data
   1-3-2. Flow of Reproduction Operation according to User's Operations on Cursor key
   1-3-3. Flow of Reproduction Operation according to User's Up/Down Operations on Cursor key
   1-3-4. Flow of Reproduction Operation according to User's Left/Right Operations on Cursor key
   1-3-5. Screen Display in Reproduction Operation
   1-3-6. Optional Functions in Reproduction Operation
      1-3-6-1. Rotation of Image Data
      1-3-6-2. Change of Aspect Ratio
      1-3-6-3. Setting of Slide Show
1-4. Editing
   1-4-1. Deletion of Image Data
      1-4-1-1. Control when Display-Image Data is Selected
      1-4-1-2. Control when Main Image Data or Original Image Data is Selected
   1-4-2. Splitting of Image Data
   1-4-3. Resizing
1-5. Printing
   1-5-1. Compatibility with PictBridge
   1-5-2. Processing when DPOF Setting is Made
1-6. Transmission
   1-6-1. Flow Chart of Transmission of Image Data
   1-6-2. Flow Chart of Transmission of Image File
   1-6-3. Automatic Selection of Image Data to be Transmitted
   1-6-4. Transmission of Thumbnails with PictBridge
2. Second Embodiment
2-1. Recording Operation (Multi aspect Mode)
2-2. Reproduction Operation (Multi aspect Mode)
3. Third Embodiment
3-1. Recording Operation (Multi aspect Mode 2)
3-2. Reproduction Operation (Multi aspect Mode 2)
4. Fourth Embodiment
4-1. Recording Operation (Panorama mode)
4-2. Reproduction Operation (Panorama mode)
5. Fifth Embodiment
5-1. Recording Operation (Auto bracket Mode)
5-2. Reproduction Operation (Auto bracket Mode)
6. Sixth Embodiment
6-1. Editing
   6-1-1. Deletion of Image Data
   6-1-2. Control upon Deletion of Main Image Data
7. Other Embodiments

1 First Embodiment

A first embodiment of a digital camera according to the present invention is described next.

1-1 Configuration 1-1-1 Configuration of a digital camera

Figure 1:
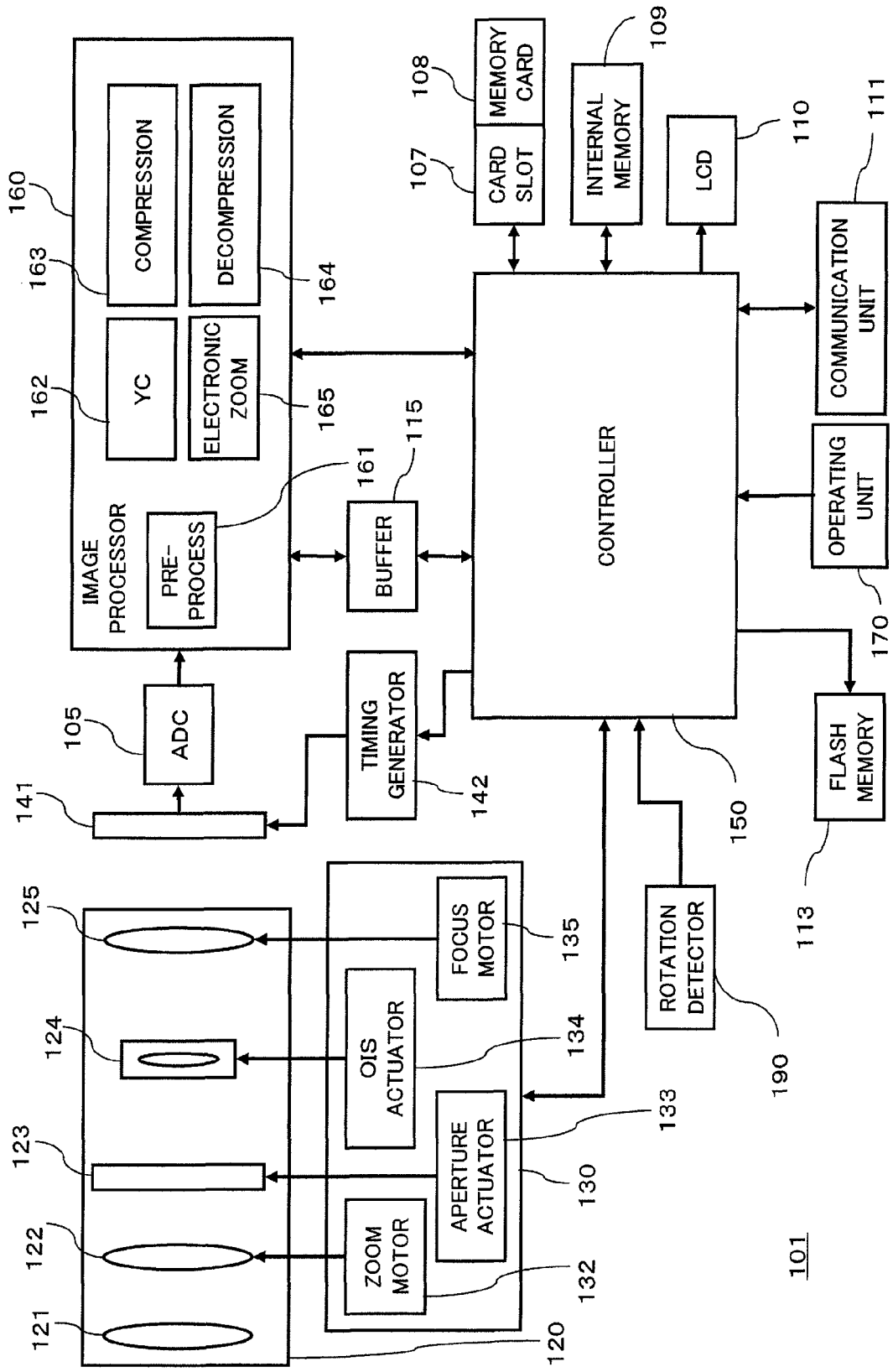
FIG. 1 is a block diagram showing the configuration of a digital camera according to an embodiment of the present invention.

FIG. 1 is a block diagram showing the configuration of a digital camera 101 according to a first embodiment of the invention. This digital camera 101 photographs subjects formed by an optical system 120 on a CCD image sensor 141. The image data captured by the CCD image sensor 141 is then processed by an image processor 160 and stored on a memory card 108 or internal memory 109. The image data stored on the memory card 108, for example, can be displayed on an LCD monitor 110. The configuration of this digital camera 101 is described below.

The optical system 120 includes an objective lens 121, zoom lens 122, aperture 123, optical image stabilization (OIS) unit 124, and a focus lens 125. The optical system 120 focuses light from the subject and forms the subject image.

The objective lens 121 is the lens closest to the subject. The zoom lens 122 enlarges or reduces the subject image by moving along the optical axis of the optical system 120. The aperture 123 adjusts the size of the lens opening as controlled automatically or manually by the user to adjust the amount of light passing through the optical system 120. The OIS unit 124 has an internal correction lens that can move in the plane perpendicular to the optical axis. The OIS unit 124 reduces subject blur by driving the correction lens in the direction that cancels movement of the digital camera 101. The focus lens 125 adjusts the focus of the subject by moving along the optical axis of the optical system 120.

A drive system 130 drives the optical elements of the optical system 120.

A zoom motor 132 drives the zoom lens 122 along the optical axis of the optical system 120. The zoom motor 132 may drive the zoom lens 122 using a cam mechanism or a ball and screw mechanism, for example. The zoom motor 132 may be a pulse motor, a DC motor, a linear motor, a servo motor, or other type of motor.

The aperture actuator 133 is a drive unit for changing the size of the opening of the aperture 123. The aperture actuator 133 can be achieved using a motor, for example.

The OIS actuator 134 drives the correction lens inside the OIS unit 124 in the plane perpendicular to the optical axis. The OIS actuator 134 may be a flat coil or ultrasonic motor, for example.

The focus motor 135 drives the focus lens 125 along the optical axis of the optical system 120. The focus motor 135 may drive the focus lens 125 using a cam mechanism or a ball and screw mechanism, for example. The focus motor 135 may be a pulse motor, a DC motor, a linear motor, a servo motor, or other type of motor. Alternatively, the focus motor 135 may be omitted and the zoom motor 132 used as the drive means for driving both the zoom lens 122 and the focus lens 125.

The CCD image sensor 141 captures the subject image formed by the optical system 120 to generate image data. The timing generator 142 generates the timing signal for driving the CCD image sensor 141. The CCD image sensor 141 controls various operations including exposure, data transfer, and the digital shutter according to the timing signal supplied by the timing generator 142. An analog/digital (A/D) converter 105 converts the image data generated by the CCD image sensor 141 to a digital signal.

The image processor 160 applies various processes to the image data converted by the A/D converter 105. The image processor 160 processes the image data generated by the CCD image sensor 141 to generate image data to be stored in a memory card 108 and/or image data to be displayed on the LCD monitor 110. The image processor 160 also processes the image data stored in the memory card 108 to generate image data to be displayed on the LCD monitor 110, image data to be stored again to the memory card 108, and/or image data to be sent through a communication unit 111 to an external device. The image processor 160 may be configured using a DSP or microprocessor, for example.

A preprocessor 161 applies various image processing operations, such as gamma correction, white balance correction, and scratch removal to the image data converted by the A/D converter 105. The YC conversion unit 162 converts RGB image data to image data represented by YC (Y=luminance, C=chrominance) signals.

The digital zoom processing unit 165 digitally enlarges or reduces the image data. When digitally enlarging or reducing the image data, the digital zoom processing unit 165 appropriately applies process including interpolation, thinning-out, and cutout to the image data. More specifically, the digital zoom processing unit 165 is a means for converting the pixel count of the image data.

The compression unit 163 compresses the YC image data using a DCT (discrete cosine transform), Huffman encoding, or other technique. The compression unit 163 preferably compresses the image data using a compression method compatible with the JPEG format, but the invention is not limited to using JPEG image data.

The decompression unit 164 decodes the compressed image data to the uncompressed form when displaying compressed image data stored in the memory card 108 on the LCD monitor 110, for example.

The controller 150 is a control means for controlling overall operation of the digital camera 101. The controller 150 may be rendered using a semiconductor chip, for example. The controller 150 may be rendered as a hardware-only device or using a combination of both hardware and software. The controller 150 may be rendered using a microprocessor.

Buffer memory 115 functions as working memory for the image processor 160 and controller 150. The buffer memory 115 may be rendered using DRAM or ferroelectric memory, for example. A card slot 107 accommodates a removable memory card 108. The card slot 107 enables mechanically and electrically connecting the memory card 108. The memory card 108 has internal flash memory or ferroelectric memory for storing data.

The internal memory 109 can be rendered using flash memory or ferroelectric memory, for example. The controller 150 can store the generated image files to the memory card 108 or the internal memory 109. The controller 150 can also read image files stored in the memory card 108 and write the files to internal memory 109, or read image files stored in the internal memory 109 and write the files to the memory card 108.

The LCD monitor 110 can display the images presented by the image data generated by the CCD image sensor 141, and images presented by the image data read from the memory card 108, for example. The LCD monitor 110 can also display the settings of the digital camera 101. The LCD monitor 110 can, for example, display the exposure value (EV).

The communication unit 111 is a means for communicating with an external device. The communication unit 111 can be rendered using a wireless LAN or a USB communication unit, for example. The operating unit 170 collectively refers to various operating devices. The operating unit 170 receives instructions from the user and communicates those instructions to the controller 150. The flash 113 emits light to illuminate the subject.

The rotation detector 190 detects rotation of the digital camera 101. The controller 150 can acquire information about the rotation of the digital camera 101 detected by the rotation detector 190. The rotation detector 190 may be rendered using a rotation sensor or angle sensor. The OIS actuator 134 may function as the rotation detector 190. This is because the OIS actuator 134 can detect how much the camera body has been tilted from the drive current level.

1-1-2 Configuration of Back of Digital Camera

Figure 2:
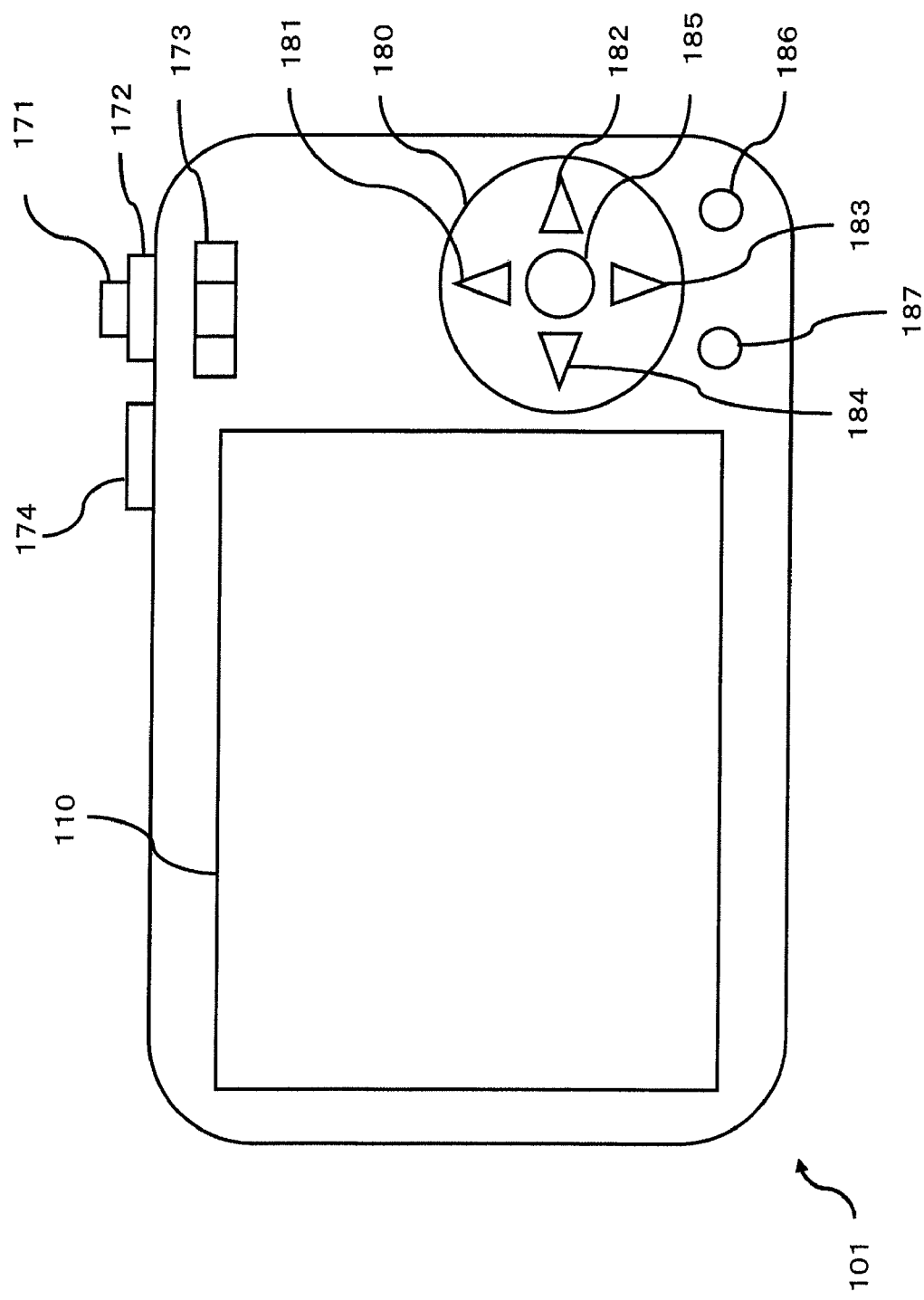
FIG. 2 shows the back of the digital camera according to an embodiment of the present invention.

FIG. 2 shows the back of the digital camera 101 according to this first embodiment of the invention. Various operating units are described below with reference to FIG. 2.

A shutter release button 171, zoom dial 172, and mode dial 174 are disposed on top of the camera body. The shutter release button 171 detects when it is depressed. When the shutter release button 171 is depressed part way, the controller 150 starts automatic exposure (AE) control or automatic focus (AF) control. When the shutter release button 171 is depressed all the way, the digital camera 101 takes a picture.

The zoom dial 172 is disposed so that it can be rotated around the shutter release button 171. As the zoom dial 172 is rotated, the controller 150 starts optical zoom control or digital zoom control.

The mode dial 174 is operated by rotating it. A dial is disposed to the mode dial 174 and the operating modes of the digital camera 101 are assigned to specific positions on the dial. The operating modes of the digital camera 101 include a reproduction (view) mode and a recording mode. The controller 150 controls the digital camera 101 in the operating mode indicated by the mode dial 174 according to the rotational position of the mode dial 174.

A power switch 173, cursor key 180, delete button 186, and the LCD monitor 110 are disposed on the back of the camera body. The power switch 173 is slidable. The power switch 173 switches the power state of the digital camera 101 according to the sliding position.

The LCD monitor 110 displays image data stored in the memory card 108 and operating menus according to the operating mode selected by the mode dial 174.

The cursor key 180 detects operation of five buttons, including four directional buttons and a center button. The controller 150 controls the content displayed on the LCD monitor 110, including changing the displayed image data, based on how the cursor key 180 is operated.

The delete button 186 detects when it is depressed. The controller 150 detects the pre-selected image data according to operation of the delete button 186.

1-1-3. Data Structure of Image File Format 1-1-3-1. Structure of Entire File

Figure 3:
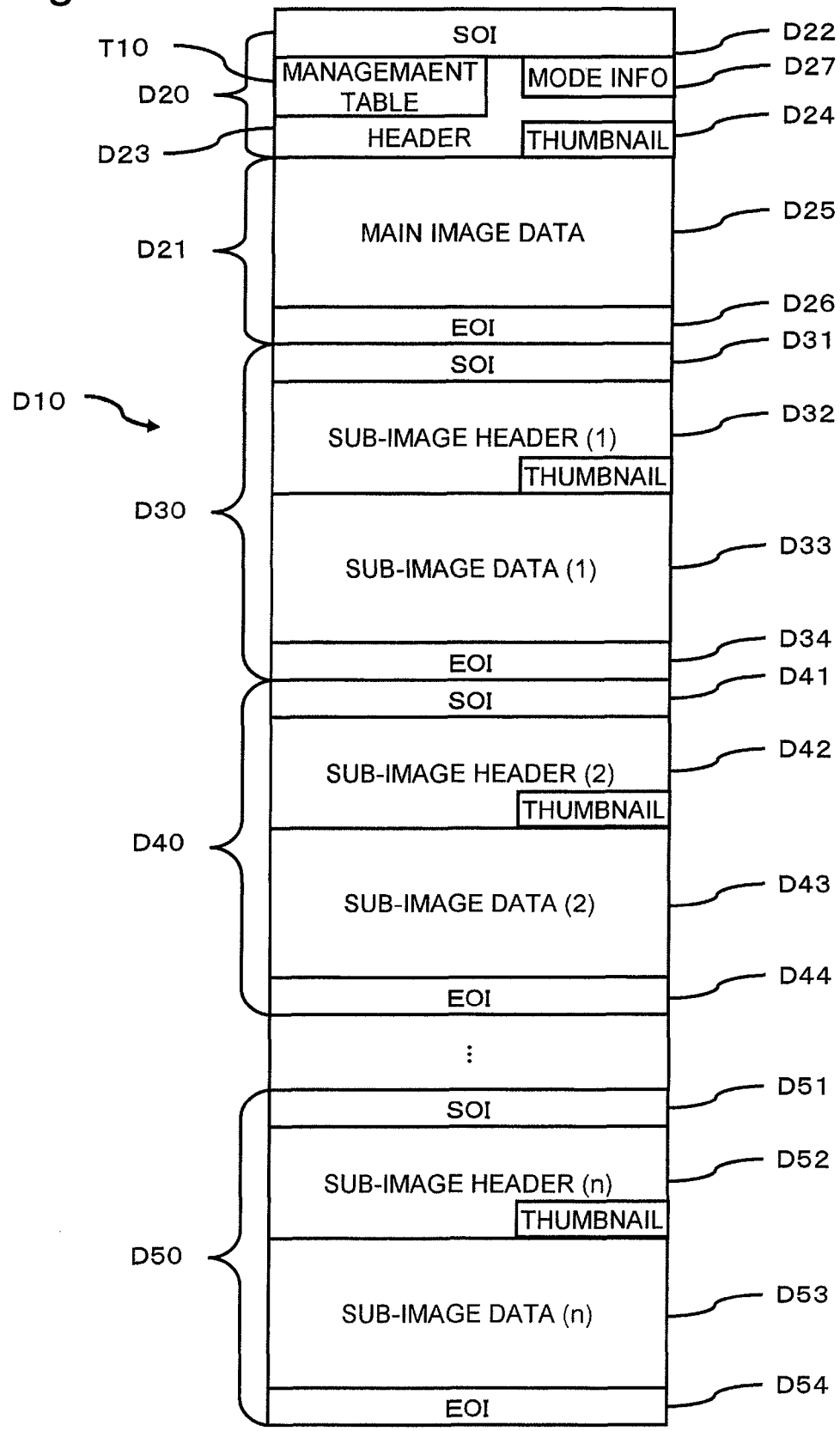
FIG. 3 shows the data structure of a multiple image file.

FIG. 3 is a view illustrating the data structure of an image file format which is handled by the digital camera 101 according to a first embodiment of the present invention. With reference to FIG. 3, the data structure of the image file format will be described.

A multiple image file D10 stores main image data D25 and plural pieces of sub-image data D33, . . . ,. As the plural pieces of sub-image data, there are stored, for example, sub-image data D33, sub-image data D43 and sub-image data D53. The sub-image data is original image data or display-image data. The display-image data is image data created based on the main image data or the original image data. The original image data is image data having an image size (resolution) equal to that of the main image data and contains data for example as follows:

second image data or image data after the second image data, which were captured in a continuous shooting mode;
    image data captured in an auto bracket mode;
    image data composing a panorama image;
    image data captured in a multi aspect mode.

A FAT (File Allocation Table) stored in the memory card 108 manages the multiple image file D10 as a single file, by managing a head identifier D22 and an end identifier D54.

The controller 150 is capable of differentially managing the respective image files by reading the FAT.

Hereinafter, the structure of the multiple image file D10 will be described in detail.

1-1-3-2. Main Header Part 1-1-3-2-1. Structure of Entire Main Header Part

The main header part D20 includes a head identifier D22 and a header part D23.

The head identifier D22 is a marker indicative of the start point of the multiple image file D10 and is start information (xFFD8) about a file defined by the JPEG standard, for example.

The header part D23 is an area which stores management data for the entire multiple image file D10. The header part D23 includes, as management data, a management table T10, thumbnail image data D24, mode information D27 and the like.

The management table T10 contains information for differentiating the main image data D25 and the plural pieces of sub-image data D33, D43 and D53 from one another. In other words, the management table T10 contains information for performing management as to what features are possessed by the respective image data. For example, the management table T10 contains a sub-image identifier indicative of whether each of at least some of the sub-image data stored in the file is original image data or display image data, and sub-image-data information about the creation of the sub-image data. In this case, the sub-image-data information is information indicative of the features of the sub-image data. For example, the sub-image-data information is information indicative of an order of image data in a series of image data captured in the continuous shooting operation in the digital camera 101. The use of this table enables the controller 150 to easily search for sub-image data of interest.

The thumbnail image data D24 is reduced image data created based on the main image data D25. The thumbnail image data D24 has an image size of 160 dots in the horizontal direction and 120 dots in the vertical direction, for example. According to the Exif standard, the thumbnail image data D24 is defined as being stored in the header part D23.

Mode information D27 contains information indicative of the operation mode of the digital camera 101 when the multiple image file D10 is created or edited. For example, in the case where the multiple image file D10 is created when taking images in the continuous shooting mode, the mode information D27 contains information indicative of the continuous shooting mode. This enables the controller 150 to rapidly process the multiple image file D10. For example, in the case where the mode information D27 indicates the continuous shooting mode, the controller 150 can successively reproduce, on a television, the display image data corresponding to the respective image data captured by continuous shooting which are stored in the multiple image file D10, by referring to the mode information D27, without analyzing the image data in the multiple image file D10.

1-1-3-2-2. Management Table

With reference to FIG. 4, the management table T10 will be described in detail. FIG. 4 is a schematic view of the management table T10. The management table T10 manages a head address T11, a sub-image identifier T12 and sub-image-data information T13 with those associated with each other.

The head address T11 is information indicative of the head address of the area which stores the main image data or sub-image data.

The sub-image identifier T12 is an identifier indicative of whether the sub-image data is original image data or display-image data. When the sub-image identifier is "0", it indicates that the corresponding sub-image data is original image data. When the sub-image identifier is "1", it indicates that the corresponding sub-image data is display-image data. However, the sub-image identifier is not necessarily required to have a value of "0" and "1" and can have a value of "10" and "11" or a value of "10" and "11". Namely, the sub-image identifier can have any values capable of expressing two different patterns.

In this case, the controller 150 is capable of properly specifying which sub-image data is original image data or which sub-image data are display-image data.

For example, the controller 150 can specify image data with a pixel count equal to that of the main image data, as original image data, and specify image data with a pixel count smaller than that of the main image data, as display-image data.

Also, the controller 150 can specify image data created independently of any image data in the multiple image file D10, as original image data, and can specify image data created based on the original image data, as display-image data.

Further, the controller 150 can change the method for specifying original image data or display-image data according to the mode information D27. For example, when the mode information D27 indicates a red-eye reduction mode, the controller 150 can specify original image data and display-image data according to the pixel counts. When the mode information D27 indicates a mode for storing image data with different pixel counts in a single file, the controller 150 can specify original image data and display-image data according to whether or not image data have been independently created.

Next, there will be described the reason why the sub-image identifier is stored in the header part D23. If there is no sub-image identifier, the controller 150 would be required to read all the sub-image headers or sub-image data in order to search for sub-image data. However, if all the sub-image headers and sub-image data every time the sub-image data is searched for, the processing would be complicated, thereby imposing large burden on the controller 150 for the processing. Therefore, in order to overcome this problem, the sub-image identifiers are stored in the header part D23.

Next, there will be described the reason why the sub-image identifiers are provided for distinguishing two types of images. If the sub-image identifier is provided for distinguishing three or more types of images, the controller 150 would be required to determine which of the three or more types of image data correspond to the respective sub-image data, in creating sub-image data. However, if it is necessary to determine which of the three or more types of image data correspond to respective sub-image data every time the sub-image data is created, the process would be complicated, thereby imposing large burden on the controller 150 for processing. Therefore, in order to overcome this problem, the sub-image identifiers are provided for distinguishing two types of images.

Next, there will be described the reason why an identifier indicative of original image data and an identifier indicative of display-image data are provided as sub-image identifiers. In many cases, search for sub-image data using the sub-image identifiers is required for displaying image data. In this case, it is enough to search for sub-image data in view of whether sub-image data is display-image data or image data (original image data) which is the basis of the sub-image data. Therefore, in order to increase the search efficiency, an identifier indicative of original image data and an identifier indicative of display-image data are provided, in line with the viewpoint of searching which is executed most frequently.

Further, by providing the sub-image identifiers, the controller 150 can select a method for reproducing image data, according to the sub-image identifiers. For example, when a user performs a frame advance operation with the digital camera 101, if there are original image data and the corresponding display-image data, following image data being currently reproduced, in the same image file as the image file storing the currently-reproduced image data, then the following display-image data in the same image file is reproduced. On the other hand, if there is no original image data and no corresponding display-image data, following the image data being currently reproduced in the same image file, it is possible to reproduce display-image data stored in a different image file.

The sub-image-data information T13 is information indicative of what features are possessed by the sub-image data in a predetermined mode. Namely, the sub-image-data information T13 is an identifier indicative of information relating to creation of the sub-image data. For example, the sub-image-data information T13 is information indicative of the order of capturing image data in the continuous shooting operation. More specifically, it is assumed that in the continuous shooting mode image data firstly captured by the digital camera 101 is stored as main image data in the multiple image file D10 and image data captured secondary or later is stored therein as sub-image data. In this case, for example, information indicative of the order of each sub-image data is the sub-image-data information. Further, it is assumed that in the auto bracket mode image data with a predetermined EV value captured by the digital camera 101 is stored as main image data in the multiple image file D10, and image data with other EV values are stored therein as sub-image data. In this case, for example, the EV value of each sub-image data is sub-image-data information.

Since the header part D23 stores the sub-image-data information T13, the controller 150 is capable of selecting a reproduction method suitable for the features of the respective sub-image data, by referring to the sub-image-data information T13. For example, when each header part D23 stores the EV value of each image data as the sub-image-data information T13 and there are plural multiple image files D10 created by capturing images in the bracket mode, the controller 150 can selectively reproduce only the sub-image data having the same EV value.

Further, when the header part D23 stores information about presence or absence of red-eye correction processing on image data as the sub-image-data information T13 and there are plural multiple image files D10 created by capturing images in the red-eye correction mode, the controller 150 can selectively reproduce only the images which have been subjected to the red-eye correction processing.

1-1-3-2-3. Thumbnail Image Data

Returning to FIG. 3, there will be described the thumbnail image data D24. The thumbnail image data D24 is created as a result of the execution of thinning-out processing, cutout processing, interpolation processing and the like on the main image data D25 by an electronic zoom processing unit 165. The header part 23 stores the thumbnail image data D24. This enables the LCD monitor 110 to display thumbnail images, instantaneously.

1-1-3-2-4. Mode Information

Next, the mode information storage part D27 will be described. The mode information storage part D27 stores information about operation mode of the digital camera 101 for creating or editing the multiple image file D10. Here, the operation mode includes, for example, a continuous shooting mode, a multi aspect mode, a panorama mode, an auto bracket mode, a red-eye correction mode, and the like.

The "continuous shooting mode" is a mode for capturing a pre-set number of images at regular intervals by pressing continuously a release button 171 of the digital camera 101.

The "multi aspect mode" is a mode for, when taking image data with a predetermined aspect ratio, creating image data with plural aspect ratios in addition to image data with the predetermined aspect ratio.

The "panorama mode" is a mode for taking plural pictures having portions overlapped with one another in the vertical and horizontal directions, thereby enabling them to be synthesized to create a panorama picture.

The "auto bracket mode" is a mode for enabling creation of plural images with different exposure times, by pressing, once, the release button 171 of the digital camera 101.

The "red-eye correction mode" is a mode for, in cases where image data captured before exhibits a red-eye phenomenon, correcting this to create modified image data.

By preliminarily storing the mode information as described above, the controller 150 can change the method for reproducing image data, according to the mode information D27. Namely, on receiving a user's command for frame-advance reproduction from currently reproduced image data to the next image data, the controller 150 can decide which image data should be reproduced and can reproduce the decided image data, according to the mode information stored in the header part of the image file storing the image data being currently reproduced. For example, plural images captured in the continuous shooting mode are images which are substantially equal to one another. This permits reproducing only a single image, out of plural images captured in the continuous shooting mode, without reproducing other images. Further, on receiving a next command for frame-advance reproduction, image data stored in a different image file can be reproduced.

1-1-3-2-5. Other Stored Information

Further, the header part D23 stores protection information about the main image data and the sub-image data, in addition to the management table T10, the thumbnail image data D24 and the mode information storage part D27. Once the protection information is stored, the main image data D25 is protected against deletion. Namely, the main image data D25 is prevented from being deleted until the protection information is erased.

In this case, the protection information about the main image data can be stored in the main header, and the protection information about the sub-images can be stored in the sub-image headers corresponding to the respective sub-image data. This enables the main image and the sub-images to be protected independently of one another. Further, it is necessary to update only headers for the protections or releasing the protection for the respective images, thus to facilitate handling of data.

In the present embodiment, the protection information about the main image data and the protection information about the sub-image data are stored in the respective corresponding headers. However, it is not necessarily required to employ such an arrangement.

For example, by storing protection information in the main header, the entire image data in the image file can be protected. This permits collectively handling the protection for the entire image data stored in the same image file.

Also, the main header can be made capable of storing two pieces of protection information and also, the sub-image headers can be made capable of storing protection information. In this case, one piece of the protection information stored in the main header manages the state of the protection for the entire image data in the image file. The other piece of the protection information manages the state of the protection for the main image data. The protection information stored in the sub-image headers manages the states of the protection for the corresponding sub-image data. This enables the user to select collectively-managing the protection state of the image data on a per-file basis or independently-managing the protection states of the respective image data.

1-1-3-3. Main Image Data Part

A main image data part D21 stores information about the main image. The main image data D25 is an image which is created by compressing image data of an image captured by the digital camera 101 to a JPEG format. However, the main image data D25 is not necessarily image data compressed to a JPEG format, but can be image data such as GIF data or RAW data. Namely, the main image data D25 is not necessarily compressed. Even when the main image data D25 is compressed, the format of the compression is not limited.

An end identifier D26 is a marker (xFFD9) indicative of the end point of the main image data part D21. By providing a table for managing this marker in the header part D23, it does not need to add a new SOI and EOI to the file when splitting a part of all pieces of image data from the multiple image file D10. This can facilitate splitting of the file.

1-1-3-4. Sub-Image Part Referring to FIG. 3, a sub-image data part D30, a sub-image data part D40 and a sub-image data part D50 constitute sub-image parts.

The sub-image data part D30 stores information about a first sub-image. A head identifier D31 is a marker indicative of the start point of the sub-image data part D30. A table for managing this marker is provided in the header part D23. This can facilitate search for sub-image data. Further, in splitting the file, it is possible to easily find the split point. Further, by providing this marker, it does not need to add a new SOI or EOI to the file when splitting the multiple image file D10. This facilitates splitting of the file.

A sub-image header D32 stores attribute information about the sub-image data D33. For example, the sub-image header D32 stores information about that the sub-image data D33 is display-image data, and the like.

Further, the sub-image header D32 stores thumbnail image data of the sub-image data D33. The thumbnail image data is created based on the sub-image data. For example, the sub-image header D32, the sub-image header D42 and the sub-image header D52 store respective thumbnail image data. This permits instantaneously displaying thumbnail images of the sub-image data.

The Exif standard defines that a header part should contain thumbnail image data. Accordingly, when sub-image data is separated from the main image data, it is necessary to newly store thumbnail image data in the sub-image header. Since, in the present embodiment, the sub-image data headers store thumbnail image data corresponding to the sub-image data, it does not need to newly store thumbnail image data in the sub-image header when separating sub-image data.

The sub-image data D33 is display-image data and the like, which has been created based on the main image data D25. The sub-image data is stored after the main image data. The display-image data is stored after the original image data which is the basis of the display-image data, which facilitates search for the corresponding display-image data. However, the sub-image data D33 is not necessarily display-image data but can be original image data.

An end identifier D34 is a marker indicative of the end point of the sub-image data part D30. A table for managing this marker is provided in the header part D23. Accordingly, when splitting the multiple image file D10, it is not necessary to add a new SOI or EOI to the file. This facilitates splitting of the file.

The sub-image data part D40 and the sub-image data part D50 have the same structure as that of the sub-image data part D30.

1-1-4. Correspondence to the Present Invention

The structure constituted by the controller 150, the image processor 160 and the like is an example of a reproduction unit according to the present invention. The structure constituted by a right key 182 and a left key 184 is an example of a first operation unit according to the present invention. The structure constituted by an up key 181 and a down key 183 is an example of a second operation unit according to the present invention. The structure constituted by the controller 150 and the like is an example of a reading unit according to the present invention. The structure constituted by a cursor key 180 is an example of a reception unit according to the present invention. The controller 150 is an example of a control unit according to the present invention.

The controller 150 is an example of a determination unit according to the present invention. The controller 150 is an example of a decision unit according to the present invention. The LCD monitor 110 is an example of an output unit according to the present invention. The communication unit 111 is an example of the output unit according to the present invention. The memory card 108 is an example of a storage unit according to the present invention. The internal memory 109 is an example of a storage unit according to the present invention. The controller 150 is an example of a deletion unit according to the present invention. The controller 150 is an example of a restructuring unit according to the present invention. The communication unit 111 is an example of a communication unit according to the present invention. The controller 150 is an example of an ID association unit according to the present invention. The controller 150 is an example of a selection reception unit according to the present invention. The controller 150 is an example of a transmission unit according to the present invention. The controller 150 is an example of an image-data transmission unit according to the present invention. The controller 150 is an example of a recognition unit according to the present invention. The digital camera 101 is an example of an image-file reproduction device according to the present invention. The digital camera 101 is an example of an image-data reproduction device. The digital camera 101 is an example of an image information output device. The digital camera 101 is an example of an image-data deletion device. The digital camera 101 is an example of an image-file restructuring device. The digital camera 101 is an example of an image-data transmission device.

1-2. Recording Operation (Continuous Shooting Mode)

There will be described an operation for recording image data, in the case where the digital camera 101 according to the first embodiment is set to the continuous shooting mode.

1-2-1. Flow of Recording Operation

Figure 5:
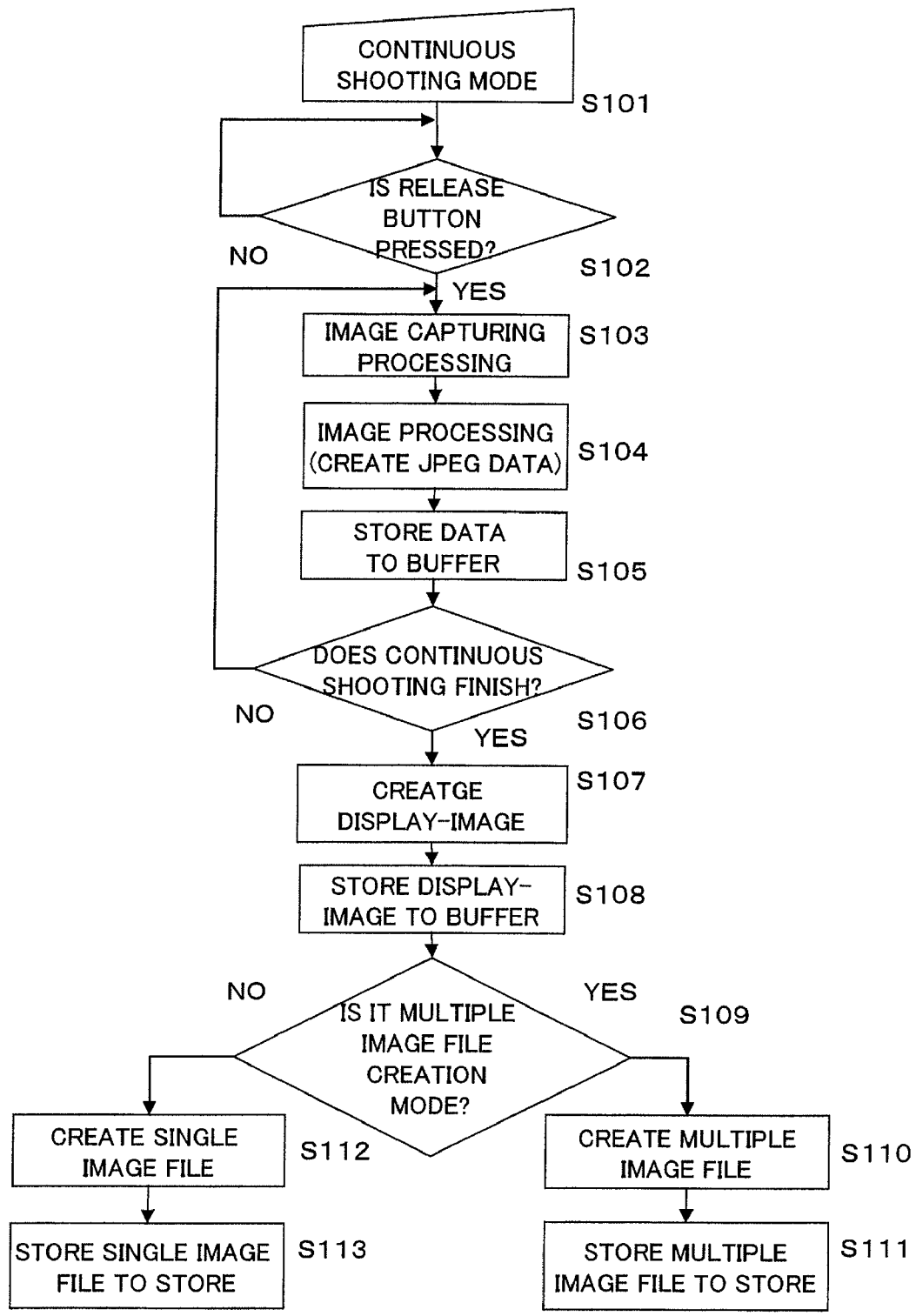
FIG. 5 is a flow chart illustrating a recording operation of the digital camera according to an embodiment of the present invention.

With reference to FIG. 5, there will be described a recording operation, in the case where the digital camera 101 is set to the continuous shooting mode. FIG. 5 is a flow chart of a recording operation, in the case where the digital camera 101 is set to the continuous shooting mode. If the user operates the operation unit 170 to set the digital camera 101 to the continuous shooting mode, the continuous shooting mode is started (S101). If the continuous shooting mode is selected, the controller 150 is on standby until the release button 171 is completely pressed (S102). If the release button 171 is completely pressed, the CCD image sensor 141 captures image data (S103). The image processor 160 creates JPEG image data, based on the image data (S104). The controller 150 stores, in the buffer memory 115, the created JPEG image data, and auxiliary information about this JPEG image data (for example, information about shooting date and time, information about the order of capturing images in continuous shooting, and the like).

Next, the controller 150 determines whether or not the continuous shooting mode should be ended (S106). In the present embodiment, the number of images to be successively captured in the continuous shooting mode can be preliminarily set. Accordingly, when the preliminarily set number of image data have been already captured, the controller 150 determines that the continuous shooting mode is ended.

If it is determined that the continuous shooting mode is not ended, the CCD image sensor 141 successively captures image data and repeats the processing thereafter (S103 to S106).

On the other hand, if the controller 150 determines that the continuous shooting mode is ended, the controller 150 creates display-image data corresponding to all pieces of the JPEG image data stored in the buffer memory 115 (S107). The controller 150 stores the created display-image data in the buffer memory 115 (S108). As described above, the display-image data are created, after all pieces of image data are created in continuous shooting. With this arrangement, the controller 150 can concentrate on only the processing for creating image data by continuous shooting, during capturing images by the continuous shooting. Further, the controller 150 can concentrate on only the processing for creating display-image data, during creating display-image data.

Next, the controller 150 determines whether or not the digital camera 101 is being set to a multiple image file creation mode (S109). In this case, the term "multiple image file" refers to one image file capable of storing main image data, one or more pieces of original image data and one or more pieces of display-image data.

Figure 6:
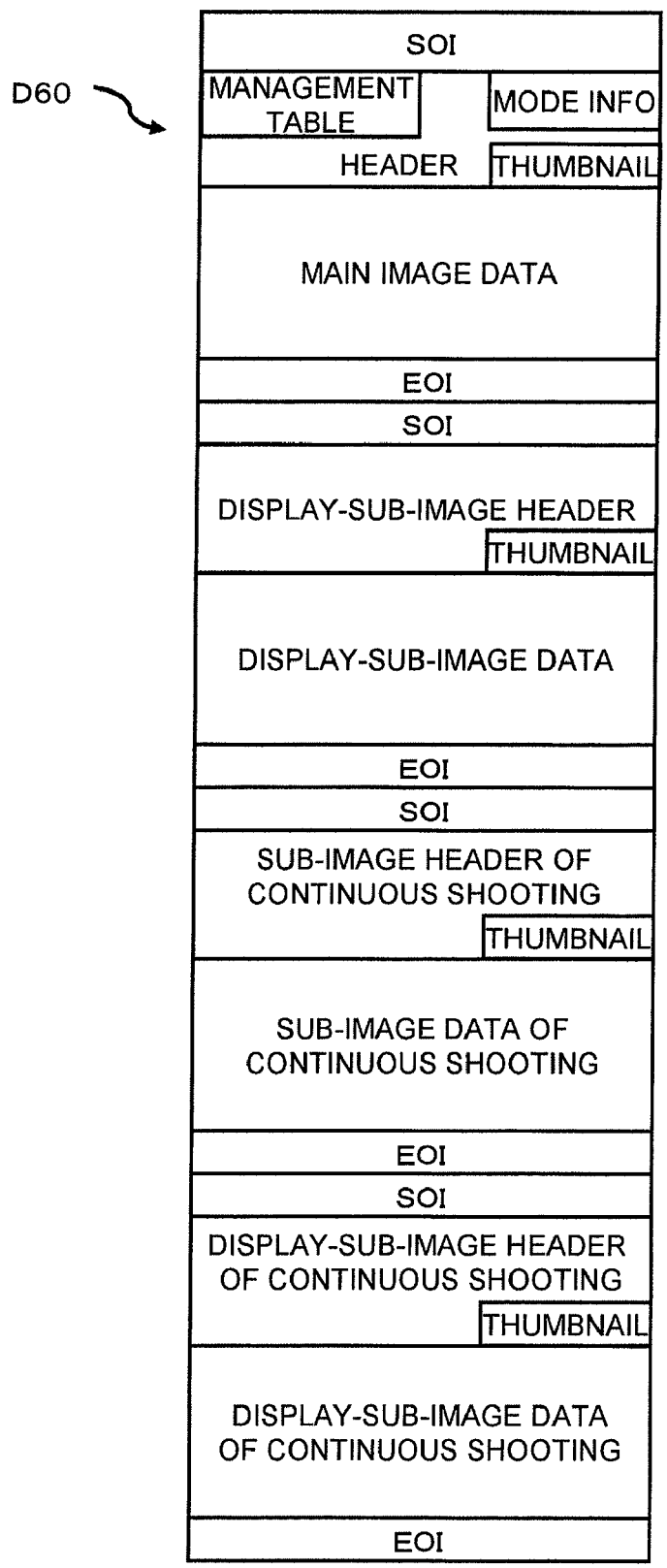
FIG. 6 is a schematic view of a multiple image file.
Figure 7:
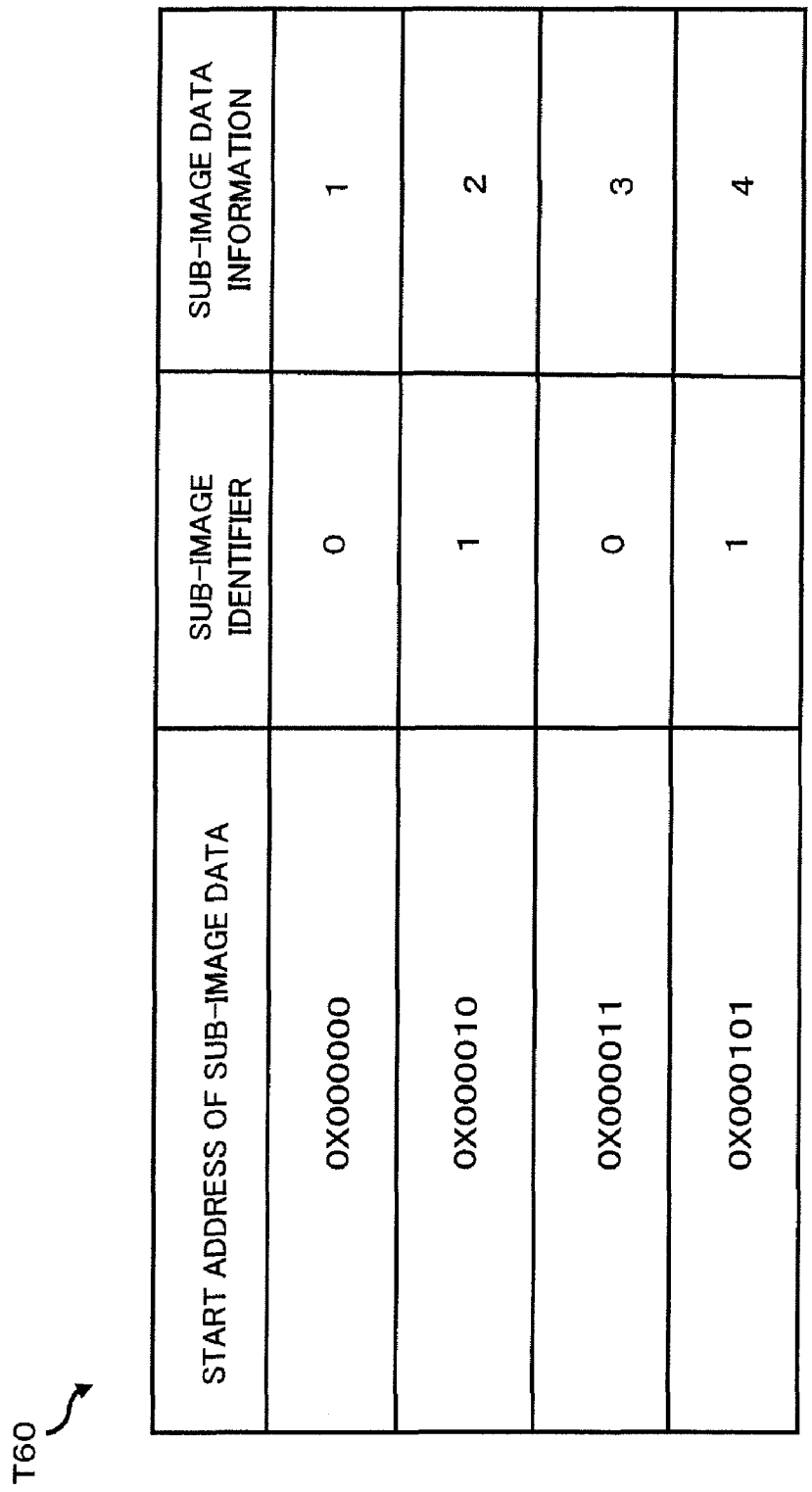
FIG. 7 is a schematic view of a management table.

If the controller 150 determines that the digital camera 101 is being set to the multiple image file creation mode, the controller 150 combines all pieces of the JPEG image data, all pieces of the display-image data and all pieces of auxiliary information, which are stored in the buffer memory 115 to create one multiple image file (S110). The controller 150 stores the created multiple image file in the memory card 108 or the internal memory 109 (S111). For example, in the multiple image file creation mode, in the case where two image data are captured in the continuous shooting mode, a multiple image file D60 illustrated in FIG. 6 is created. Further, a management table included in the multiple image file D60 is a management table T60 illustrated in FIG. 7.

Figure 8:
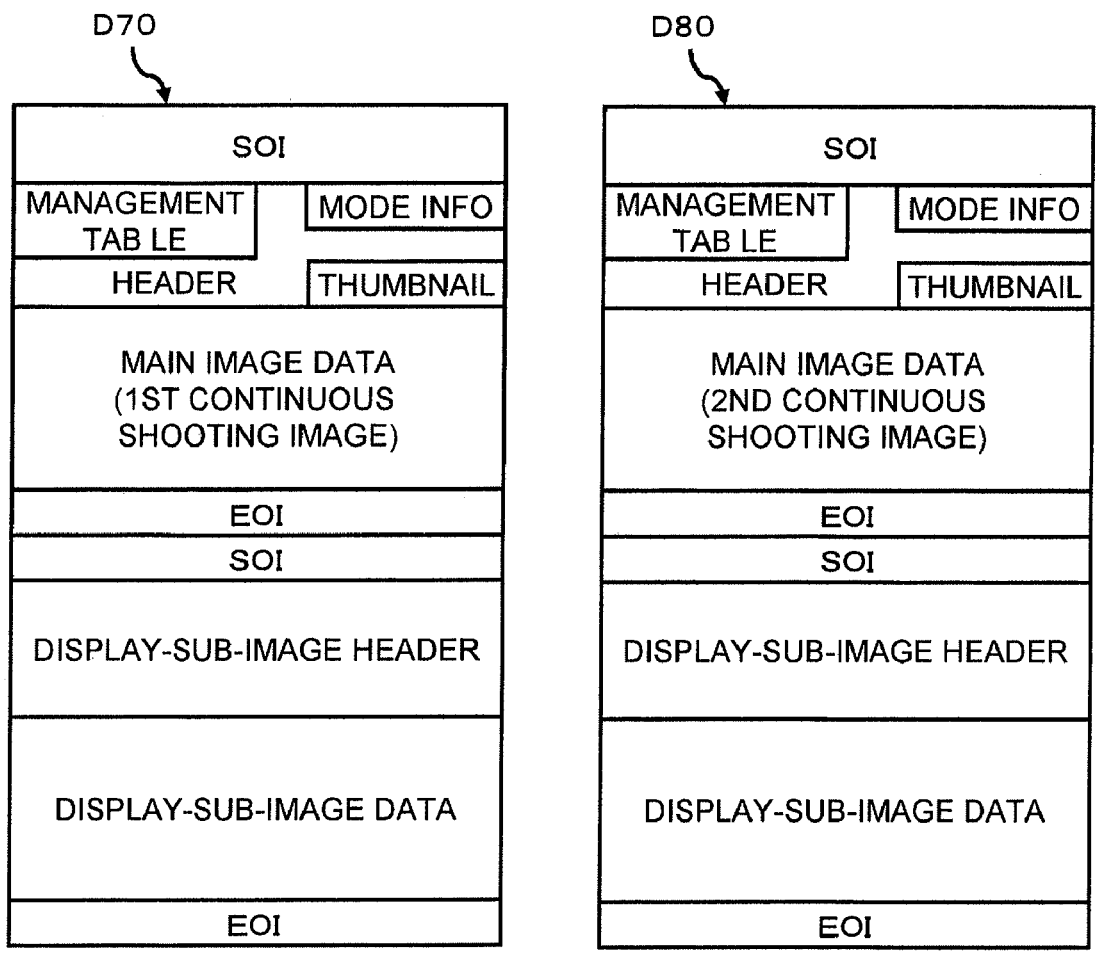
FIG. 8 is a schematic view of a single image file.
Figure 9:
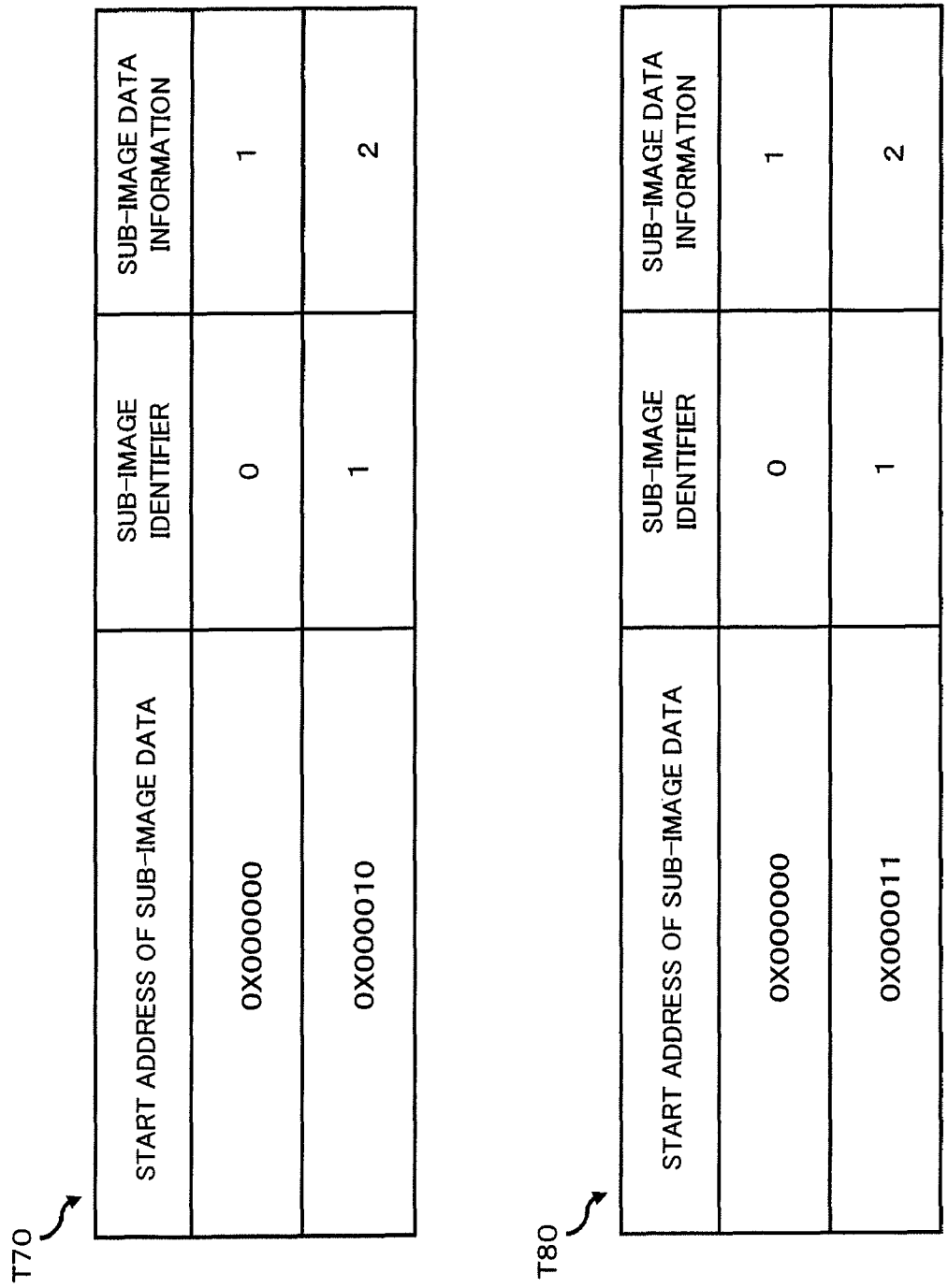
FIG. 9 is a schematic view of a management table.

On the other hand, if the controller 150 determines that it is not being set to the multiple image file creation mode, the controller 150 creates a single image file for each JPEG image data stored in the buffer memory 115 (S112). In this case, the term "a single image file" refers to one image file capable of storing single main image data, one or more display-image data and auxiliary information related to the main image data. The single image file is created from the JPEG image data, the display-image data related to the JPEG image data, and the auxiliary information related to this JPEG image data which is stored in the buffer memory 115. The controller 150 stores the created single image file in the memory card 108 or the internal memory 109 (S113). For example, in the single image file creation mode, in the case where two image data are captured in the continuous shooting mode, a single image file D70 and a single image file D80 illustrated in FIG. 8 are created. Further, management tables included in the single image files D70 and D80 are illustrated as management tables T70 and T80 in FIG. 9, respectively.

Further, although in the present embodiment display-image data is created after main image data and original image data are all captured at first, it is also possible to create display-image data together with the creation of main image data and original image data at the time of shooting, temporarily store these image data in the buffer memory 115 and combine after the completion of the continuous shooting, the main image data, all pieces of the original image data and all pieces of the display-image data which are stored in the buffer memory 115 to create an image file.

1-2-2. Various Settings for Recording

There will be described various types of settings for recording image data with the digital camera 101 according to the first embodiment of the present invention. There will be described, as various types of settings, a setting of the aspect ratio of display-image data, a setting of the recording format, and a setting of the pixel count of display-image data.

1-2-2-1. Setting of Aspect Ratio of Display-Image Data

Figure 10:
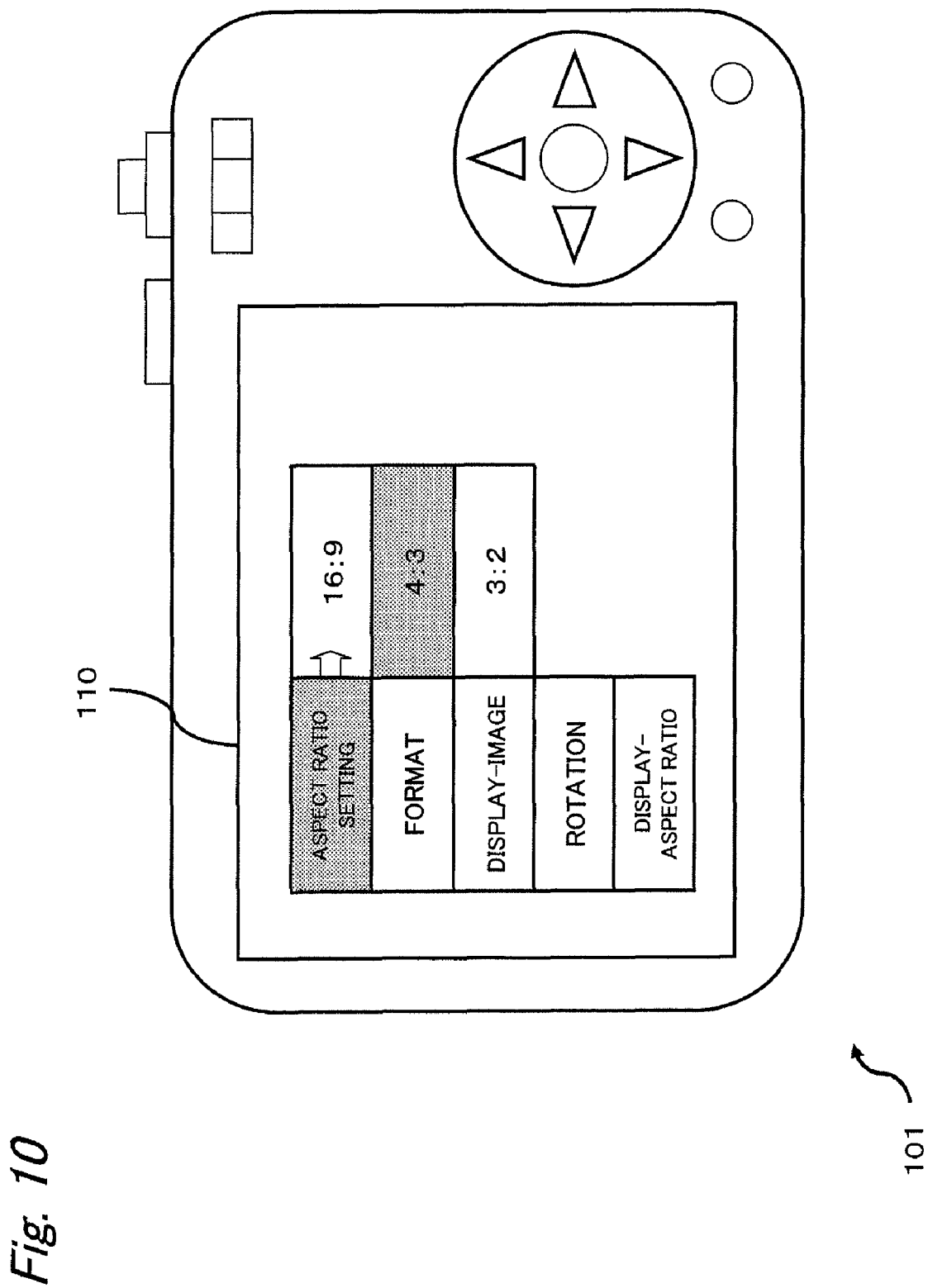
FIG. 10 is a schematic view of a screen for setting the aspect ratio.
Figure 11:
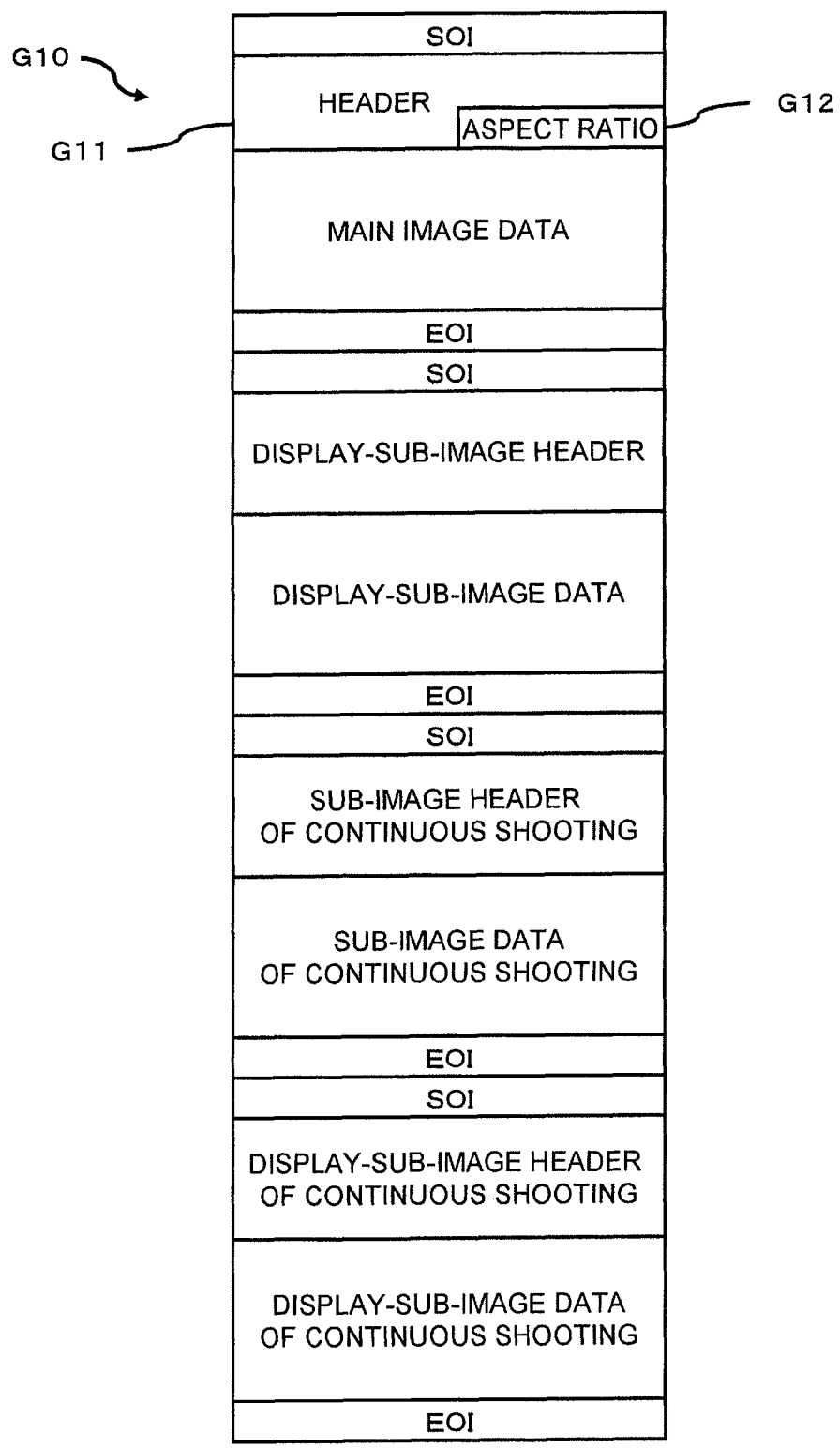
FIG. 11 is a schematic view of a multiple image file.

With reference to FIG. 10 and FIG. 11, there will be described the setting of the aspect ratio of display-image data, in the digital camera 101 according to the first embodiment of the present invention. FIG. 10 is a view illustrating a selection menu for the aspect ratio of the display on the LCD monitor 110 on the back of the digital camera 101. FIG. 11 is a schematic view of an image file created as a result of continuous shooting for two images in the continuous shooting mode, in the case where an aspect ratio of display-image data has been preliminarily selected.

The user can preliminarily set the aspect ratio of display-image data to be recorded. The user can set the aspect ratio of display-image data to be displayed, through a menu screen as that illustrated in FIG. 10. For example, the user can select a single aspect ratio, out of aspect ratios of 16:9, 4:3 and the like.

In cases where images are captured at a state where an arbitrary aspect ratio is set, the image processor 160 performs processing on image data outputted from the CCD image sensor 141 for converting the aspect ratio of the display-image data into the set aspect ratio. The controller 150 creates a multiple image file G10 as illustrated in FIG. 11, based on the image data with the converted aspect ratio and, then, stores the created image file, in the memory card 108 or the internal memory 109.

This structure enables the user to record image data with an aspect ratio which matches the aspect ratio of a display device which the user usually uses.

Further, in creating the image file, the controller 150 stores information G12 about the selected aspect ratio, in its header part G11. This structure permits selecting image data which matches the aspect ratio of the display device only by checking the main header.

1-2-2-2. Setting of Image File Format

Figure 12:
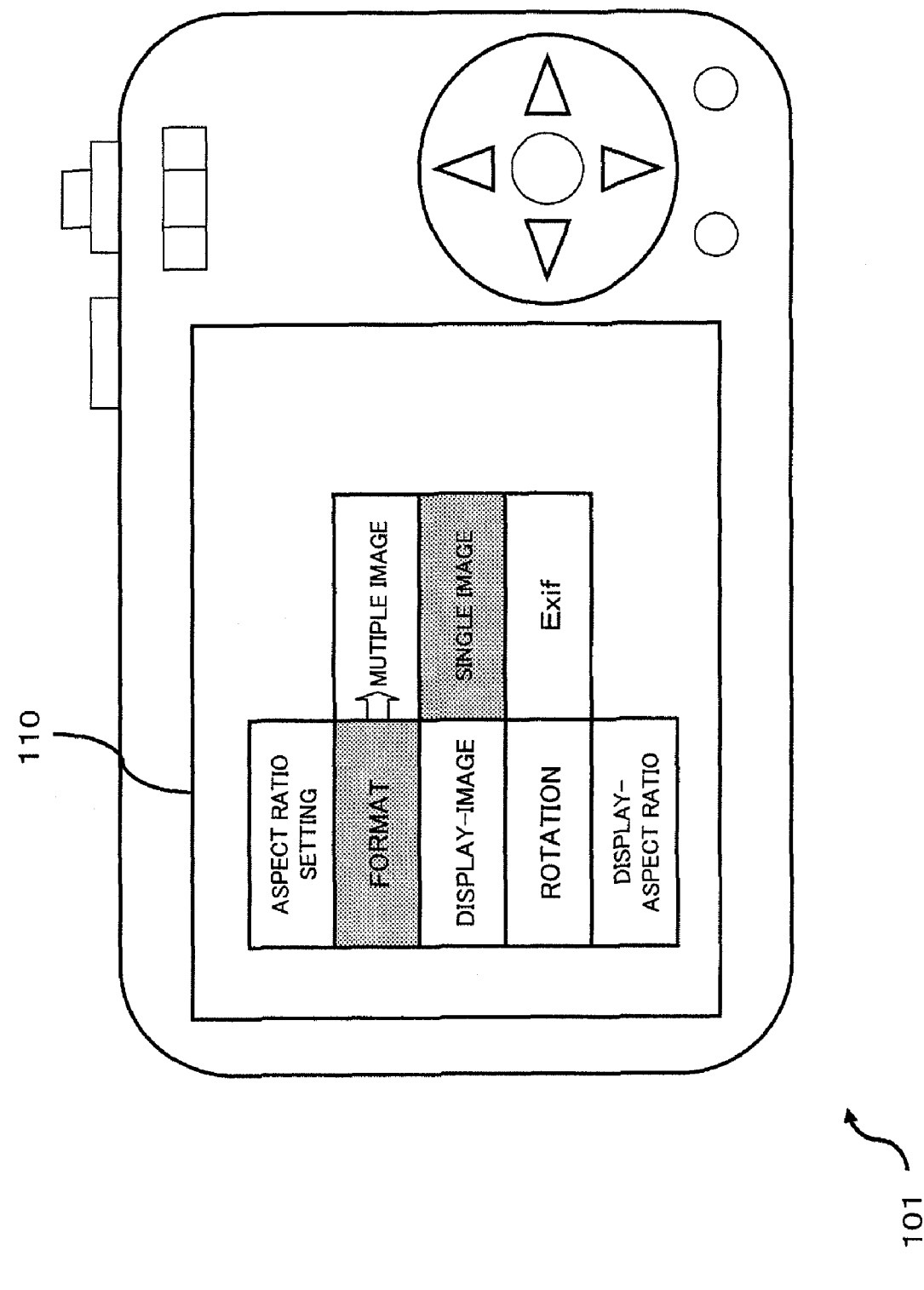
FIG. 12 is a schematic view of a screen for setting a format.
Figure 13:
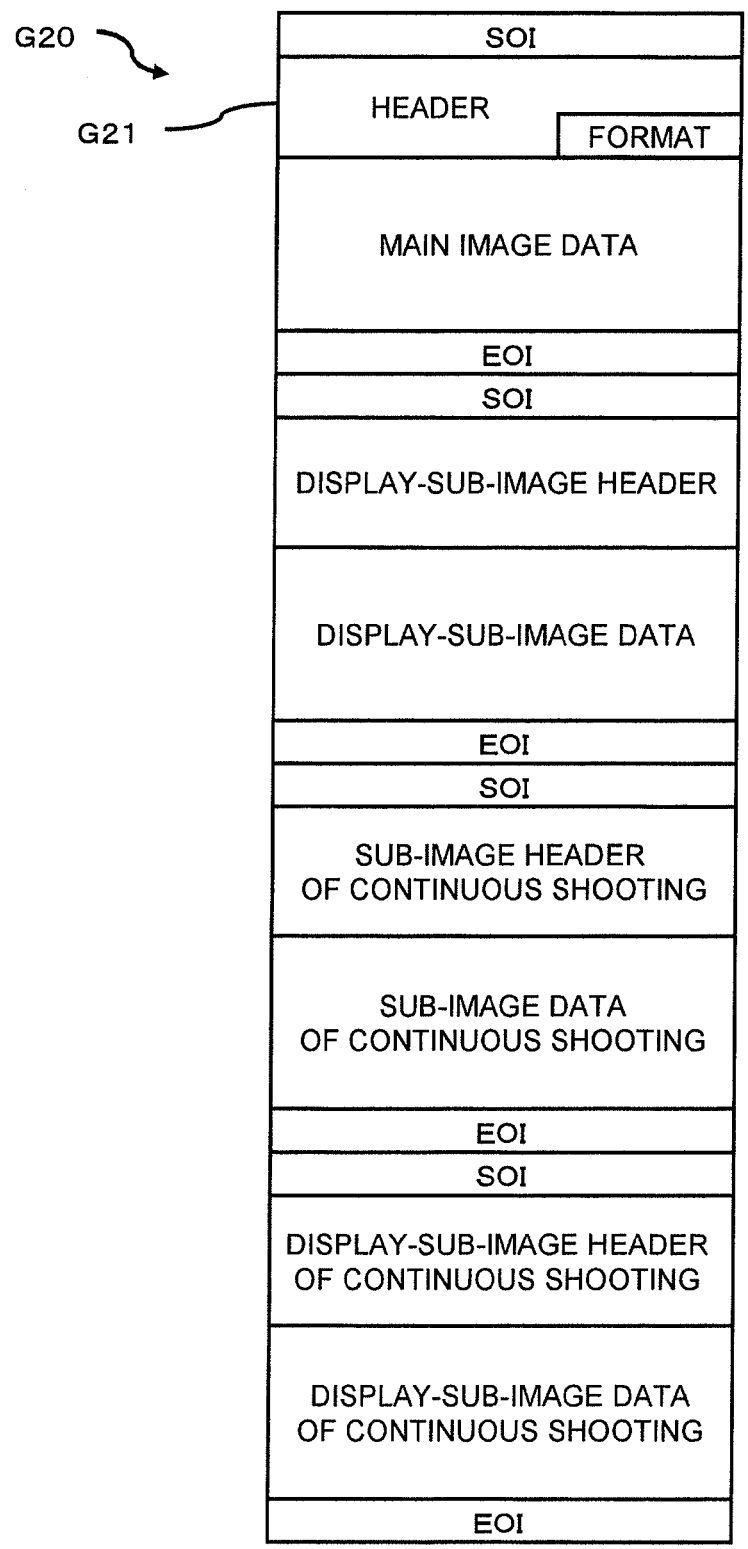
FIG. 13 is a schematic view of a multiple image file.

With reference to FIG. 12 and FIG. 13, there will be described the selection of an image file format, in the digital camera 101 according to the first embodiment of the present invention. FIG. 12 is a view illustrating a selection menu for an image file format of the display on the LCD monitor 110 on the back of the digital camera 101. FIG. 13 is a schematic view of an image file created as a result of continuous shooting for two images in the continuous shooting mode, in the case where an image file format has been preliminarily selected.

The user can preliminarily select an image file format of image data to be recorded. The user selects an image file format of an image file which stores image data, through a menu screen as that illustrated in FIG. 12. For example, the user selects one image file format from a multiple image file format, a single image file format, an Exif-file format, and the like.

In cases where images are captured at a state where an arbitrary image file format has been selected, the controller 150 creates an image file which conforms to the preliminarily-selected image file format. The controller 150 stores the created image file, in the memory card 108 or the internal memory 109. For example, if the multiple image file format is selected and two images are captured by continuous shooting in the continuous shooting mode, a multiple image file G20 illustrated in FIG. 13 is created.

This structure enables the user to select an image file format according to his or her preferences. For example, a user who does not want to make the size of a single image file excessively larger can select the single image file format for preventing the size of a single image file from becoming excessively larger.

Further, the header part G21 of the multiple image file G20 in FIG. 13 stores information about the image file format of the multiple image file G20.

With this arrangement, it is possible to make a reference to the format information about the image file only by referring to the header part G21.

1-2-2-3. Setting of Pixel Count of Display-Image Data

Figure 14:
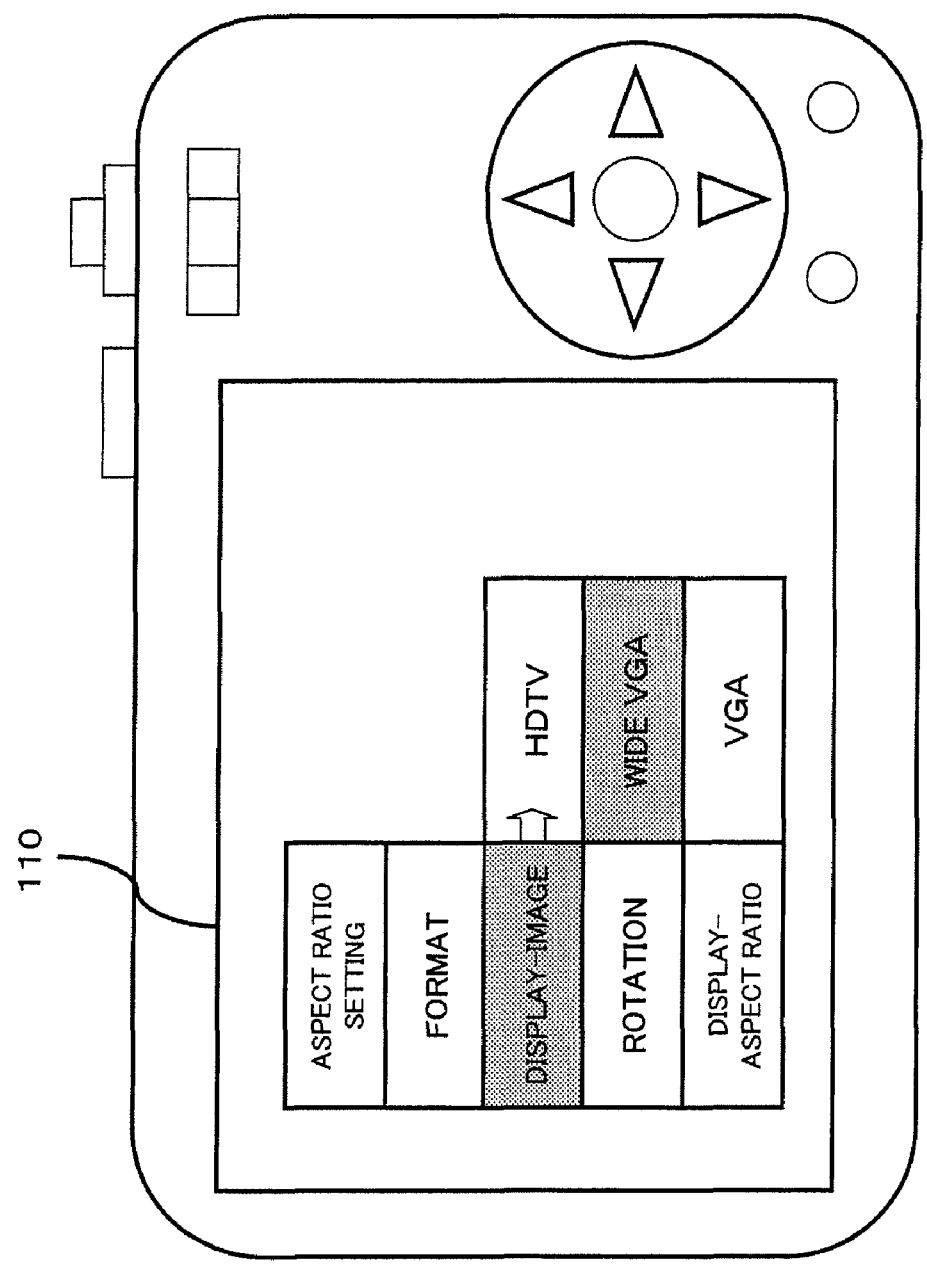
FIG. 14 is a schematic view of a screen for setting for the pixel count of display-image data.
Figure 15:
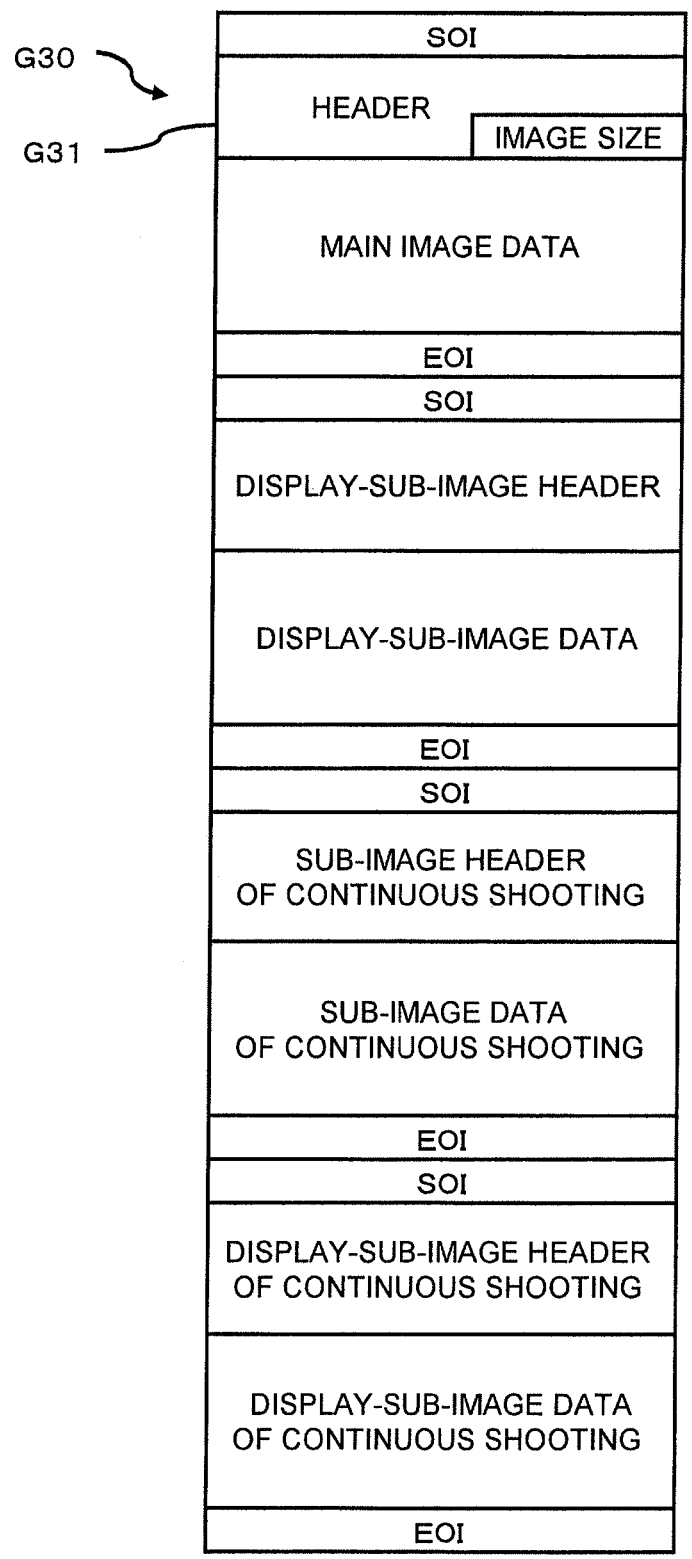
FIG. 15 is a schematic view of a multiple image file.

With reference to FIG. 14 and FIG. 15, there will be described the selection of a pixel count of display-image data, with the digital camera 101 according to the first embodiment of the present invention. FIG. 14 is a rear view of the digital camera 101 at a state where a selection menu for the pixel count (image size) of display-image data is being displayed on the LCD monitor 110. FIG. 15 is a schematic view of an image file created as a result of continuous shooting for two images in the continuous shooting mode, in the case where a size of display-image data has been preliminarily selected.

The user can preliminarily select a pixel count (an image size) of display-image data to be recorded. The user selects a pixel count of display-image data, through a menu screen as that in FIG. 14. For example, the user selects a single pixel count of display-image data, out of VGA (640 horizontal pixels×480 vertical pixels), HDTV (1088 horizontal pixels× 612 vertical pixels), and the like.

When images are captured at a state where an arbitrary pixel count of display-image data has been selected, the controller 150 creates an image file from captured image data and display-image data with the preliminarily-selected pixel count. The controller 150 stores the created image file in the memory card 108 or the internal memory 109.

This arrangement enables the user to select images to be displayed which match the pixel count of the display device which the user uses most frequently. Further, since only display-image data with the pixel count selected by the user are recorded, the memory can be saved more in comparison with cases where there are plural pieces of display-image data having different pixel counts.

The header part G31 of the multiple image file G30 in FIG. 15 stores information about the pixel count (the image size) of the display-image data. With this arrangement, the controller 150 can recognize the pixel count (the image size) of the display-image data, only by referring to the header part G31.

Further, in the present embodiment, the user selects only a single pixel count of display-image data and the controller 150 creates display-image data having the selected pixel count. However, it is not necessarily required to this. For example, the user may select plural pixel counts of display-image data and the controller 150 may create plural pieces of display-image data having the selected plural pixel counts. Also, the controller 150 may create display-image data having preset plural pixel counts. In this case, the main header of an image file or the sub-image headers corresponding to each display-image data stores information about the pixel counts of the display-image data.

With this arrangement, in displaying image data on the display device, preliminarily-prepared display image data is displayed. Accordingly, it is possible to rapidly display image data which matches display devices having various pixel counts. Further, by storing, in the headers, information about the pixel counts of display-image data, the controller 150 can search for display image data which matches the pixel count of the display device, only by referring to the headers.

1-3. Reproduction Operation (Continuous Shooting Mode)

Figure 16:
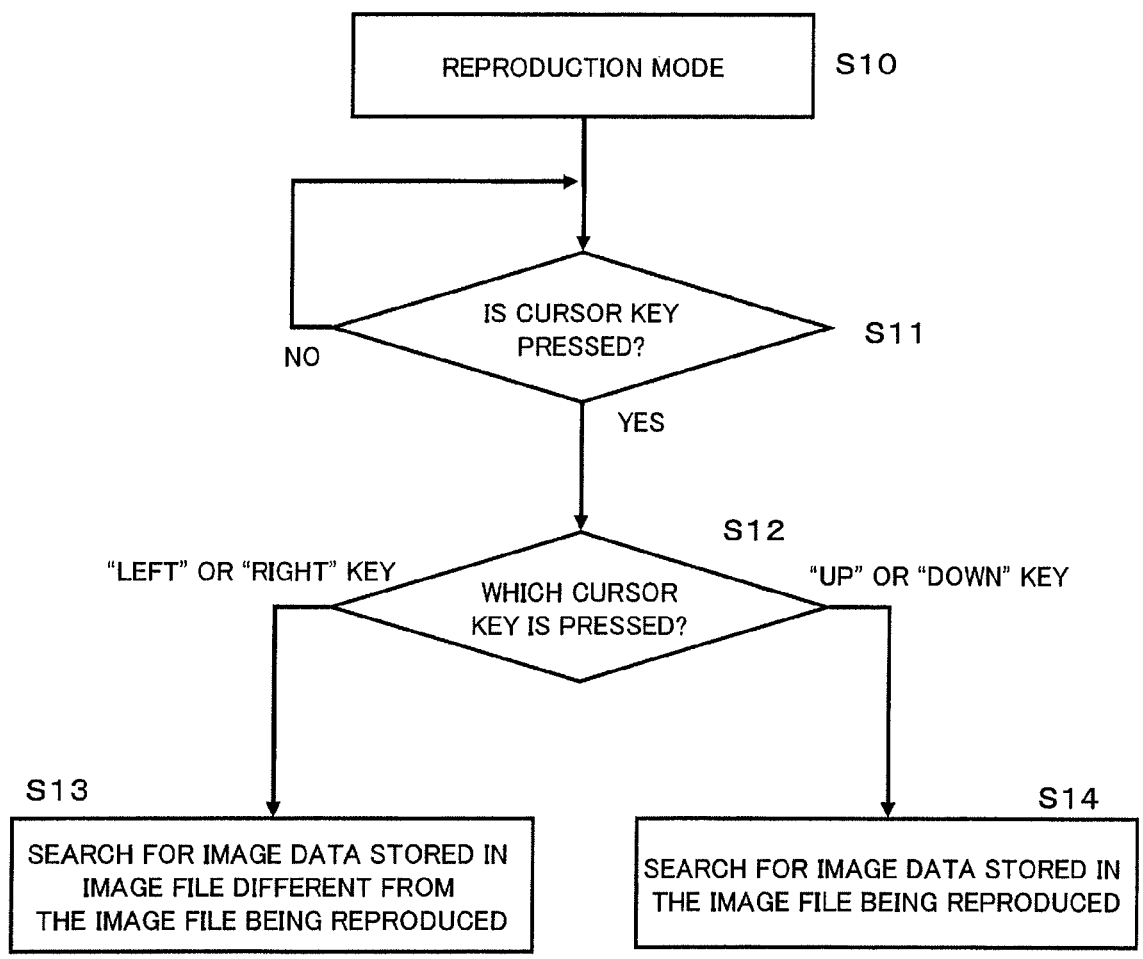
FIG. 16 is a flow chart illustrating a reproduction operation with the digital camera according to an embodiment of the present invention.
Figure 17:
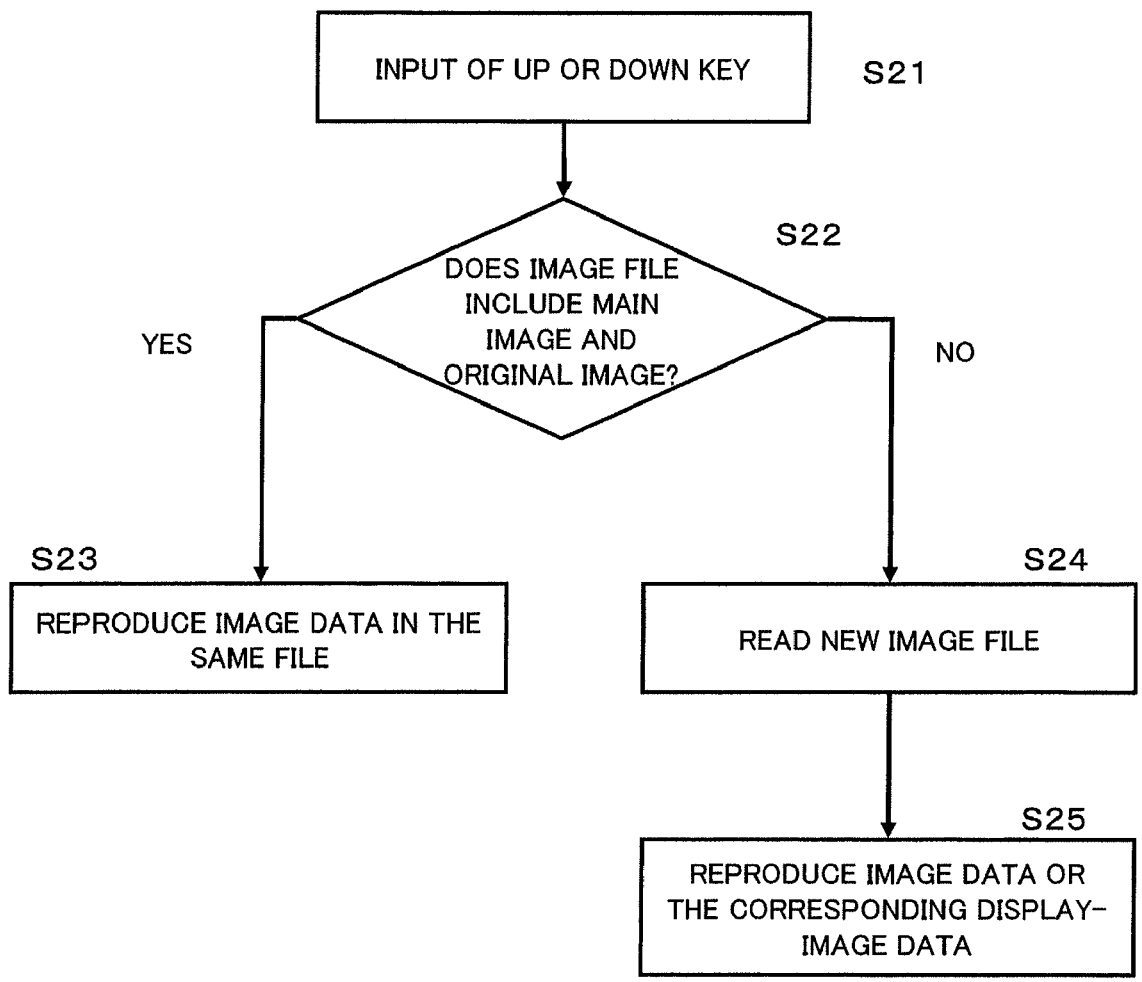
FIG. 17 is a flow chart illustrating a reproduction operation of the digital camera according to an embodiment of the present invention.
Figure 18:
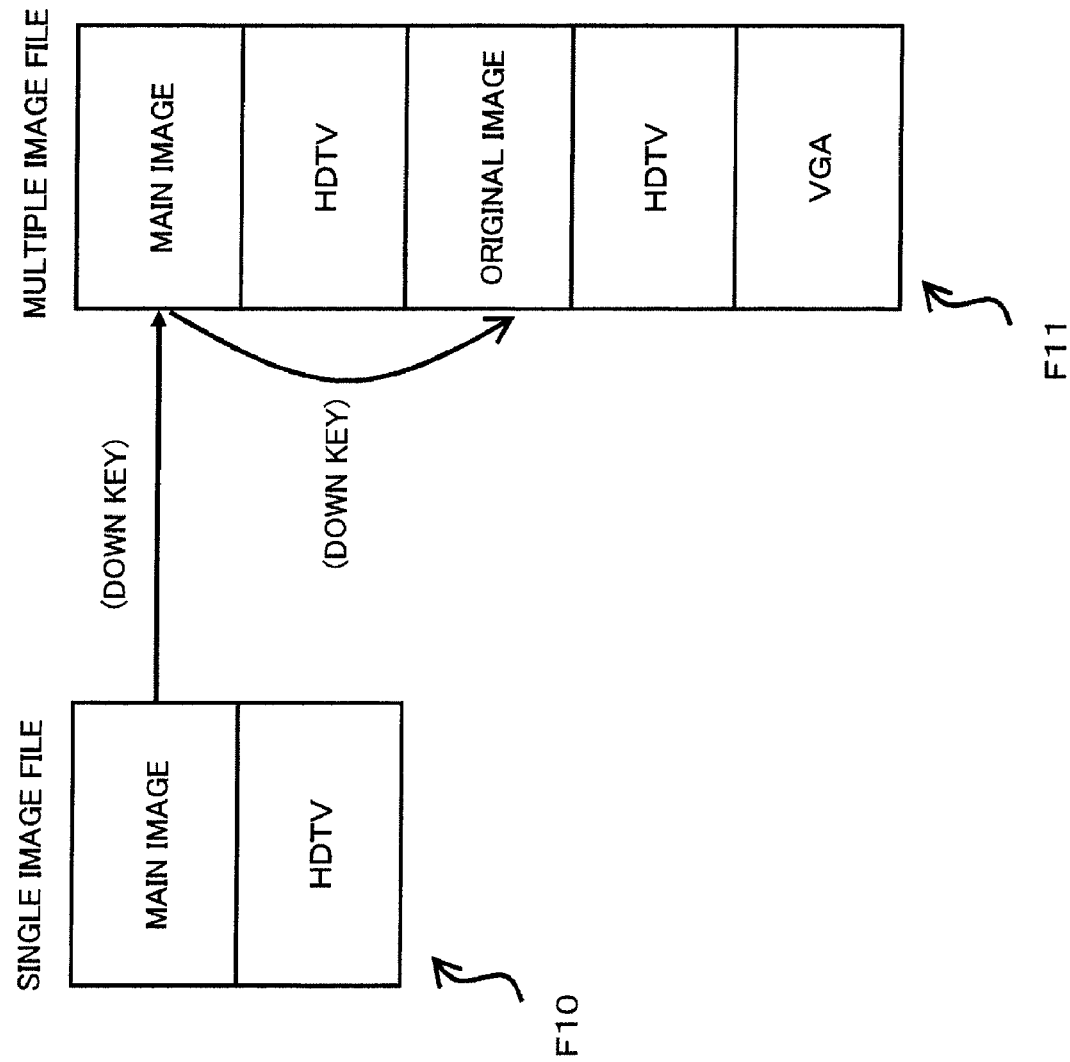
FIG. 18 is a schematic view illustrating transition of image data being reproduced, when receiving up/down operations on a cursor key.
Figure 19:
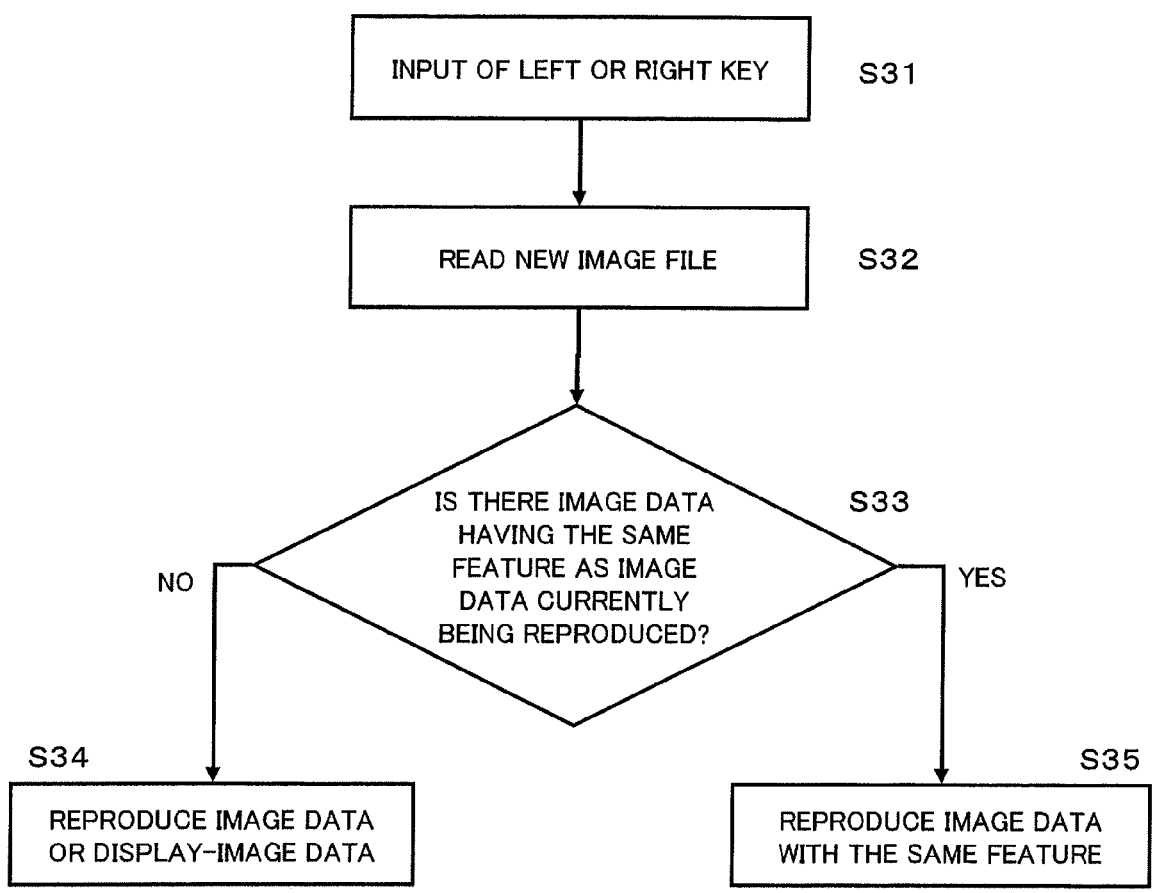
FIG. 19 is a flow chart illustrating a reproduction operation of the digital camera according to an embodiment of the present invention.
Figure 20:
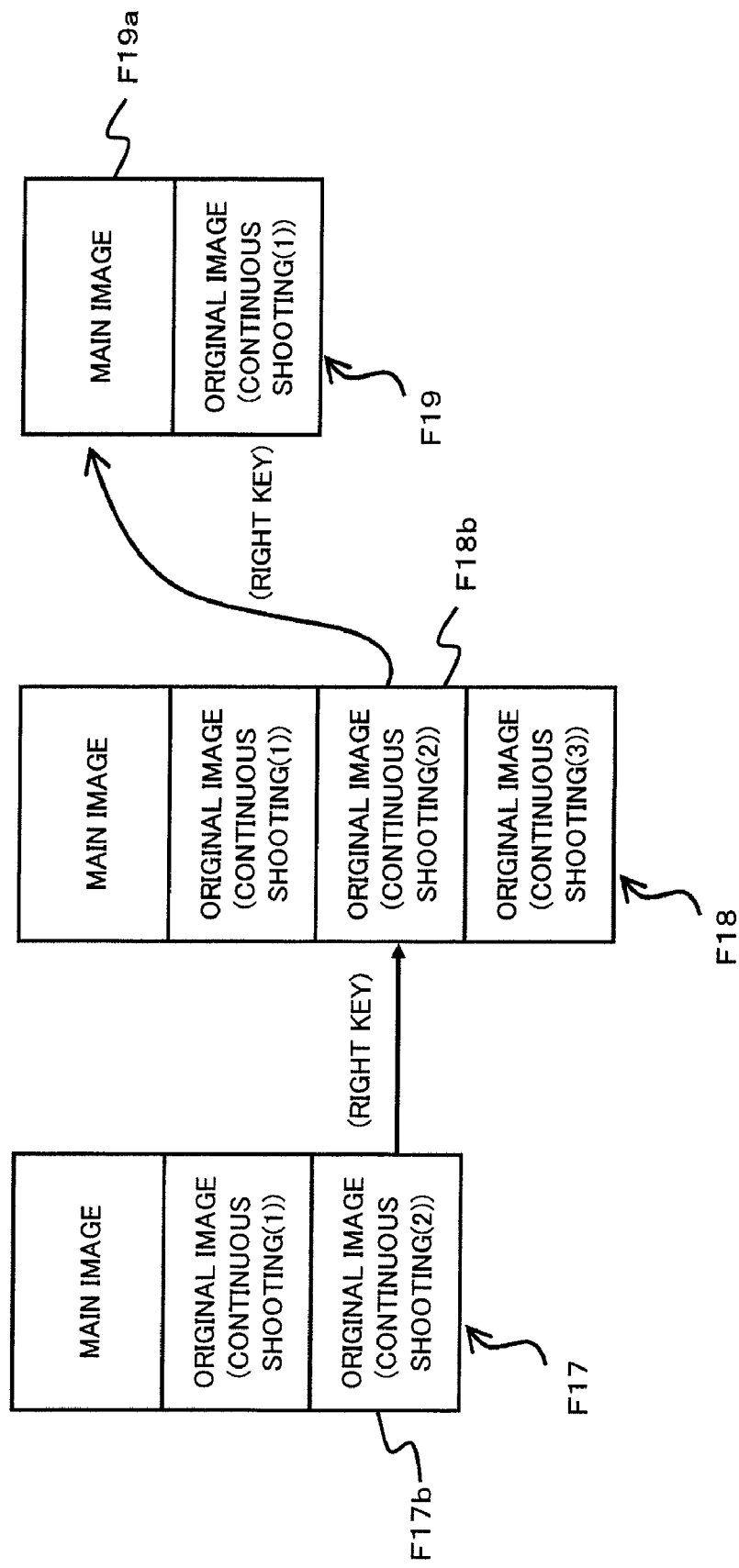
FIG. 20 is a schematic view illustrating transition of image data being reproduced, when receiving leftward/rightward operations on the cursor key.
Figure 21:
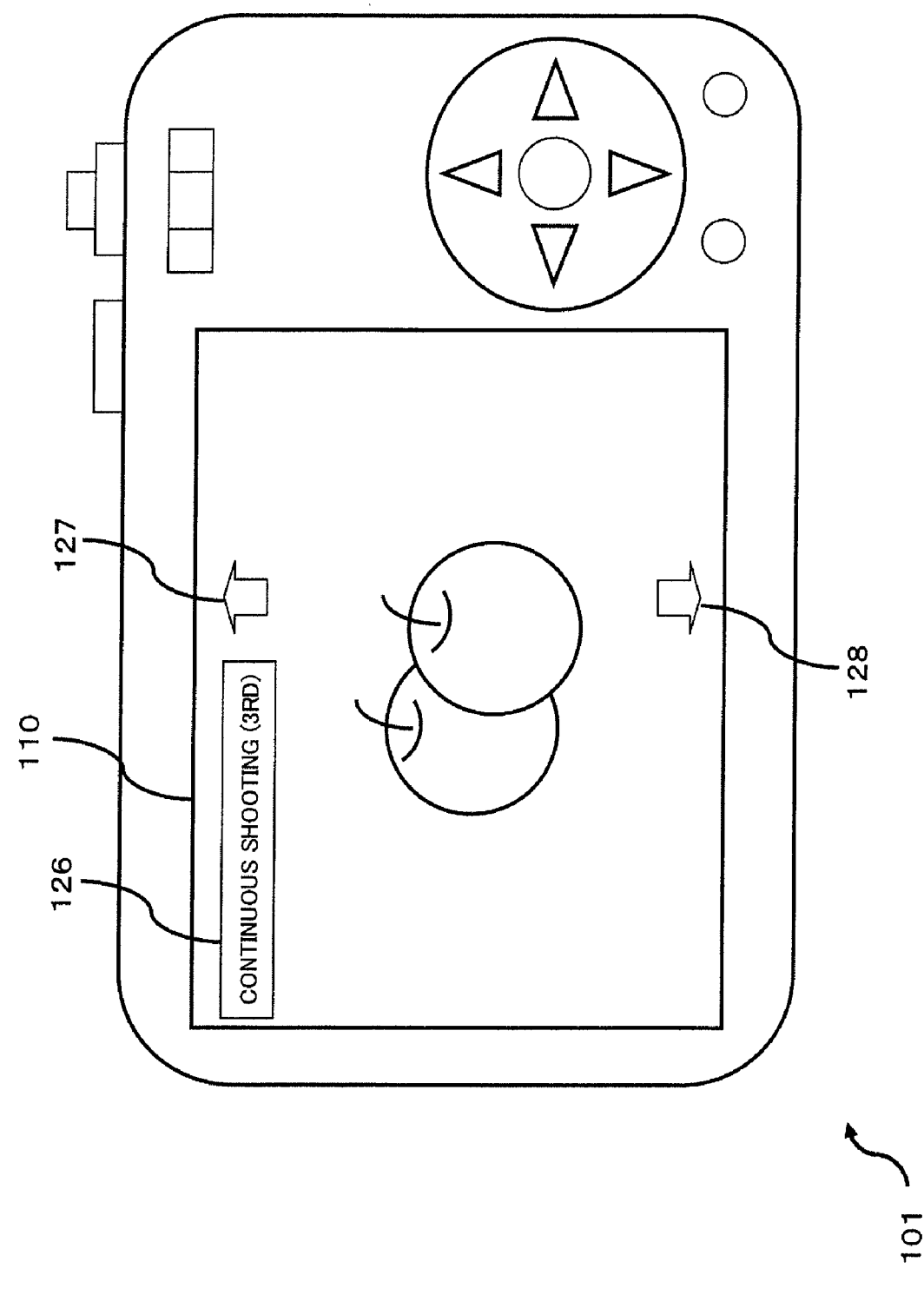
FIG. 21 is a schematic view of a screen which is displayed during reproduction by the digital camera according to an embodiment of the present invention.

With reference to FIGS. 16 to 21, there will be described an operation for reproducing image data with the digital camera 101 according to the first embodiment of the present invention. FIG. 16 is a flow chart illustrating a reproduction operation with the digital camera 101, according to user's operations on the cursor key. FIG. 17 is a flow chart illustrating a reproduction operation with the digital camera 101 according to user's up/down operations on the cursor key. FIG. 18 is a view illustrating transitions of image data to be reproduced by the digital camera 101 according to user's up/down operations on the cursor key. FIG. 19 is a flow chart illustrating a reproduction operation with the digital camera 101 according to user's leftward/rightward operations on the cursor key. FIG. 20 is a view illustrating transition of image data to be reproduced by the digital camera 101 according to user's leftward/rightward operations on the cursor key. FIG. 21 is a rear view of the digital camera 101 which is displaying, on the LCD monitor 110, single image data in an image file storing plural pieces of image data.

1-3-1. Operation for Reproducing Image Data

The digital camera 101 reproduces image data, when the user operates the mode dial 174 to set the digital camera to the reproduction mode.

When the digital camera is set to the reproduction mode, the controller 150 reads an image file storing image data to be reproduced, out of the image files stored in the memory card 108 or the internal memory 109. The controller 150 transfers the read image file to a decompression unit 164.

The decompression unit 164 decompresses the received image file and transfers the decompressed image file to the controller 150.

The controller 150 displays, on the LCD monitor 110, an image to be reproduced among the image data stored in the received image file. In this case, when the received image file stores display-image data which has a pixel count matching the pixel count of the LCD monitor 110 and which also corresponds to the image data to be reproduced, the controller 150 displays this display-image on the LCD monitor 110. On the other hand, when there is stored no display-image data having a pixel count matching that of the LCD monitor 110, the controller 150 causes the electronic zoom processing unit 165 to create image data having a pixel count which matches the pixel count of the LCD monitor 110, based on the main image data or the original image data. Then, the controller 150 causes the LCD monitor 110 to display the created image. Namely, the controller 150 reads the aforementioned stored image file from a storage medium capable of storing plural image files capable of storing plural pieces of image data and reproduces it.

Further, in cases where an external device (for example, an external display device such as a television or an external monitor) is connected to the digital camera 101 with or without wires through the communication unit 111, the controller 150 transmits the image data to be reproduced in the received image file, to the external device. In this case, similarly, it is determined whether image data to be displayed on the external device is newly created or not, depending on whether or not the received image file stores display-image data which matches the pixel count of the external device. When an external device is connected to the digital camera 101, image data can be displayed on either one or both of the LCD monitor 110 and the external device.

1-3-2. Flow of Reproduction Operation According to User's Operations on Cursor Key Next, there will be described the flow of operations with the digital camera 101 when the user generates a command for changing image data to be reproduced. During reproducing an image, the user can change the image data to be reproduced on the digital camera 101, by pressing any of the up, down, left and right keys 181 to 184 of the cursor key 180. Hereinafter, with reference to FIG. 16, the operations of the digital camera 101 in this case will be described.

When the user sets the digital camera 101 to the reproduction mode (S10), the digital camera 101 displays to-be-reproduced image data to be reproduced on the LCD monitor 110. Alternatively, when the digital camera 101 is connected to an external device through the communication unit 111, image data is outputted to the external device and is displayed on the external device.

Then, the controller 150 is on standby until the cursor key 180 is operated (S11). If the cursor key 180 is operated, the controller 150 determines whether the input key is the left/right keys 182 and 184 or the up/down keys 181 and 183 (S12).

If the controller 150 determines that the input key is the right key 182 or the left key 184, the controller 150 searches for image data stored in a new image file which is stored in the memory card 108 or the internal memory 109 (S13). More specifically, if the controller 150 determines that the input key is the right key 182, the controller 150 searches the memory card 108 or the internal memory 109 for an image file stored after the image file storing the image data being currently reproduced, and searches for image data stored in the searched image file. If the controller 150 determines that the input key is the left key 184, the controller 150 searches the memory card 108 or the internal memory 109 for an image file stored before the image file storing the image data being currently reproduced, and searches for image data stored in the searched image file. Namely, the right key 182 or the left key 184 functions as a key which generates a command for movement among image files. The processing performed when the input key is the right key 182 or the left key 184 will be described in more detail, later.

Further, if the controller 150 determines that the input key is the up key 181 or the down key 183, the controller 150 searches for other image data stored in the image file storing the image data being currently reproduced (S14). More specifically, if the controller 150 determines that the input key is the down key 183, the controller 150 searches the image file storing the image data being currently reproduced for image data stored after the image data being currently reproduced. If the controller 150 determines that the input key is the up key 181, the controller 150 searches the image file storing the image data being currently reproduced for image data stored before the image data being currently reproduced. Namely, the up key 181 or the down key 183 functions as a key which generates a command for movement among image data within the same image file. The processing which is performed when an input is performed on the up key 181 or the down key 183 will be described in more detail, later.

As described above, the present embodiment provides a structure in which, if the "left or right key" in the cursor key is pressed, image data stored in an image file different from the image file storing image data being currently reproduced is searched for, as image data to be reproduced next. Namely, the right key 182 and the left key 184 receive user's commands for selecting any one of the image files stored in the memory card 108 or the internal memory 109. The controller 150 reproduces predetermined image data, out of the image data stored in the selected image file, according to the operation on the right key 182 or the left key 184.

Further, if the "up or down key" in the cursor key is pressed, other image data stored in the image file storing the image data being currently reproduced is searched for, as image data to be reproduced next. Namely, the up key 181 and the down key 183 receive user's commands for selecting any one of image data stored in the image file selected through the operation on the right key 182 or the left key 184. The controller 150 reproduces the image data selected through the operation on the up key 181 or the down key 183, out of the image data stored in the image file selected through the operation on the right key 182 or the left key 184.

However, it is not necessarily required to employ the aforementioned arrangement, and the functions provided by pressing "the up and down keys" and pressing "the left and right keys" can be interchanged. Further, in the present embodiment, the "up key" is associated with the "down key" and the "left key" is associated with the "right key", as pairs. However, it is not necessarily required to employ the aforementioned arrangement. It is also possible to combine the "up key" and the "left key" with each other and combine the "down key" and the "right key" with each other, such that these combinations are assigned to respective functions. Further, while, in the present embodiment, the "up and down keys" and the "left and right keys" in the cursor key realize two operation units (means), it is not necessarily required to realize them with the cursor key. For example, it is also possible to provide a software key which offers two or more selection options, in such a way as to assign functions to the respective selection options offered by the software key for realizing two operation units.

As described above, in the present embodiment, two types of operation units which are the "up and down keys" and the "left and right keys" are provided, so that the other image data stored in the image file storing the image data being currently reproduced is reproduced according to pressing of the "up or down key", and image data stored in a new image file different from the image file storing the image data being currently reproduced is reproduced according to pressing of the "left or right key".

If there is only a single operation unit, in reproducing image data, the image data can be reproduced only in the order of storage in the memory card 108 or the internal memory 109. Further, in many cases, one image file stores plural pieces of image data substantially equal to one another which have been captured in the continuous shooting mode. In such cases, the users frequently consider that not all pieces of the image data are required to be reproduced. When reproducing image data frame by frame, with the structure according to the present embodiment, it is not necessary to reproduce all pieces of the image data stored in an image file, and it is possible to achieve frame advance reproduction by reproducing only a part of all pieces of image data stored in the image file.

1-3-3. Flow of Reproduction Operation According to User's Up/Down Operation on Cursor Key With reference to FIG. 17, there will be described the flow of detailed reproduction operations when the up key 181 or the down key 183 in the cursor key is pressed during reproducing image data.

In the present embodiment, user's operation on the up key 181 or the down key 183 means a command for changing the image data to be reproduced to different image data in the image file including the image data being currently reproduced.

If the up key 181 or the down key 183 is pressed (S21), the controller 150 determines whether or not the image file storing the image data being currently reproduced is a multiple image file (S22). The multiple image file is an image file storing main image data, and at least one piece of original image data. On the contrary, an image file including only main image data and no original image data is a single image file. Namely, the controller 150 determines whether the image file storing the image data being currently reproduced is a single image file (first image file) or a multiple image file (second image file). In this case, the controller 150 can determine the type of the image file by referring to the management table T10 stored in the header part D23 of the image file.

If the controller 150 determines that the image file storing the image data being currently reproduced is a multiple image file storing main image data and at least one original image data, the controller 150 reproduces other main image data or original image data stored in the image file storing the image data being currently reproduced (S23). In this case, when the image file storing the image data being currently reproduced stores display-image data corresponding to the main image data or original image data of which pixel count matches the pixel count of the external device connected to the LCD monitor 110 or the digital camera 101, this display-image data is reproduced (S23).

More specifically, if the up key 181 is pressed, the controller 150 reproduces the main image data, the original image data, or the display-image data corresponding to the main image data or the original image data, which is stored before the image data being currently reproduced. In this case, when the image data being currently reproduced is the main image data and there is no original image data stored before the image data being currently reproduced, the controller 150 reproduces the original image data or the display-image data corresponding to this original image data, which is stored at the rearmost portion of the image file storing the main image data being currently reproduced. However, it is not necessarily required to employ this arrangement. When there is no original image stored before the image data being currently reproduced, the controller 150 may reproduce original image data or the display-image data corresponding to this original image data, which is stored at the rearmost portion of the image file positioned before the image file storing the main image data being currently reproduced.

Further, if the down key 183 is pressed, the controller 150 reproduces the main image data, the original image data, or the display-image data corresponding to this main image data or this original image data, which is stored after the image data being currently reproduced. In this case, when there is no original image data stored after the image data being currently reproduced, the controller 150 reproduces the main image data or the display-image data corresponding to this main image data, which is stored in the image file storing the image data being currently reproduced. However, it is not necessarily required to employ this arrangement. When there is no original image stored after the image data being currently reproduced, the controller 150 may reproduce the main image data or the display-image data corresponding to the main image data which is stored in the image file stored after the image file storing the original image data being currently reproduced.

If the controller 150 determines that the image file storing the image data being currently reproduced is not a multiple image file, namely that it is an image file storing no original image data, the controller 150 reads a new image file different from the image file storing the image data being currently reproduced, from the memory card 108 or the internal memory 109 (S24).

More specifically, if the up key 181 is pressed, the controller 150 reads an image file stored before the image file storing the image data being currently reproduced, from the memory card 108 or the internal memory 109. If the down key 183 is pressed, the controller 150 reads an image file stored after the image file storing the image data being currently reproduced, from the memory card 108 or the internal memory 109.

After reading the new image file, the controller 155 reproduces the main image data, the original image data or the display-image data corresponding thereto, which is stored in the read image file (S25).

More specifically, if the up key 181 is pressed, the controller 150 reproduces the main image data, the original image data, or the corresponding display-image data, which is image data stored in the rearmost portion among the image data stored in the read image file. However, it is not necessarily required to employ this arrangement. It is enough to reproduce any image data out of the image data stored in the read image file.

Further, if the down key 183 is pressed, the controller 150 reproduces the main image data or the display-image data corresponding to the main image data, out of the image data stored in the read image file. However, it is not necessarily required to employ this arrangement. It is enough to reproduce any one of the image data stored in the read image file.

As described above, the controller 150 included in the digital camera 101 according to the present embodiment, on receiving press of the up key 181 or the down key 183 by the user, performs different controls as to reading of a new image file different from the image file storing the image data being currently reproduced, according to the type of the image file storing the image data being currently reproduced.

With this arrangement, on receiving a command for frame advance operation of image data, the digital camera 101 according to the present embodiment can decide whether or not a new image file should be read, only by referring to the information about the type of the image file which is stored in the header part D23 and the like. This permits speed-up of frame advance operation of image data.

Further, the controller 150 included in the digital camera 101 according to the present embodiment, upon receiving the up key 181 or the down key 183 input by the user, performs different controls regarding reproduction of different image data from the image data being currently reproduced which is stored in the image file including the image data being currently reproduced, according to the type of the image file storing the image data being currently reproduced. With this arrangement, the digital camera 101 according to the present embodiment, on receiving a command for frame advance operation of image data, can decide image data to be reproduced next, only by referring to the information about the type of the image file which is stored in the header part D23 and the like. This permits speed-up of frame advance operation of image data.

With reference to FIG. 18, there will be described an example of the flow of reproducing image data with the digital camera 101 when the down key 183 is pressed.

In the present example, the internal memory 109 stores an image file F10 which is a single image file, and an image file F11 which is a multiple image file, in this order. It is considered that image data is reproduced in this state. If the digital camera 101 is set to the reproduction mode, at first, image data created based on the main image data stored in the image file F10 is displayed on the LDC monitor 110. In this case, if the user presses the down key 183, the controller 150 reads the image file F11 located after the image file F10, as a new image file, since the image file F10 is a single image file. The controller 150 reproduces the main image data stored at the head of the read image file F11. Then, if the user presses the down key 183, the controller 150 reproduces the original image data stored after the main image in the image file F11, without reading a new image file, since the image file F11 is a multiple image file.

1-3-4. Flow of Reproduction Operation According to User's Left/Right Operation on Cursor Key With reference to FIG. 19 and FIG. 20, there will be described the detailed flow of reproduction operations when the right key 182 or the left key 184 in the cursor key is pressed during reproducing image data.

In the present embodiment, a user's operation on the right key 182 or the left key 184 means a command for changing the image data to be reproduced to image data stored in an image file different from the image file storing the image data being currently reproduced.

If the right key 182 or the left key 184 is pressed (S31), the controller 150 reads a new image file form the memory card 108 or the internal memory 109 (S32). Namely, the controller 150 reads an image file from a storage medium capable of storing image files capable of storing plural pieces of image data having different features. More specifically, if the right key 182 is pressed, the controller 150 reads an image file stored after the image file storing the image data being currently reproduced. If the left key 184 is pressed, the controller 150 reads an image file stored before the image file storing the image data being currently reproduced.

After reading the new image file, the controller 150 determines whether or not the new image file stores image data having the same feature as that of the image data being currently reproduced (S33). This processing will be described in more detail, below.

For example, it is assumed that the image file storing the image data being currently reproduced stores plural pieces of image data captured in the continuous shooting mode, and the image data being currently reproduced is the second image data captured in the continuous shooting. In this case, the controller 150 determines whether or not the newly-read image file stores image data having the feature of "the second image data in image data captured in the continuous shooting". More specifically, the controller 150 recognizes the features of respective image data by referring to the sub-image-data information T13 in the management table T10.

As the feature of images, EV value of an image may be used instead of the feature relating to the order of image data captured in continuous shooting. Namely, when an image file contains plural pieces of image data having different EV values, it is possible to use their EV values as feature of images and reproduce images having the same EV value by successively changing over among these images, according to the operation on the left or right key. Namely, it is possible to use an arbitrary feature, provided that it is a feature exhibited by image data.

If the controller 150 determines that the newly-read image file stores no image data having the same feature as that of the image data being currently reproduced, the controller 150 reproduces the main image data stored in the new image file (S34). In this case, the display-image data corresponding to the main image data can be reproduced, instead of the main image data.

If the newly-read image file stores image data having the same feature as that of the image data being currently reproduced, the controller 150 reproduces this image data having the same feature (S35).

As described above, in the present embodiment, the controller 150 controls the reproduction of image data, according to the result of the determination about the feature of the image data in the read image file. Namely, the controller 150 decides the image data to be reproduced next among the image data stored in the read new image file, according to the result of the determination as to whether or not the read image file stores image data having the same feature. Thus, it is possible to extract images while focusing on the feature of images, when searching for image data stored in different image files. This facilitates search for images.

In the present embodiment, if the controller 150 determines that the new image file stores image data having the same feature as that of the image data being currently reproduced, the controller 150 decides this image data having the same feature as image data to be reproduced next.

With this arrangement, it is possible to perform frame advance reproduction of only image data having the same feature in plural pieces of image data stored in an image file. This reproduction method would enable the user to extract images focusing on images with the same features, in searching for image data stored in different image files. This facilitates search for image data.

Further, in the present embodiment, when the right key 182 or the left key 184 is operated and if a newly-read image file stores image data having the same feature as that of the image data being currently reproduced, this image data is reproduced. However, it is not necessarily required to employ this arrangement. It is also possible to always reproduce main image data or the corresponding display image data, which is stored in the newly-read image file. With this arrangement, the digital camera 101 performs the same operations every time the right key 182 or the left key 184 is operated. This can prevent the user from being confused by reproduction operations with the digital camera 101.

With reference to FIG. 20, there will be described an example of transition of reproduced images along with operations on the right key. It is assumed that the second original image data (the second image data captured through continuous shooting) in an image file F17 is reproduced, at first. In this state, if the right key 182 is pressed, the controller 150 searches an image file F18 after the image file F17 for an original image F18*b* having the same feature as that of the original image data F17*b* (the second image captured in continuous shooting), then sets the original image F18*b* as an image to be reproduced and displays it. Then, if the right key 182 is pressed, the controller 150 searches the next image file F19 for an original image having the same feature as that of the original image data F17*b*. However, there is no original image having the same feature in the image file F19, and therefore the main image data F19*a* stored in the image file F19 is set as a to-be-reproduced image and then is displayed.

1-3-5. Screen Display During in Operation

Next, with reference to FIG. 21, there will be described the screen display for reproducing a multiple image file with the digital camera 101 according to the present embodiment.

When a multiple image file is reproduced, the LCD monitor 110 displays a mode indicator 126, an UP indicator 127 and a DOWN indicator 128, in addition to a captured image of an object, as illustrated in FIG. 21. In this case, the mode indicator 126 is an icon indicating the relationship between the image data and other image data which are stored in the multiple image file being currently reproduced. For example, in FIG. 21, the mode indicator 126 indicates that the image data being currently displayed is the third image data in the plural pieces of image data captured in continuous shooting which are stored in the same image file.

More specifically, the controller 150 reads a multiple image file to be reproduced, from the internal memory 109 or the memory card 108. Namely, the controller 150 reads all or some of the image files stored in a storage medium capable of storing one or more image files that can store plural pieces of image data and also include(s) predetermined relationship information indicative of the relationship among the plural pieces of image data. The controller 150 acquires sub-image-data information T13 in the management table T10 stored in the header part D23 of the read image file. Namely, the controller 150 acquires relationship information contained in the image file storing the image data to be reproduced. In reproducing the image file, the controller 150 outputs the sub-image-data information T13 (the relationship information) acquired on reproduction of the image file. Thus, the mode indicator 126 is displayed on the LCD monitor 110, along with the image data.

By displaying the mode indicator 126, the user can recognize that there are images relating to the image data being currently displayed in the same image file.

Further, the UP indicator 127 is an icon indicating that there is image data stored before the image data being currently reproduced in the same image file. The DOWN indicator 128 is an icon indicating that there is image data stored after the image data being currently reproduced in the same image file.

By displaying the UP indicator 127 and the DOWN indicator 128, the user can recognize that there is other image data in the same image file before and after the image data being currently reproduced.

FIG. 21 shows that there are image data stored before and after the image data being currently displayed. For example, when no image data is stored before the image data being currently displayed, the UP indicator 127 is not displayed.

In the present embodiment, the UP indicator 127 and the DOWN indicator 128 are icons indicating that there are image data stored before and after the image data being currently reproduced, respectively, but they can be interchanged. Further, the UP display and the DOWN display are not required to have a triangular shape as the UP indicator 127 and the DOWN indicator 128 and to be placed at upper and lower positions, either. Namely, the UP display and the DOWN display can be any display capable of indicating the presence of image data before and after image data being currently reproduced, in the same file.

1-3-6. Optional Functions in Reproduction Operation

There will be described optional functions in reproduction operation of image data with the digital camera 101 according to the first embodiment of the present invention. The optional functions, particularly, rotation of image data being reproduced, change of the aspect ratio of image data, and settings for a slide show, will be described.

1-3-6-1. Rotation of Image Data

Figure 22:
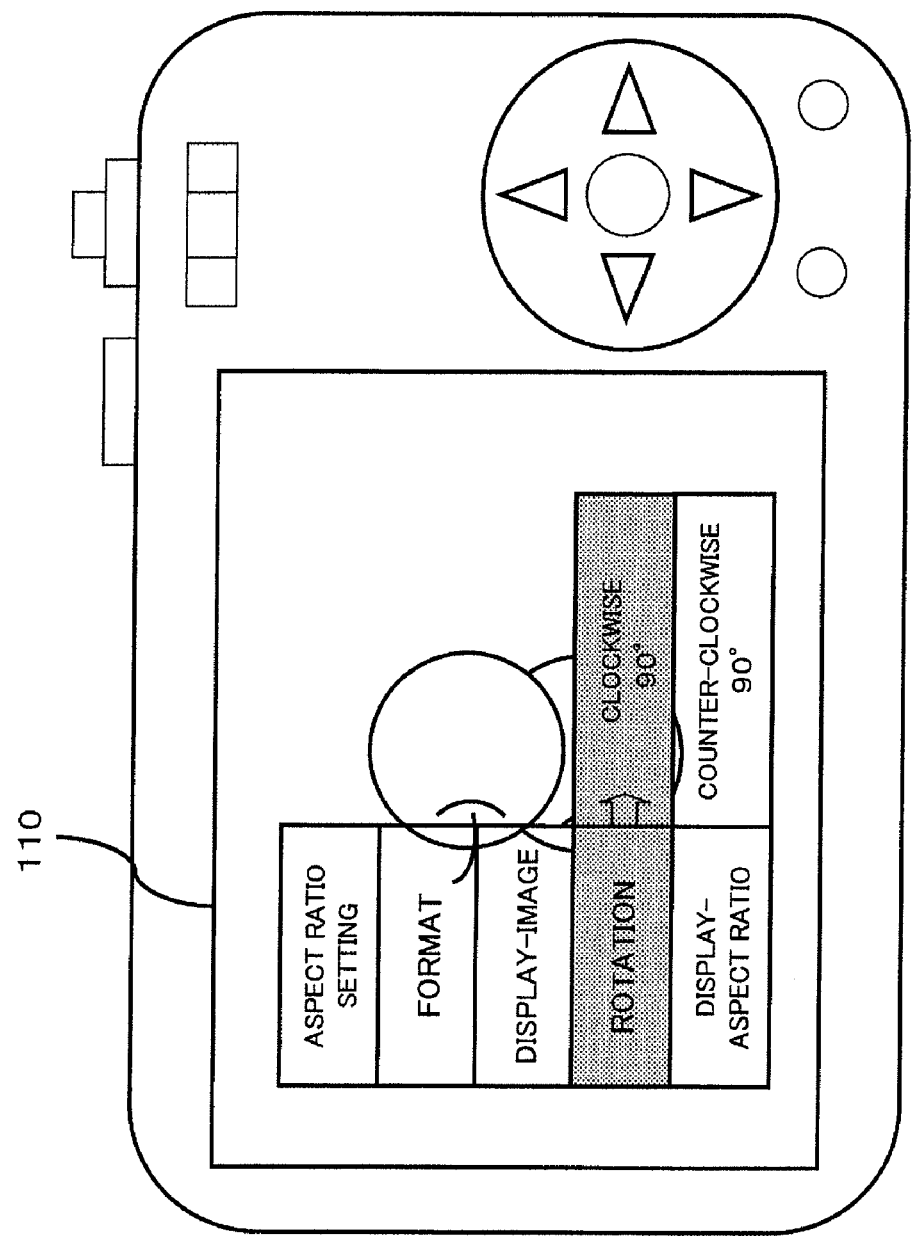
FIG. 22 is a schematic view of a selection screen for rotating image data.
Figure 23:
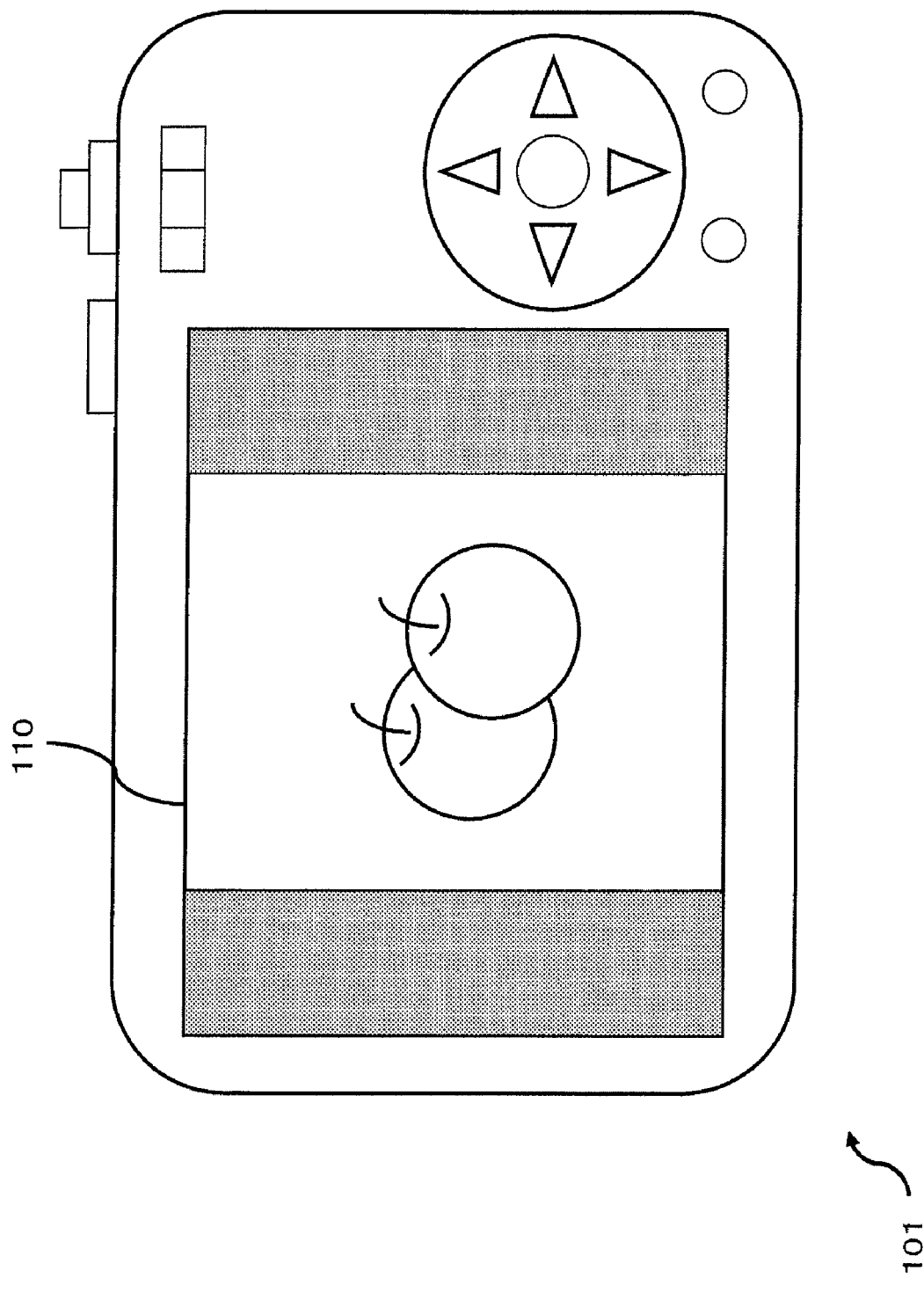
FIG. 23 is a schematic view of a state where rotated image data is displayed.
Figure 26:
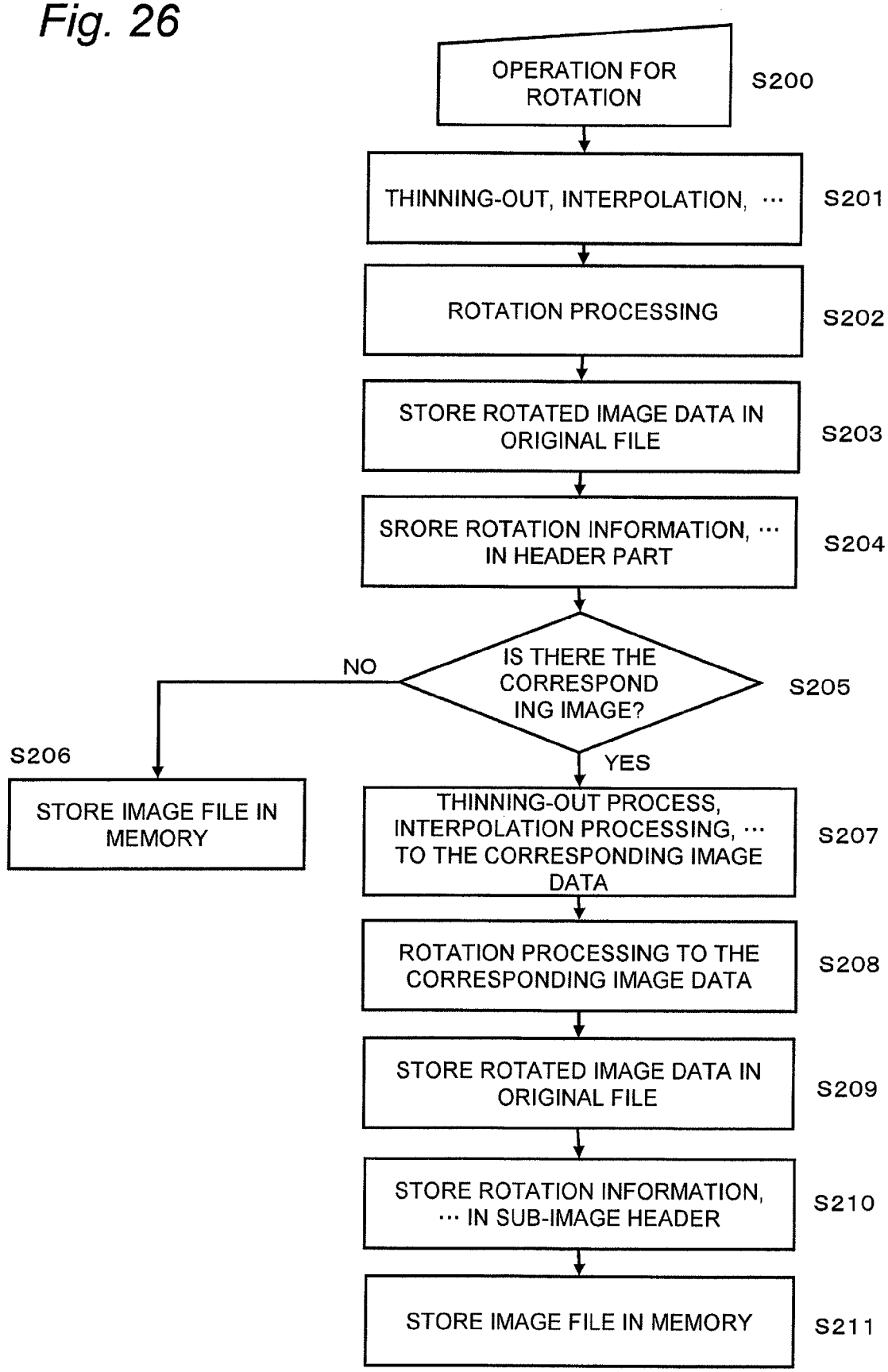
FIG. 26 is a flow chart illustrating an operation for rotating image data.

With reference to FIG. 22, FIG. 23 and FIG. 26, there will be described rotation of image data, during operations for reproducing image data with the digital camera 101 according to the first embodiment of the present invention. FIG. 22 is a view illustrating the back of the digital camera 101 displaying, on the LCD monitor 110, a selection menu for the rotation of image data and an image of an object which has not been rotated yet. FIG. 23 is a view illustrating the back of the digital camera 101 displaying, on the LCD monitor 110, an image of the object which has been rotated. FIG. 26 is a flow chart for rotating image data being reproduced, according to the present embodiment.

The LCD monitor 110 can display the image data being reproduced, with the image data rotated by a predetermined angle according to user's operation. The user selects direction (rightward or leftward) and amount of the rotation of the image data being currently reproduced (S200). For example, the user selects one of options for rotating the displayed image data, which include clockwise rotation by 90 degrees and counterclockwise rotation by 90 degrees.

After the direction and the angle of the rotation of image data are decided, the controller 150 applies image processing such as thinning-out processing and interpolation processing on the image data, such that the rotated image data falls within the LCD monitor 110 (S201). The controller 150 performs processing for rotating, by a predetermined angle in a predetermined direction, the image data which has been subjected to the image processing such as thinning-out processing and interpolation processing (S202). In this case, the rotation processing is pixel-position conversion processing for converting the horizontal pixel arrangement of the image data to a vertical pixel arrangement. The controller 150 stores the rotated image data in the original image file (S203). The controller 150 stores information indicating that the image data has been rotated and information about the angle of the rotation in the header corresponding to the rotated image data (S204).

Next, in the case where the image data which has not been rotated yet is main image data or original image data, the controller 150 determines whether or not there is the corresponding display-image data corresponding thereto (S205). In the case where the image data which has not been rotated yet is display-image data, the controller 150 determines whether or not there is the corresponding main image data or original image data (S205).

If there is not such image data, the image file storing the created image data after rotation is recorded in the memory card 108 (S206).

If there is such image data, the controller 150 applies, to this image data, the same image processing such as thinning-out processing and interpolation processing as that applied to the main image data or original image data or display-image data (S207). The controller 150 applies rotation processing in a predetermined direction by a predetermined angle to the main image data or original image data, or the display-image data, which has been subjected to the image processing such as thinning-out processing and interpolation processing (S208). The controller 150 stores, in the original image file, the main image data or original image data, or the display-image data, which has been rotated (S209). The controller 150 stores information indicating that the image data has been rotated and information about the angle of rotation in the header corresponding to the rotated image data (S210). The controller 150 records, in the memory card 108, the image file storing the created image data after rotation (S211).

Referring to FIG. 22, if clockwise rotation of the image data by 90 degrees is selected, the LCD monitor 110 displays image data as illustrated in FIG. 23.

In the present embodiment, when rotation processing is applied to main image data or original image data, rotation processing is also applied to the display-image data corresponding to the main image data or the original image data to be subjected to the rotation processing and stored in the same image file.

With this arrangement, if rotation processing is applied to main image data or original image data, rotation processing is also applied to the display-image data, along therewith. This prevents the occurrence of a difference in inclination (angle) between the main image data or original image data and the display-image data. This enables the user to perform rotation processing on image data, without taking into consideration the type of image data (main image data, original image data or display-image data).

Further, in the present embodiment, when there are stored plural pieces of display-image data corresponding to main image data or original image data, if one piece of display-image data is rotated, the other pieces of display-image data are also subjected to rotation processing, along therewith. For example, it is assumed that there are provided display-image data to be displayed on a television and display-image data to be displayed on the LCD monitor of the digital camera, as display-image data for one piece of main image data or original image data. In this case, if the display-image data to be displayed on the LCD monitor of the digital camera is rotated on the monitor of the digital camera, the display-image data to be displayed on a television is also rotated.

With this arrangement, if one piece of display-image data is rotated, rotation processing can be also applied to the other pieces of display-image data along therewith. This can prevent the occurrence of a difference in inclination between predetermined display-image data and other display-image data. This enables the user to rotate image data, without taking into consideration the type of image data (display-image data for TV, display-image data for a monitor of the digital camera, and the like).

Further, if the rotation of display-image data will increase the pixel count of the display-image data after the rotation, the rotated display image data can be created based on main image data or original image data.

With this arrangement, it is possible to prevent the image quality of image data from being gradually degraded along with repeated rotations of the image data.

1-3-6-2. Change of Aspect Ratio

Figure 24:
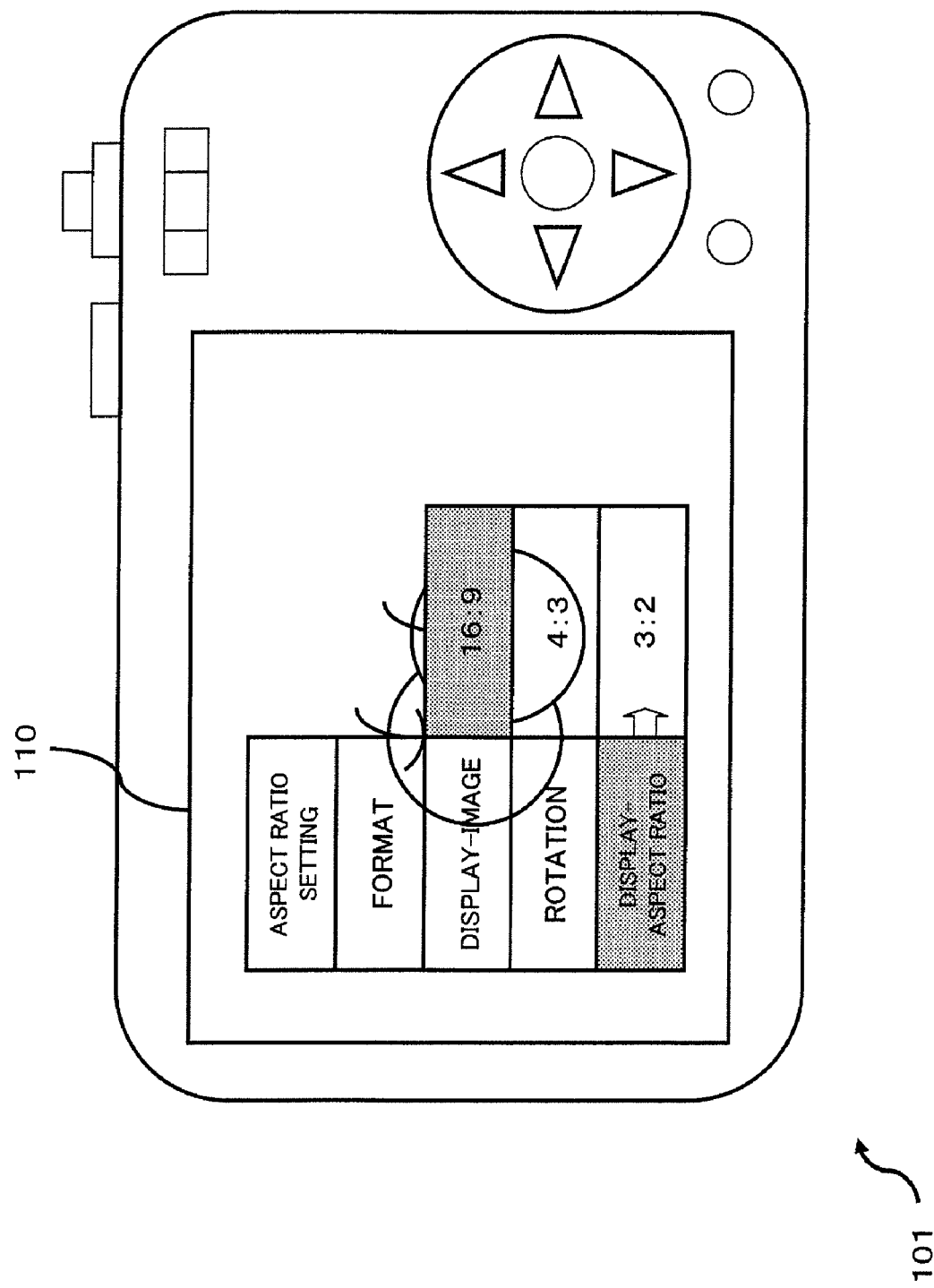
FIG. 24 is a schematic view of a screen for setting the aspect ratio.
Figure 25:
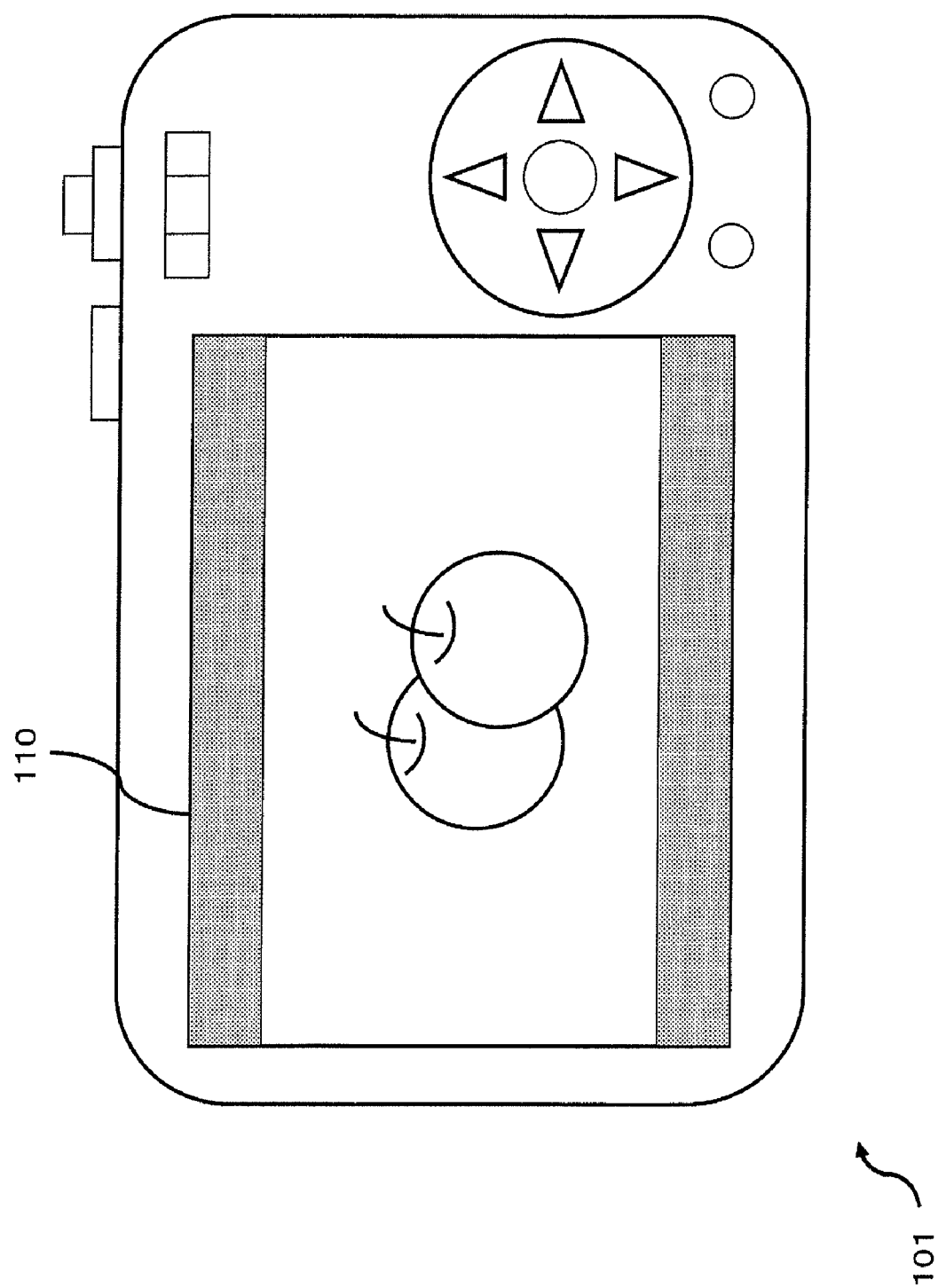
FIG. 25 is a schematic view illustrating a state of the display after changing the aspect ratio.
Figure 27:
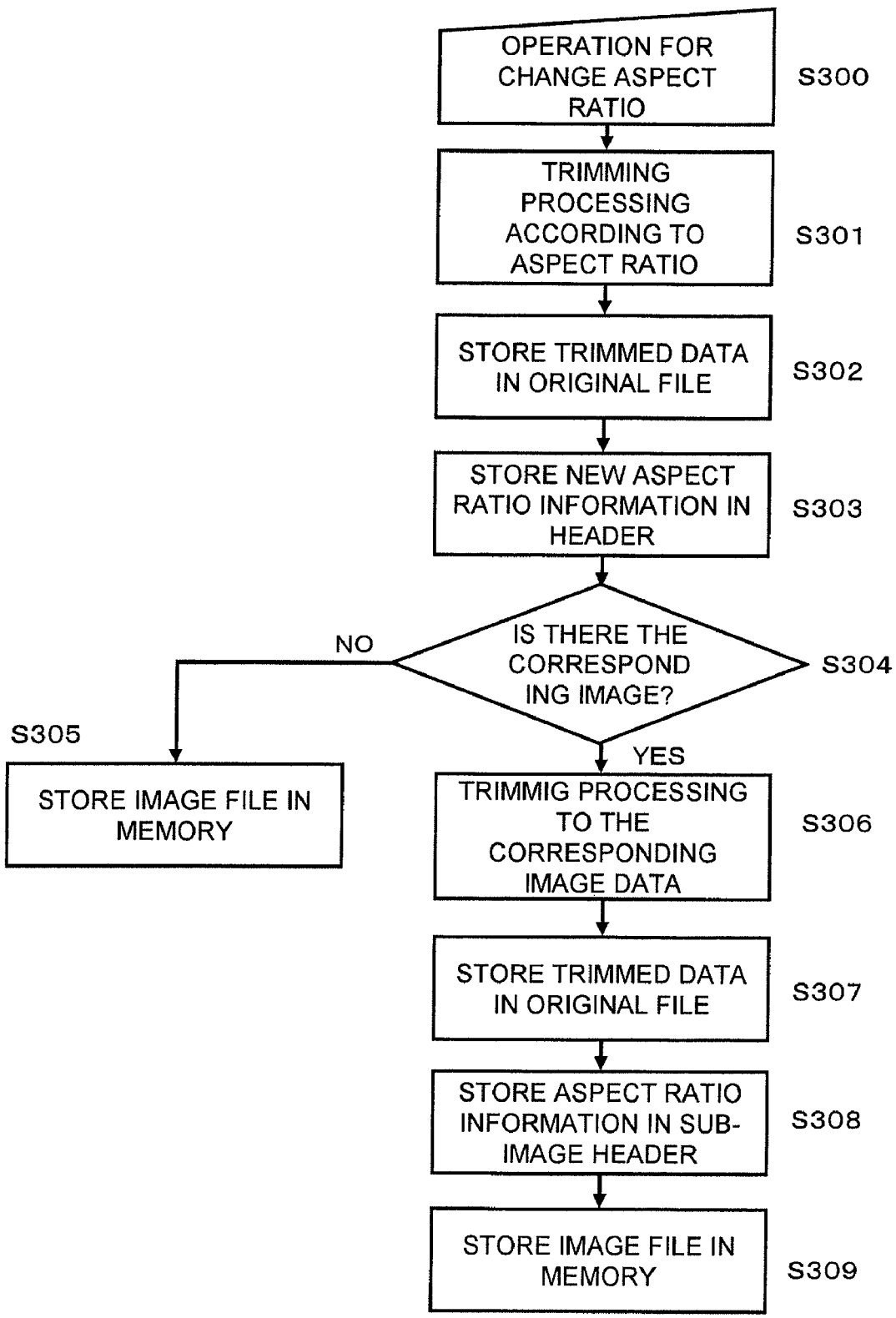
FIG. 27 is a flow chart illustrating an operation for changing the aspect ratio of image data.

With reference to FIG. 24, FIG. 25 and FIG. 27, there will be described changing of the aspect ratio, during operations for reproducing image data with the digital camera 101 according to the first embodiment of the present invention. FIG. 24 is a view illustrating the back of the digital camera 101 displaying, on the LCD monitor 110, a selection menu for changing the aspect ratio of image data and an image of a subject before change of aspect ratio. FIG. 25 is a view illustrating the back of the digital camera 101 displaying, on the LCD monitor 110, an image of the subject after change of aspect ratio. FIG. 27 is a flow chart for changing the aspect ratio during reproducing image data, according to the present embodiment.

The LCD monitor 110 can display image data being reproduced, with the changed aspect ratio of the image data, according to user's operations. The user selects an aspect ratio of image data to be changed, through the menu screen illustrated in FIG. 24 (S300). For example, the user selects one aspect ratio from 16:9, 4:3, and 3:2, as illustrated in FIG. 24.

According to user's operations for changing the aspect ratio, the electronic zoom processing unit 165 performs trimming on main image data, original image data, or display-image data (S301). Thus, the electronic zoom processing unit 165 creates image data having the aspect ratio required by the user. The controller 150 stores the image data having the changed aspect ratio in the original image file (S302). In this case, the controller 150 deletes the image data having the not-changed aspect ratio, and instead thereof stores the image data having the changed aspect ratio. The controller 150 stores information about the aspect ratio of the image data after the change in the header corresponding to the image data having the changed aspect ratio (S303). In this way the aspect ratio of image data can be changed. This arrangement realizes operation for reproducing image data according to user's preference and the aspect ratio of the display device.

Next, in the case where the image data having the changed aspect ratio is main image data or original image data, the controller 150 determines whether or not there is display-image data corresponding thereto (S304). In the case where the image data having the changed aspect ratio is display-image data, the controller 150 determines whether or not there is other image data corresponding thereto (S304).

If there is no corresponding image data, the image file storing the created image data having the changed aspect ratio is recorded in the memory card 108 (S305).

If there is corresponding image data, the controller 150 applies, to this image data, trimming processing for changing the aspect ratio thereof similarly to changing the aspect ratio of the main image data, original image data, or display-image data (S306). The controller 150 stores, in the original image file, the corresponding image data which has been subjected to the trimming processing (S307). The controller 150 stores information about the aspect ratio of the image data, in the sub-image header corresponding to the corresponding image data having the changed aspect ratio (S308). The controller 150 records the image file storing the created image data with the changed aspect ratio in the memory card 108 (S309).

By changing the aspect ratio of the display-image data along with change in the aspect ratio of main image data or original image data, it is possible to prevent the occurrence of a difference in aspect ratio between the main image data or original image data and the display-image data. Namely, when the aspect ratio of the main image data or original image data is changed, the aspect ratio of the display-image is always changed. This enables the user to change the aspect ratio of image data without taking into consideration the type of image data (main image data, original image data, or display-image data).

By employing an arrangement in which, when the aspect ratio of one display-image data is changed, the aspect ratios of the other display-image data are changed along therewith, it is possible to prevent the occurrence of a difference in aspect ratio between the one display-image data and the other display-image data. Namely, when the aspect ratio of one display-image data is changed, the aspect ratios of the other display-image data are also changed. This enables the user to change the aspect ratio of image data without taking into consideration of the type of image data (for example, display-image data having different pixel counts).

In the present embodiment, when the aspect ratio of image data stored in an image file is changed, the image data having the aspect ratio before changing is deleted and the image data having the changed aspect ratio is stored. However, it is not necessarily required to employ this arrangement. When the aspect ratio is changed, the image data having the aspect ratio before changing may remain and the image data having the changed aspect ratio may be additionally stored. With this arrangement, image data having plural aspect ratios are stored in one image file. As a result, after changing the aspect ratio, it is possible to facilitate restoration of the image data having the aspect ratio before changing.

1-3-6-3. Setting of Slide Show

Figure 28:
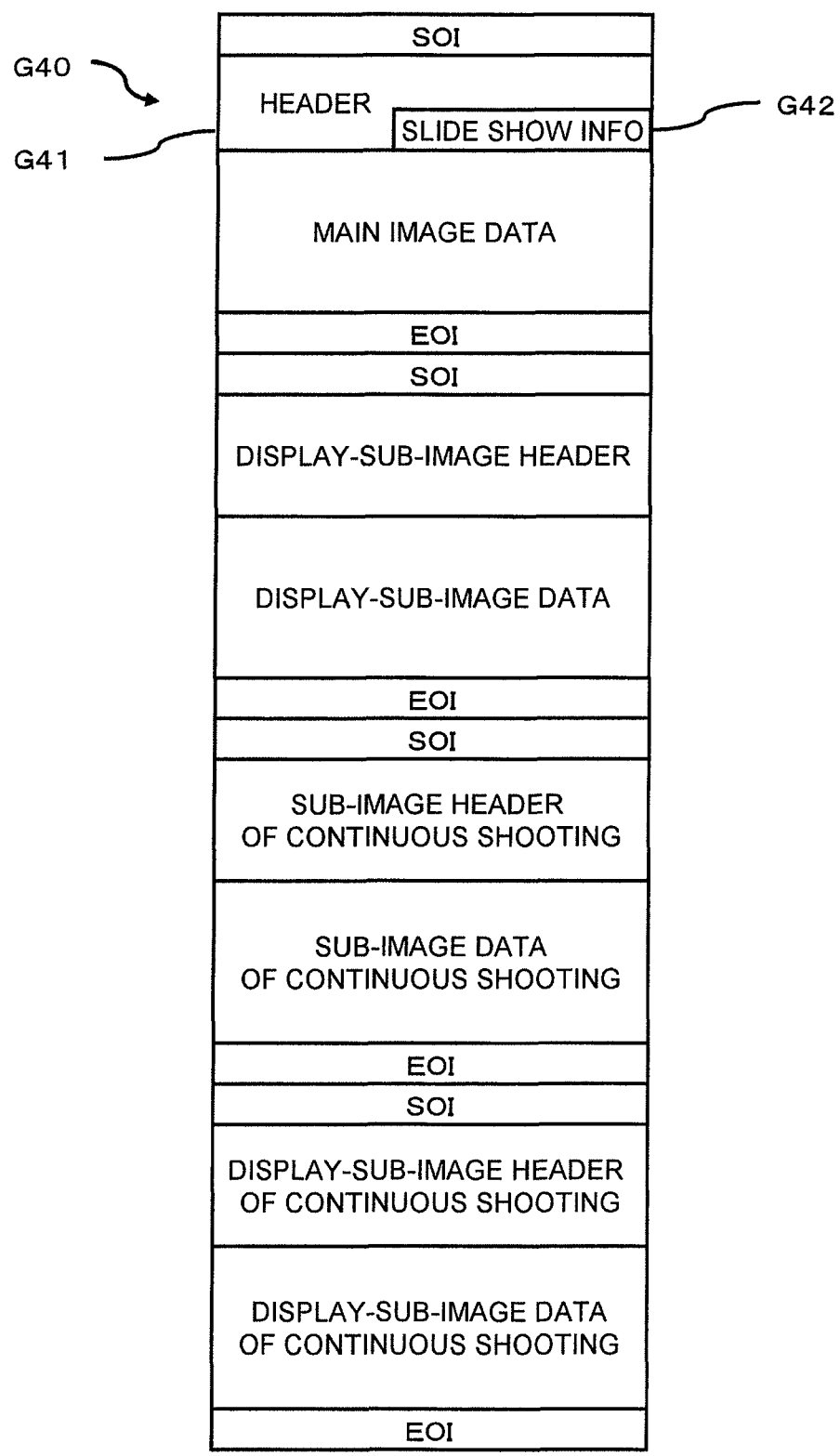
FIG. 28 is a schematic view of a multiple image file.

With reference to FIG. 28, there will be described a setting of a slide show in the digital camera 101 according to the first embodiment of the present invention. FIG. 28 is a schematic view of an image file created by capturing two image data in the continuous shooting mode, on which a setting of a common slide rendering is made for all pieces of image data in the image file. The term "slide show" refers to automatic reproduction of image data on the monitor. In reproduction, a rendering such as wipe can be also added as slide rendering. The method for controlling the slide show is similar to those in the prior art and thus it will not be described here. In the present embodiment, the user can set a slide rendering for image data in a slide show. If the user sets a slide rendering for predetermined image data, the controller 150 stores slide-rendering information in the header part corresponding to the predetermined image data. The user sets the slide-rendering information through a menu screen. On performing the slide show of the image data, the controller 150 realizes the slide rendering set by the user, by referring to the slide-rendering information stored in the header part. For example, it is assumed that the header part corresponding to a predetermined image file stores slide-show information indicating that fade-in is performed when displaying on the monitor the respective image data stored therein. In this situation, the controller 150 fades in the respective image data on the monitor by referring to the header part, when reproducing the image file.

This arrangement enables the user to set a specific slide rendering for each image file.

Particularly, it is possible to collectively perform the same slide rendering on all pieces of image data which are stored in the same image file and closely linked to each other. For example, by storing information G42 indicating that high-speed fade-in and fade-out should be performed, as slide-rendering information, in the header part G41 of an image file storing two image data captured through continuous shooting, as illustrated in FIG. 28, it is possible to realize high-speed fade-in and fade-out for all pieces of the image data in the same image file.

1-4. Editing

There will be described editing of image data with the digital camera 101 according to the first embodiment of the present invention.

1-4-1. Deletion of Image Data

Figure 29:
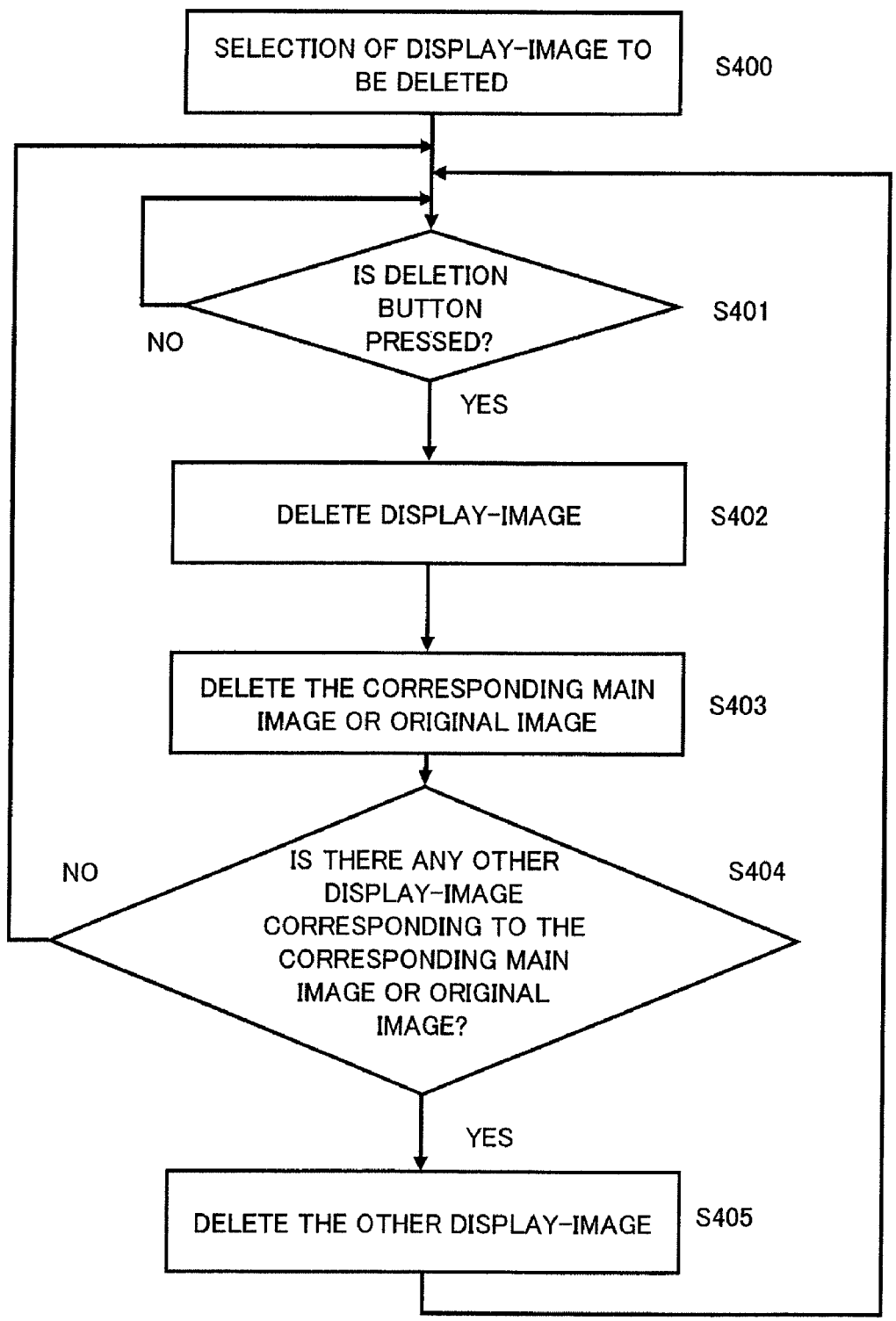
FIG. 29 is a flow chart of an operation for deleting image data by the digital camera according to an embodiment of the present invention.
Figure 30:
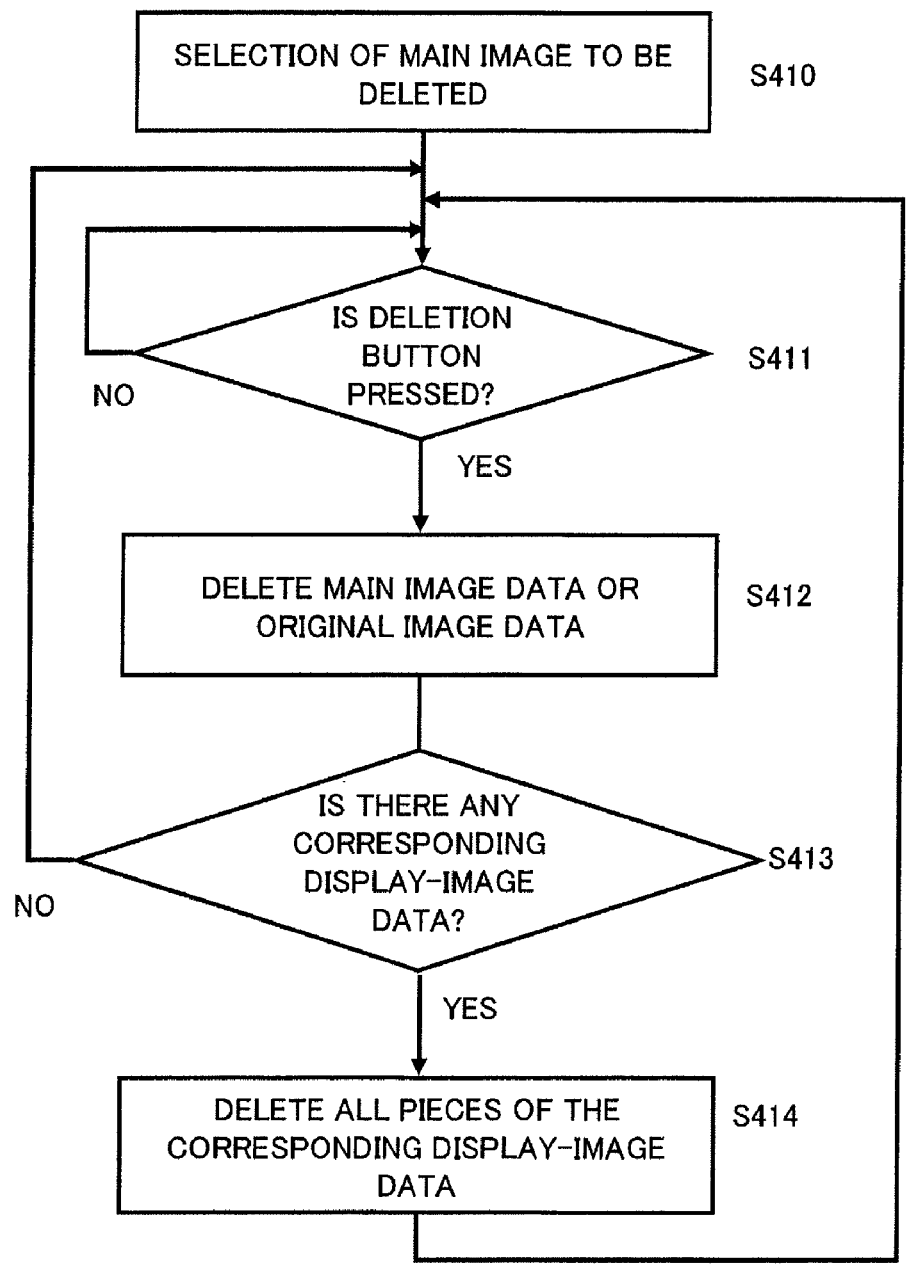
FIG. 30 is a flow chart illustrating an operation for deleting image data.
Figure 31:
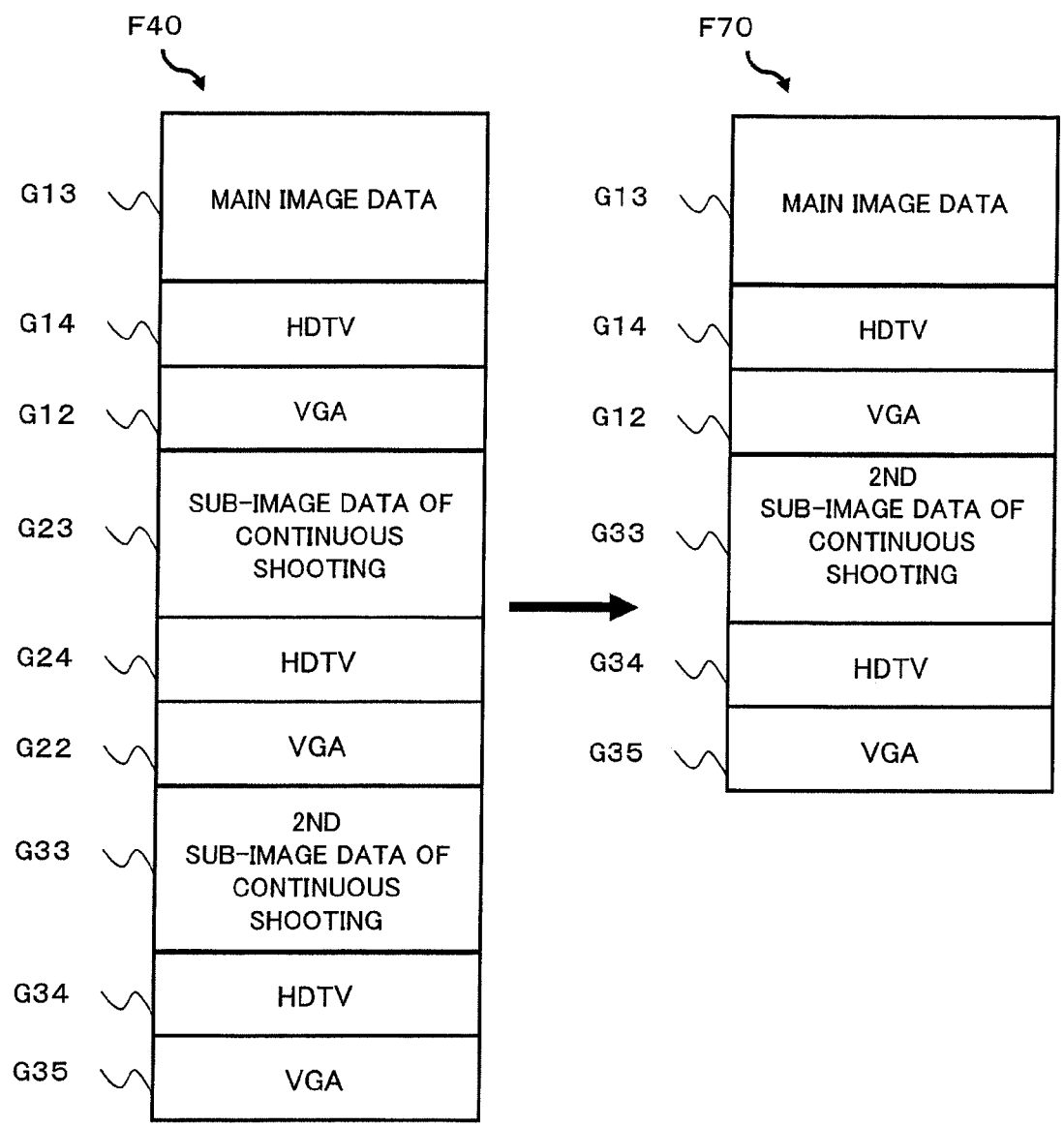
FIG. 31 is a schematic view illustrating the change of an image file when image data is deleted from the image file.

With reference to FIGS. 29 to 32, there will be described deletion of image data with the digital camera 101 according to the first embodiment of the present invention. FIG. 29 is a flow chart illustrating the operation of the digital camera 101 when the user selects display-image data as data to be deleted, according to the present embodiment. FIG. 30 is a flow chart illustrating the operation of the digital camera 101 when the user selects main image data or original image data, as data to be deleted, according to the present embodiment. FIG. 31 is a schematic view illustrating a multiple image file before and after the deletion of some of all pieces of image data from the multiple image file, according to the present embodiment.

In the present specification, deletion of image data can be made either a method of physically deleting image data by completely erasing information about the image data to be deleted from a memory, or a method of logically erasing the image data by releasing address of the memory at which information about the image data to be deleted is stored for causing the image data to be overwritten.

Further, the storage medium can be the internal memory 109 incorporated in the digital camera 101 or the memory card 108 which can be attached and detached to and from the digital camera 101.

1-4-1-1. Control when Display-Image Data is Selected as Data to be Deleted

With reference to FIG. 29 and FIG. 31, there will be described operation of the digital camera 101 when the user selects display-image data as data to be deleted.

The user can select image data to be deleted, by operating the cursor key 180, when the digital camera 101 is set to the image-data reproduction mode (S400). Namely, the user can generate a command for selecting any of image data in an image file, by operating the cursor key 180. In this case, if the image file stores display-image data having the same pixel count as that of the LCD monitor 110, the LCD monitor 110 displays the display-image data. Accordingly, in this case, the user selects display-image data as image data to be deleted. Hereinafter, there will be described a case where display-image data is selected as image data to be deleted.

If image data to be deleted is selected, the controller 150 is on standby until the deletion button 186 is pressed (S401). When the deletion button 186 is pressed, the controller 150 deletes the display-image data selected by the user (S402). Namely, the controller 150 deletes image data in an image file stored in a storage medium as image data storing one or more image files capable of storing main image data, one or more pieces of original image data and one or more pieces of display-image data. More specifically, the controller 150 accesses the internal memory 109 or the memory card 108 and deletes information about the selected display-image data, from the management table contained in the image file storing the selected display-image data.

Further, the controller 150 also deletes the main image data or the original image data which is the basis of the deleted display-image data (S403). In the present embodiment, the main header part of an image file stores information which associates main image data or original image data with the display-image data created from the main image data or the original image data. By referring to this information, the controller 150 can easily search for and delete the main image data or the original image data which is the basis of the selected display-image data. Namely, the main image data is stored in an image file together with one or more pieces of display-image data created based on the main image data, while associating the main image data with the display-image data. Further, the original image data is stored in an image file together with one or more pieces of display-image data created based on the original image data, while associating the original image data with the display-image data. Accordingly, the controller 150 can delete the image data which is instructed or selected to be deleted by the user pressing the deletion button 186, and the image data corresponding to the instructed image data. More specifically, the controller 150 deletes information about the main image data or original image data which is the basis of the deleted display-image data, from the management table.

After deleting the main image data or original image data which is the basis of the deleted display-image data, the controller 150 determines whether or not there is other display-image data created based on the main image data or original image data (S404).

If the controller 150 determines that there is no other display-image data, the controller 150 restructures the FAT, logically reconfigures the image file, and subsequently is on standby until the user presses the deletion button 186.

If the controller 150 determines that there is the other display-image data, the controller 150 deletes all pieces of display-image data created based on the main image data or original image data (S405). Namely, when the deletion button 186 is pressed and the controller 150 receives the instruction for selecting image data by the user, the controller deletes the image data indicated by the instruction, and the corresponding image data to the image data indicated by the instruction. More specifically, the controller 150 deletes information about all other display-image data corresponding to the display-image data indicated by the received user's instruction for selecting, from the management table.

After deleting the other display-image data, the controller 150 restructures the FAT, logically reconfigures the image file, and subsequently is on standby until the user presses the deletion button 186.

For example, it is considered that an HDTV thumbnail G24 which is display-image data is deleted from a multiple image file F40, as illustrated in FIG. 31. When the HDTV thumbnail G24 is deleted from the multiple image file F40, the sub-image data G23 captured in the continuous shooting which is the basis of the HDTV thumbnail G24 and a VGA thumbnail G25 which is another display-image data created based on the sub-image data G23 captured in the continuous shooting are deleted along with the deletion of the HDTV thumbnail G24. Thus, the structure of the image file is changed from the multiple image file F40 to a multiple image file F70.

In the present embodiment, when deletion of display-image data is selected, the main image data or original image data which is the basis of the display-image data is also deleted together with the selected display-image data. This can avoid a situation in which, even though the user has selected the image data to be deleted on a LCD monitor or a TV monitor and supposes that the main image data or original image data has been deleted, only display-image data is actually deleted but the main image data or original image data is not deleted actually.

This enables the user to delete the image data without taking into consideration whether the image data being currently selected as image data to be deleted is main image data, original image data, or display-image data.

1-4-1-2. Control when Main Image Data or Original Image Data is Selected as Data to be Deleted With reference to FIG. 30 and FIG. 31, there will be described operation of the digital camera 101 when the user selects main image data or original image data as data to be deleted.

During the image-data reproduction mode of the digital camera 101 with the image data displayed on the LCD monitor 110, the user can select image data to be deleted by operating the cursor key 180 (S410). Namely, by operating the cursor key 180, the user can instruct the digital camera to select any of the image data in an image file stored in a storage medium which stores one or more image files capable of storing, as image data, main image data, one or more pieces of original image data, and one or more pieces of display-image data. In this case, when the image file stores no display-image data having a pixel count matching that of the LCD monitor 110, the LCD monitor 110 displays display-image data which has been created from the main image data or the original image data so as to have a pixel count matching that of the LCD monitor 110. Accordingly, in this case, the user selects the maim image data or the original image data as image data to be deleted. Hereinafter, there will be described a case where main image data or original image data is selected as image data to be deleted.

If image data to be deleted is selected, the controller 150 is on standby until the deletion button 186 is pressed (S411). If the deletion button 186 is pressed, the controller 150 deletes the main image data or original image data selected by the user (S412). Namely, the controller 150 deletes image data in an image file. More specifically, the controller 150 accesses the internal memory 109 or the memory card 108 and deletes information about the selected main image data or original image data, from the management table contained in the image file storing the selected main image data or original image data.

After deleting the main image data or original image data, the controller 150 determines whether or not display-image data created based on the main image data or original image data is stored in the image file which stores the main image data or original image data (S413).

If the controller 150 determines that the display-image data is not stored, the controller 150 restructures the FAT, logically reconfigures the image file, and subsequently is on standby until the deletion button 186 is pressed by the user.

On the other hand, if the controller 150 determines that the display image is stored, the controller 150 deletes all pieces of the display-image data created based on the deleted main image data or original image data (S414). In the present embodiment, the main header part of an image file stores information which associates main image data or original image data with the display-image data created from the main image data or original image data. By referring to the information, the controller 150 can easily search for and delete the display-image data created based on the selected main image data or original image data. Namely, main image data and one or more pieces of display-image data created based on the main image data are stored in an image file, while associating the main image data and the display image data. Further, original image data and one or more pieces of display-image data created based on the original image data are stored in an image file, while associating the original image data and the display image data. Accordingly, the controller 150 can delete the image data instructed or selected to be deleted by the user pressing the deletion button 186 and the image data corresponding to the instructed image data. More specifically, the controller 150 deletes the information about all pieces of the display-image data created based on the deleted main image data or original image data, from the management table contained in the image file which stored the deleted main image data or original image data.

After deleting the display-image data, the controller 150 restructures the FAT, logically reconfigures the image file, and subsequently is on standby until the deletion button 186 is pressed by the user.

It will be considered, for example, that the sub-image data G23 captured in continuous shooting, as original image, is deleted from the multiple image file G40 illustrated in FIG. 31. When the sub-image data G23 captured in continuous shooting is deleted from the multiple image file F40, the HDTV thumbnail G24 and the VGA thumbnail G22 which are display-image data created based on the sub-image data G23 captured in continuous shooting are deleted therefrom, along with the deletion of the sub-image data G23. Accordingly, the structure of the image file is changed from the multiple image file F40 to the multiple image file F70.

In the present embodiment, when deletion of main image data or original image data is selected, the display-image data created based on the main image data or original image data is also deleted along with the deletion of the selected main image data or original image data. This can avoid situation in which, even though there is no main image data or original image data, the display-image data corresponding thereto remains.

Accordingly, the user can delete image data without taking into consideration whether the image data being currently selected as image data to be deleted is main image data or original image data or display-image data.

1-4-2. Splitting of Image Data

Figure 34:
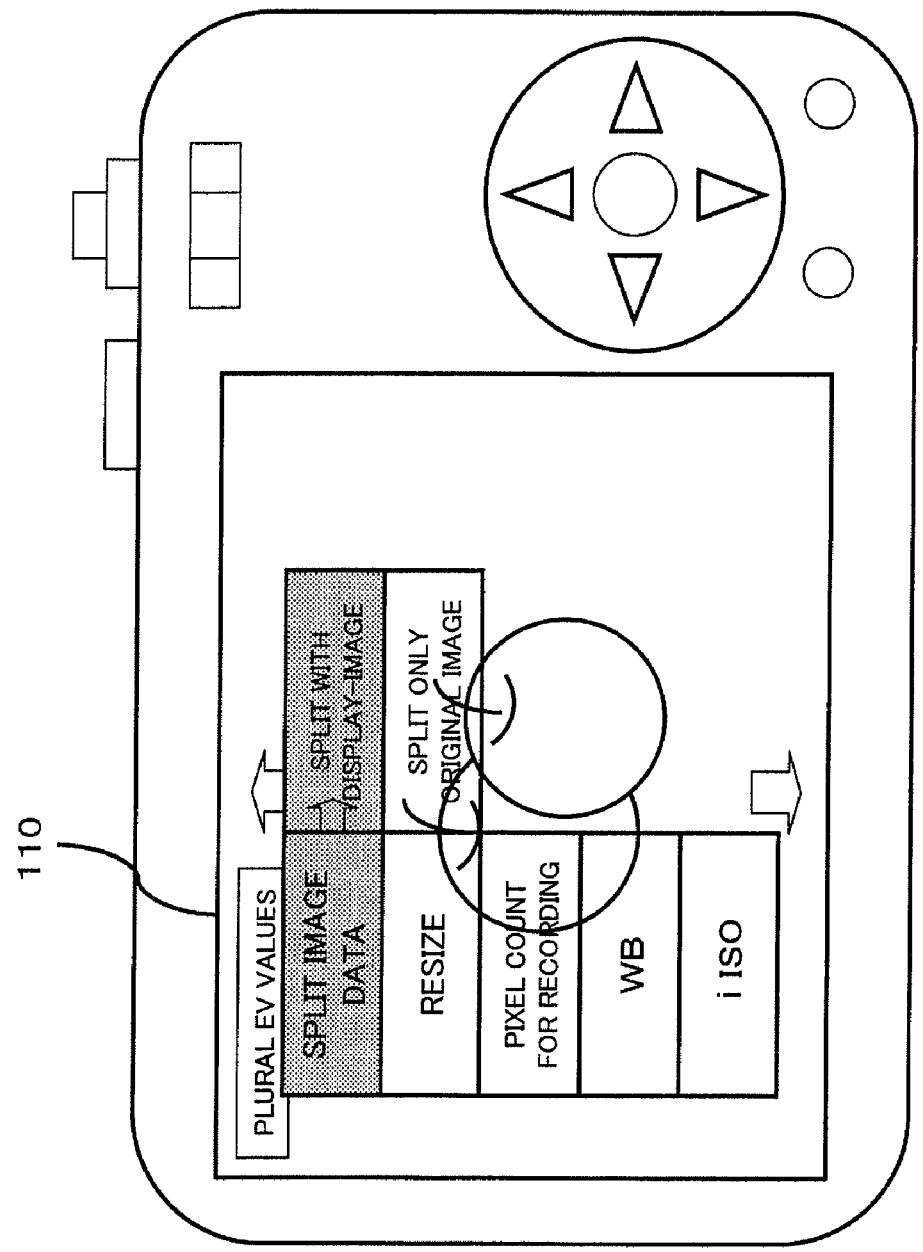
FIG. 34 is a schematic view of a screen for making a setting for splitting image data.
Figure 35:
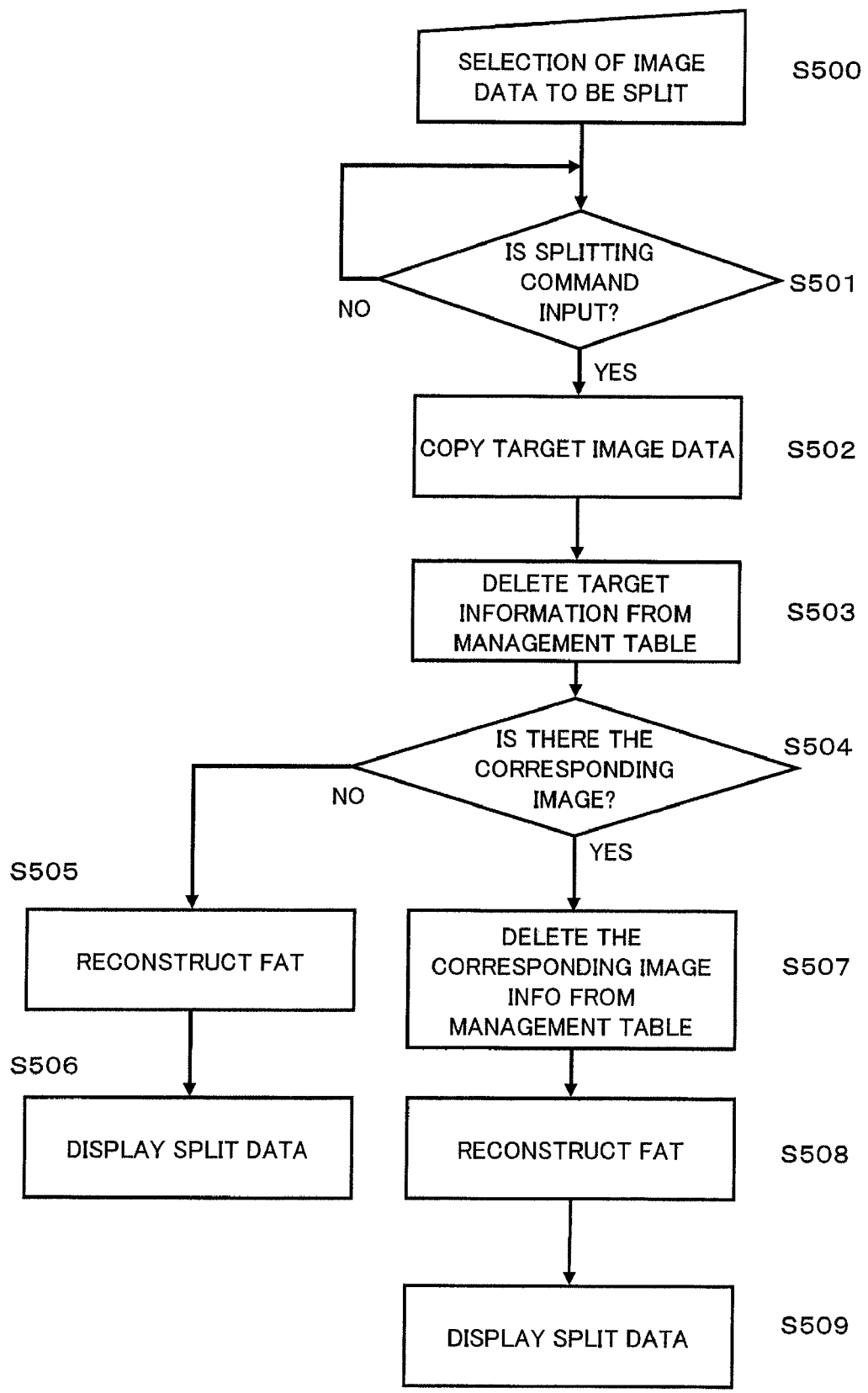
FIG. 35 is a flow chart illustrating an operation for splitting image data.

With reference to FIG. 34 and FIG. 35, there will be described splitting of image data with the digital camera 101 according to the first embodiment of the present invention. FIG. 34 is a view illustrating the back of the digital camera 101 displaying on the LCD monitor 110 a selection menu for splitting image data and an image of a subject. FIG. 35 is a flow chart for splitting image data according to the present embodiment. In this case, splitting of image file refers to processing for extracting one or more pieces of image data from an image file including plural pieces of image data to create a different file.

The user can select image data to be split from data stored in an image file by operating the cursor key 180 during the reproduction mode of the digital camera 101 (S500). The controller 150 is on standby until a command for splitting is selected through the menu for splitting illustrated in FIG. 34 (S501). When the command for splitting is selected, the controller 150 copies the image data in the image file, selected as image data to be split (S502). In this case, when the image data selected as image data to be split is sub-image data, the controller 150 copies the sub-image data part to create a new file. When the selected image data is main image data, the controller 150 copies the main image data part and the header to create a new file. The controller 150 stores the created image file in the memory card 108 or the internal memory 109. The controller 150 deletes information about the selected image data, from the management table (S503).

The controller 150 determines whether or not there is main image data, original image data, or display-image data which corresponds to the deleted image data (S504).

If there is no corresponding image data, the controller 150 restructures the FAT and logically reconfigures the image file from which the image data has been split (S505). After the completion of restructuring the image file, the LCD monitor 110 reproduces the split image data (S506). In the present embodiment, after completion of splitting processing, the split image data is reproduced. However, it is not necessarily required to employ this arrangement. After completion of splitting, any of the image data stored in the image file from which the image data has been split may be reproduced.

If there is the corresponding image data, the controller 150 deletes information about the corresponding image data from the management table (S507).

Thereafter, the controller 150 restructures the FAT and logically reconfigures the image file from which the image data has been split. After the completion of the reconfiguration of the image file, the LCD monitor 110 reproduces the split image data (S509).

As described above, in the present embodiment, when a part of all pieces of image data is split from a multiple image file, the image data to be split and the other image data corresponding to the image data to be split are deleted from the multiple image file. This can avoid the occurrence of a situation that, when a part of all pieces of main image data or original image data has been split, the display image data corresponding thereto remains within the multiple image file.

In the present embodiment, when a part of all pieces of image data is split from an image file, the image data corresponding to the image data to be split is deleted from the image file from which the image data is split. However, it is not necessarily required to employ this arrangement. The image data corresponding to the image data to be split may be also split and they may be combined to create a new image file. As described above, it may be possible to split the image data corresponding to the image data to be split together with the image data to be split. Accordingly, when main image data or original image data to be split has display-image data corresponding thereto, the image file after split has the main image data or original image data, and the display-image data corresponding to the main image data or original image data. Thus it does not need to create display-image data corresponding to the split main image data or original image data, after processing for splitting the image data.

When an image file splits as described above, the controller 150 stores information about the relationship between the image file newly created by the splitting and the image file from which the image file was split, in the main header of the image file from which the image file has been split. Further, the controller 150 stores information about the relationship between the image file newly created by the splitting and the image file from which the image file has been split, in the main header of the image file newly created by the splitting. Accordingly, the controller 150 can recognize the relationship between the image file newly created by the splitting and the image file from which the image file has been split, by referring to the respective main headers. This permits processing which has relation between the image file from which the image file has been split and the split image file, such as frame advance reproduction of the image file from which the image file has been split and the split image file.

Also, only image files relating to original image data in sub-image data may be split. This causes all pieces of main image data to be basically composed of original image data, thereby facilitating handling of image files.

Also, a file name of an image file newly created by splitting may be provide by adding an additional identifier (a symbol, a character string, or the like) to the portion other than extension of the file name of the image file from which the image file has been split. By having file names with a common part as described above, it is possible to clarify the relationship between the split image file and the image file from which the image file has been split. Accordingly, for example, in reproduction of image data, it is possible to perform frame advance reproduction of the split image data, following the image data from which the image data has been split.

1-4-3. Resizing

Figure 36:
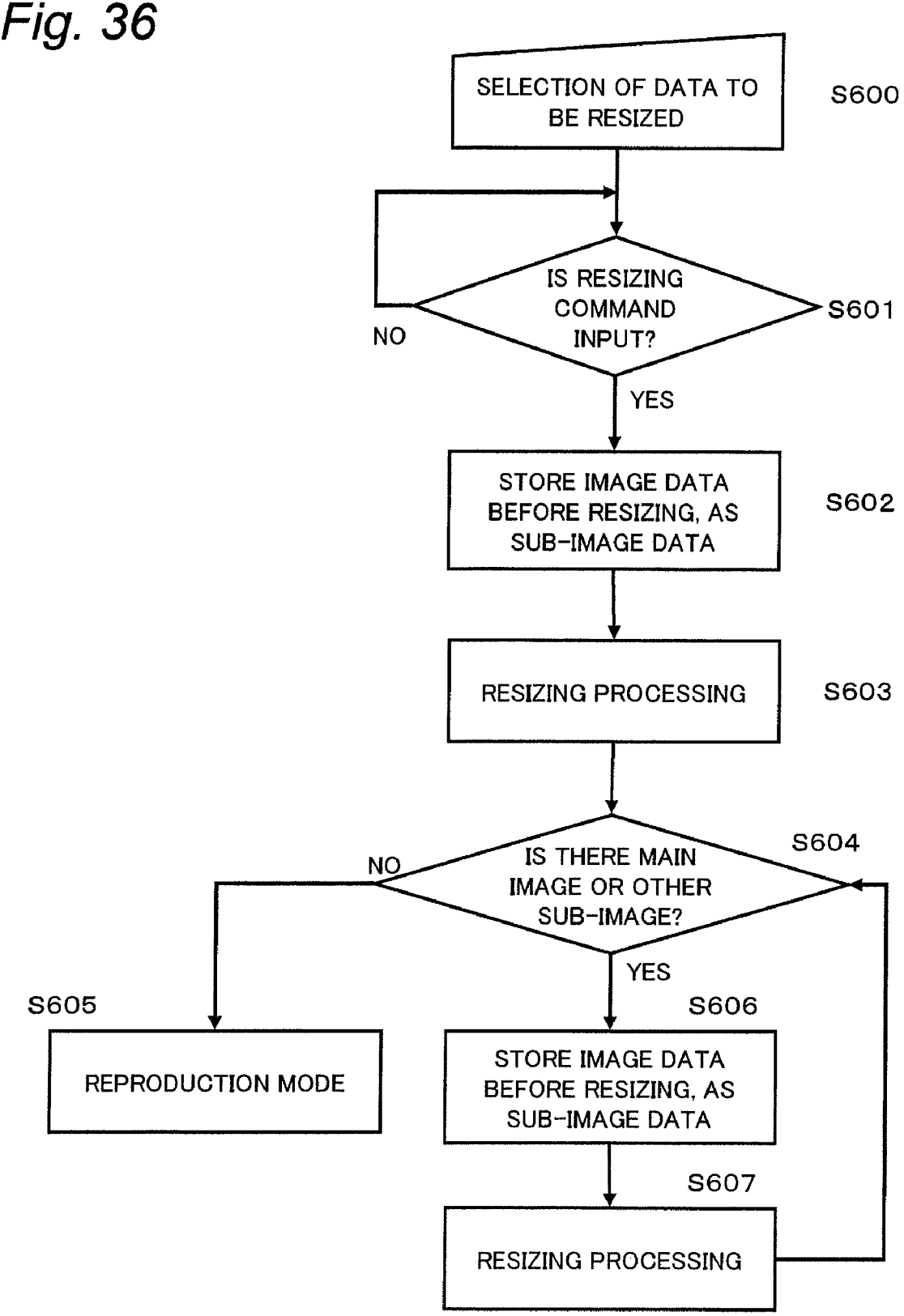
FIG. 36 is a flow chart illustrating resizing of image data.
Figure 37:
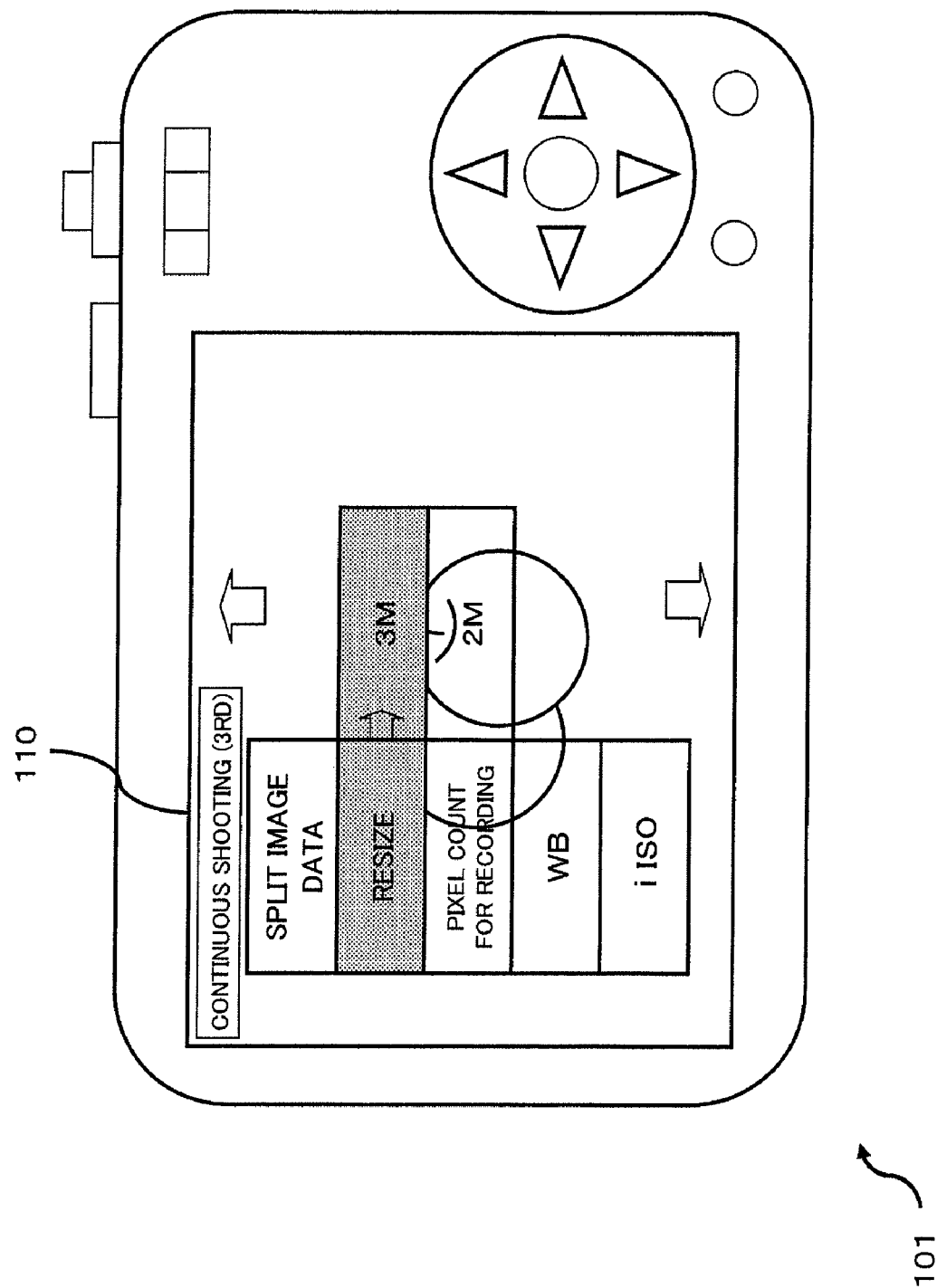
FIG. 37 is a schematic view of a screen for making a setting for resizing of image data.

With reference to FIG. 36 and FIG. 37, there will be described processing for resizing image data with the digital camera 101 according to the first embodiment of the present invention. FIG. 36 is a flow chart of processing for resizing image data according to the present embodiment. FIG. 37 is a rear view of the digital camera 101 displaying a selection menu for resizing image data on the LCD monitor 110. Resizing of image data refers to changing the pixel count of the image data.

The user can select image data to be resized by operating the cursor key 180 during the reproduction mode of the digital camera 101 (S600). The controller 150 is on standby until a command for resizing is selected through the menu for resizing illustrated in FIG. 37 (S601). If a command for resizing is selected, the controller 150 stores the image data before being resized, as sub-image data, in the same image file (S603). In this case, the image data before resized is stored after the display-image data corresponding to the respective image data before resized. At the same time, the controller 150 stores information indicating that the image data before resized is stored as sub-image data, in the main header part of the image file storing the image data before resized as sub-image data (S602). Next, the controller 150 applies resizing processing to the selected image data (S603). The resizing processing is performed by the electronic zoom processing unit 165 applying enlarging processing or reducing processing to the image data to be resized.

The controller 150 determines whether or not there is main image data or original image data other than the resized image data, in the image file storing the resized image data (S604).

If there is no other main image data or original image data, the LCD monitor 110 reproduces the resized image data (S605).

If there is other main image data or original image data, the controller 150 stores, in the same image file, the other main image data or original image data before resized, as sub-image data (S606). In this case, the image data before resized is stored after the display-image data corresponding to the respective image data before resized. Further, in this case, the controller 150 stores information indicating that the image data before resized is stored as sub-image data, in the main header part of the image file storing the image data before resized as sub-image data. Next, the controller 150 applies the same resizing processing to the main image data or original image data (S607). After the same resizing processing is applied to the main image data and all pieces of the original image data stored in the same image file, the LCD monitor 110 reproduces the resized image data (S605).

In the present embodiment, along with resizing of main image data or original image data, other main image data and original image data in the same image file are also resized. Accordingly, it is possible to collectively resize image data stored in the same image file and closely related to each other. In many cases, the same resizing processing is applied to image data closely related to each other. Accordingly, it is possible to collectively perform the same resizing processing on image data in the same image file, thereby improving the usability of the resizing function.

Further, in the present embodiment, the image data before resized remains in the same image file, as sub-image data. Accordingly, even after resizing, the image data can be restored to the state before the resizing.

Further, in the present embodiment, the image data before resized is stored after the display-image data corresponding to the respective image data before resized. This facilitates search for the image data before resized, when restoring the image data to the image data before being resized.

Further, in the present embodiment, information indicating that the image data before resized is stored in the main header part of the image file. This enables the controller 150 to recognize the presence or absence of image data before resized, only by referring to the main header part of the image file, when changing the resized image data to the image data before resized. As a result, the digital camera 101 according to the present embodiment can easily restore the resized image data to image data before resized.

1-5. Printing

There will be described printing of image data with the digital camera 101 according to the first embodiment of the present invention. Hereinafter, particularly, there will be described the compatibility with PictBridge, and processing which is performed when a DPOF setting is made on image data.

1-5-1. Compatibility with PictBridge

Figure 38:
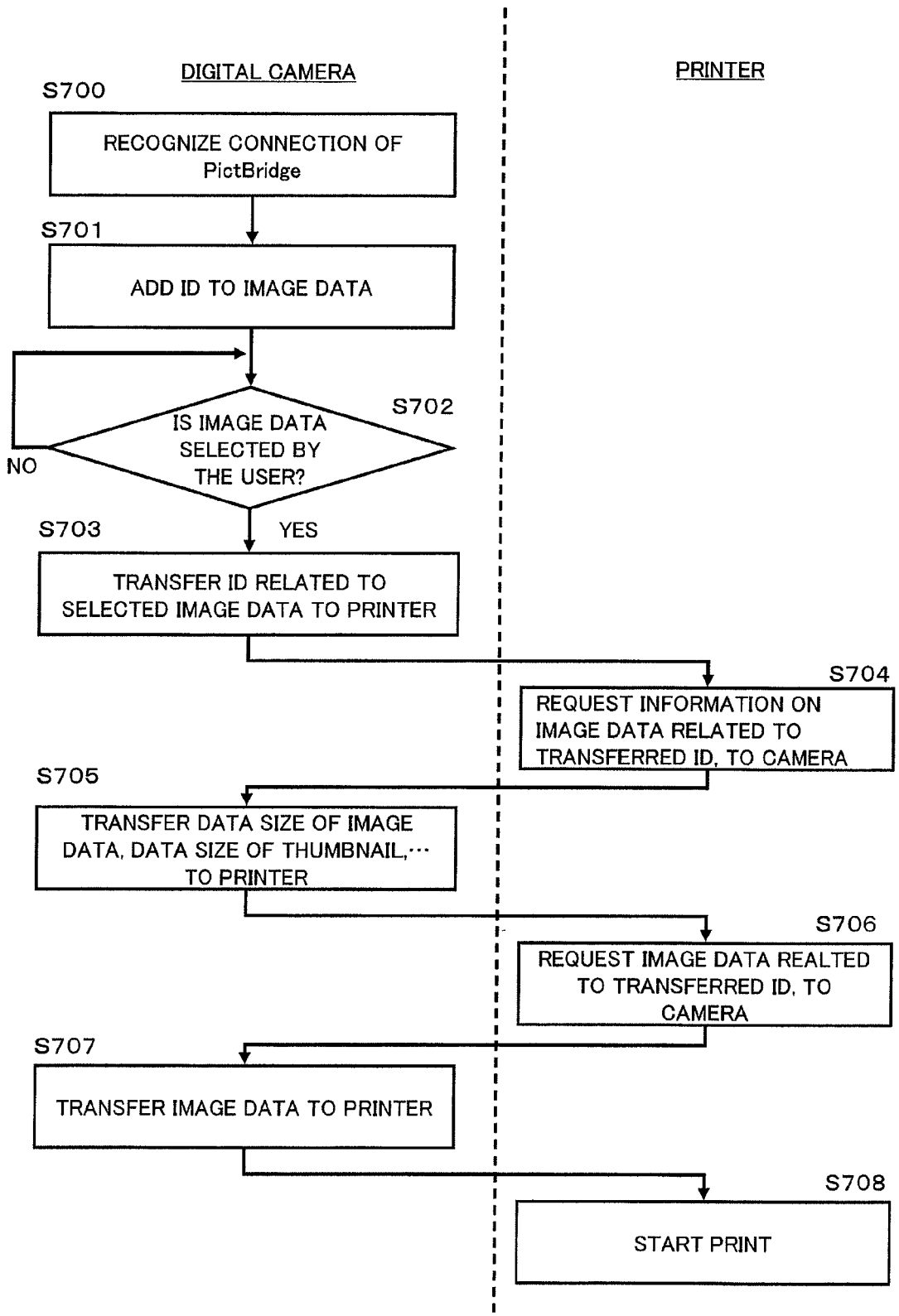
FIG. 38 is a flow chart illustrating transmission of image data compliant with PictBridge.
Figure 40:
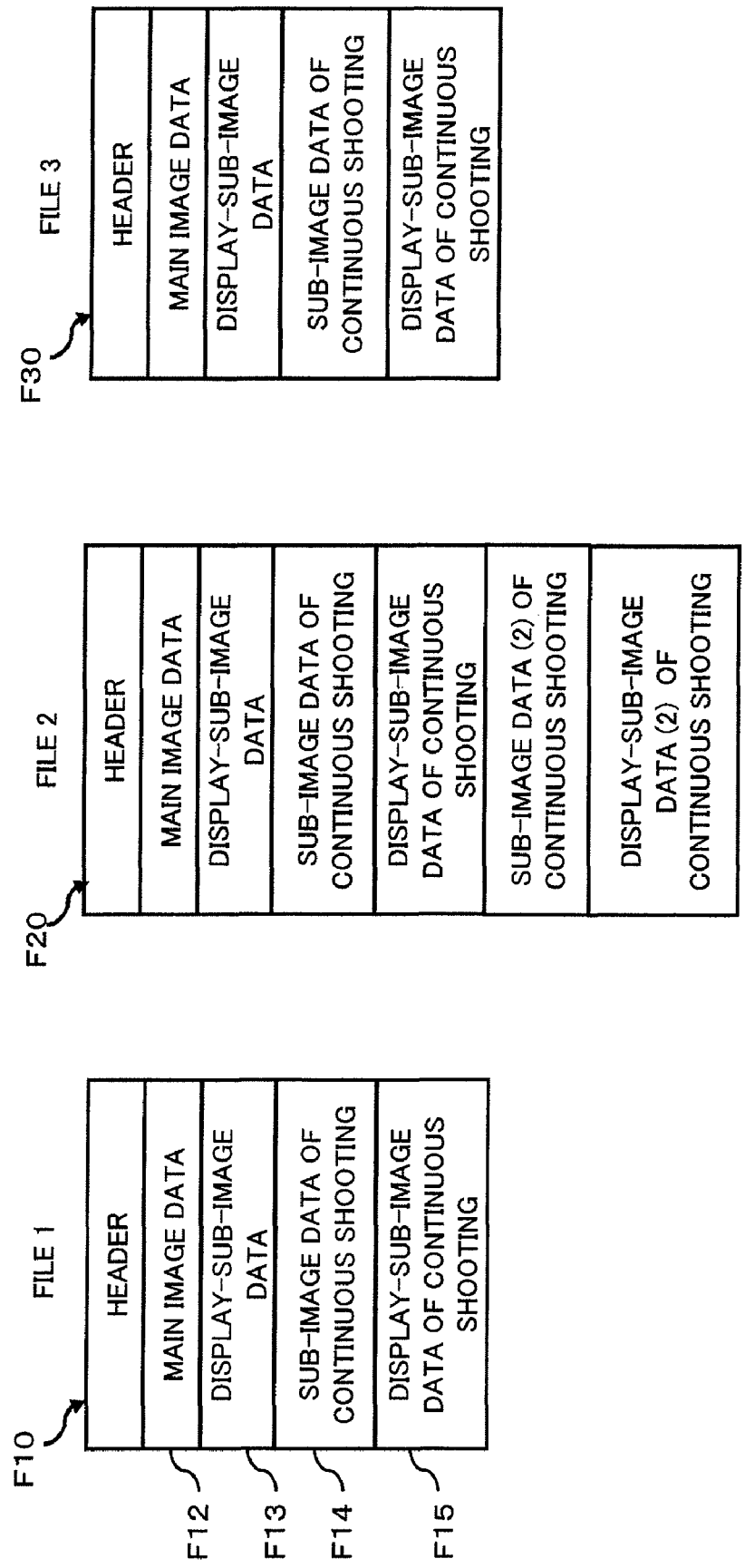
FIG. 40 is a schematic view of image files stored in a memory.

With reference to FIGS. 38 to 40, there will be described the compatibility of the digital camera 101 according to the present embodiment with PictBridge. FIG. 38 is a flow chart for printing with the digital camera 101 according to the present embodiment connected to a printer conforming to the PictBridge standard. FIG. 39 is a schematic view of a management table for managing IDs associated with image data stored in the memory card 108. FIG. 40 is a schematic view illustrating an example with three image files stored in the memory card 108.

"PictBridge" is a standard for easily realizing digital printing by connecting a digital camera directly to a printer. Direct connection of a digital camera and a printer which conform to the PictBridge standard allows image data stored in the digital camera to be printed with the printer.

When the user connects the digital camera 101 to a printer through a communication unit enabling communication with an external device such as a USB cable or a wireless LAN, it is possible to realize PictBridge connection between the digital camera 101 and the printer.

Upon recognition of the connection between the digital camera 101 and a printer (S700), the controller 150 acquires predetermined information about all pieces of the image data in all the image files stored in the memory card 108 or/and the internal memory 109. Then, the controller 150 adds different IDs (identification information) to all pieces of the image data based on the acquired information (S701). Namely, when the controller 150 recognizes that the digital camera 101 has been connected to the printer via the communication unit 111, the controller 150 associates IDs with the respective image data. The controller 150 acquires, as predetermined information, information indicating what image files are stored in the memory card 108 or the internal memory 109 and what image data are stored in the respective image files.

However, it is not necessary to acquire predetermined information about all the image files stored in the recording medium such as the memory card 108, but it is possible to acquire predetermined information about only some of the image files stored in the recording medium. Further, it is not necessary to add IDs (identification information) to all pieces of the image data, and but it is possible to add IDs to only some image data as long as at least some image data which are added IDs contain main image data. Also, these some image data may further contain image data (original image data) having an image size equal to that of the main image data in addition to main image data.

Namely, the controller 150 acquires predetermined information about at least some of the image files stored in a storage medium capable of storing the multiple image file. After acquiring the predetermined information, the controller 150 associates different IDs with the image data included in these image files and creates a management table for managing them. Namely, based on the acquired information about the image files, the controller 150 associates respective different IDs with at least some of the image data stored in the image files and creates a management table for managing them. The controller 150 stores this management table in the internal memory 109 or the like. It is preferable to utilize the management table T10 in the main header, when creating IDs. This is because, by doing this, it is possible to create IDs using the information about the relationship (the order of storage, and the like) among the image data stored in the image file. By associating IDs with all pieces of the image data as described above, it is possible to virtually handle the respective image data as different image files, according to the PictBridge standard.

For example, it is assumed that the memory card 108 stores three image files as illustrated in FIG. 40. In the memory card 108, it is possible to associate the respective image files with file identification codes which are uniquely determined for the respective image files in order to differentiate the respective image files. Identifying name of an image file and name of the folder storing the image file allows the image file to be uniquely identified.

For example, identifying a folder name and a file name which conform to the DCF (Design rule for Camera File system) standard allows an image file to be uniquely identified. According to the DCF standard, a folder name includes a number in the range of 100 to 999 at its former three digits, and also includes a character string which is uniquely assigned to each camera manufacturer, at its later four digits. Further, a file name includes a character string uniquely assigned to each camera manufacturer at its former four digits, and also includes a number in the range of 0001 to 9999 at its latter four digits. Accordingly, by employing the former three digits of a folder name and the latter four digits of a file name, it is possible to uniquely identify an image file.

For example, it is assumed that a multiple image file F10 and a multiple image file F20 are stored in a folder with a folder name of "100-PANA". Further, it is assumed that a multiple image file F30 is stored in a folder with a folder name of "101-PANA". Further, it is assumed that the multiple image file F10 has a file name of "P1000001.jpg", the multiple image file F20 has a file name of "P1000002.jpg", and the multiple image file F30 has a file name of "P1000001.jpg". In this case, the former three digits of a folder name and the latter four digits of a file name are combined and, thus, the multiple image file F10 is associated with a file identification code of "100-0001", the multiple image file F20 is associated with a file identification code of "100-0002", and the multiple image file F30 is associated with a file identification code of "101-0001". Hence, though the file F10 and the file F30 have the same file name, the file F10, the file F20 and the file F30 can be distinguished, respectively.

Further, IDs are added to respective image data in order to uniquely identify the image data. In this case, the IDs are created, such that each ID includes the file identification code added to the image file storing the image file to be added the ID and a data identification code for identifying the image data within the image file. In this manner, ID which can uniquely identify image data can be created. For example, when IDs are associated with all pieces of the image data stored in three image files illustrated in FIG. 40, a table illustrated in FIG. 39 is created. In this case, main image data F12, display-sub-image data F13, sub-image data F14 captured by continuous shooting, and display-sub-image data F15 captured by continuous shooting, which are stored in the multiple image file F10 are associated with IDs of "100-0001-0", "100-0001-1", "100-0001-2" and "100-0001-3", respectively. Thus, it is possible to create IDs which can uniquely identify the respective image data. This enables the digital camera 101 to store the created table in the internal memory 109 and to control printing of image data using IDs, with reference to the table.

After associating ID with the image data, the controller 150 is on standby until the user selects image data to be printed (S702). Namely, the controller 150 is on standby, until it receives a selection of at least some image data out of the image data associated with the IDs. When image data is selected, the communication unit 111 transmits the ID associated with the selected image data to the printer (S703). Namely, the controller 150 transmits the ID associated with the selected image data to the printer through the communication unit 111.

After the transmission of the ID, the printer sends to the digital camera 101 a request for transmitting information about the image data associated with the transmitted ID (S704).

Upon receiving the request for transmitting information about the image data, the digital camera 101 transmits information about the image data (for example, data size of the image data, compression/non-compression of thumbnail image data, data size of thumbnail image data, and the like) (S705).

Upon receiving the information about the image data, the printer sends a request for transmitting the image data associated with the received ID (S706).

Upon receiving the request for transmitting the image data, the digital camera 101 transmits the image data to the printer (S707). Namely, the digital camera 101 transmits the image data through the communication unit 111 in response to the request from the printer based on the ID which is transmitted to the printer. In this case, the digital camera 101 can transmit image data which has been compressed according to JPEG or the like. Thus, the digital camera 101 can transmit the image data at a relatively higher speed. However, it is not necessarily required to employ this arrangement. For example, the digital camera 101 can decompress image data compressed according to JPEG or the like, and then transmit the decompressed image data.

Upon receiving the image data, the printer starts printing of the received image data (S708).

There will be described the reason why in the present embodiment IDs are added to the respective image data stored in image files as described above. If IDs are added to only image files while no IDs are added to respective image data, then when image data to be printed is specified, it is necessary to specify, in unit of image file, image data to be printed. Therefore, in cases where an image file contains plural pieces of image data and a part of them are desired to be printed, it is necessary to create an image file containing only the image data desired to be printed. Then, it is necessary to add an ID to this image file. As described above, in case where IDs are added to image files in only unit of image file, it is necessary to extract the image data desired to be printed from the image file by splitting or copying, and to create a new image file therefrom. In case where image data is extracted by splitting, the problem is induced in that the structure of the image file storing the image data desired to be printed is varied. Further, in case where image data is extracted by copying, the problem is induced in that a memory space is consumed. On the contrary, addition of IDs to image data makes it possible to specify each image data, thereby eliminating the necessity of additionally creating an image file containing image data to be printed. Therefore, in the present embodiment, IDs are added to respective image data stored in image files.

Further, in the present embodiment, IDs are associated with all pieces of the image data in all the image files stored in the memory card 108 and/or the internal memory 109. This enables selection of image data to be transmitted to the printer from all pieces of the image data in all the image files stored in the storage medium.

Further, in the present embodiment, upon recognizing that the digital camera 101 is connected to the printer, the controller 150 associates IDs with all pieces of the image data stored in all the image files. With this arrangement, IDs are already associated with all the image data, when the user selects image data to be printed. Therefore when the user selects an image to be printed, the ID thereof can be immediately transmitted to the printer.

Further, in the present embodiment, an ID is constituted by a file identification code for identifying an image file in the memory card 108 or the internal memory 109 and a data identification code for identifying an image data in the image file, and the ID is managed by the ID management table.

However, in the present embodiment, an ID is formed from a file identification code constituted by a part of a folder name and a part of a file name, and a data identification code provided according to the order of storage in the image file. In this case, information about the folder name, the image file name and the storage order of the image data to be printed in the image file can be naturally recognized from the management information in the file in the memory card, without managing such information particularly for PictBridge. Accordingly, the IDs of respective image data can be uniquely determined. Accordingly, it is possible to be compatible with the PictBridge standard without particularly providing an ID management table. An ID management table is effective for adding specific IDs to respective image data for PictBridge.

Further, in the present embodiment, IDs are associated with all pieces of the image data in all the image files stored in the memory card 108 and/or the internal memory 109. However it is not necessarily required to associate IDs with all pieces of the image data in all the image files. IDs may be associated with some of all pieces of the image data in some of all the image files. Accordingly, it is not necessary to provide a management table that manages IDs for all pieces of image data in all image files, but is enough to provide a management table that manages IDs for some of all pieces of image data in some of all image files thereby saving memory space. Further, addition of IDs to some of the image data in image files can reduce burden on the user for searching.

For example, ID may be assigned to only main image data and original image data, while ID may not be assigned to display-image data. This arrangement enables the user to easily search for image data to be printed, since image data having the same content but having different resolutions are excluded from candidates for selection.

Further, in case where there are plural pieces of display-image data corresponding to one original image data, ID may be associated with only the original image data and the display-image data having the highest resolution among the plural pieces of display-image data. With this arrangement, it is possible to prevent plural pieces of image data having the same content but having different resolutions from being candidates for selection. Further, it is possible to cope with a wide variety of printing specifications by keeping display-images having higher resolutions. This is because it is easy to create a display-image having a lower resolution from a display-image having a higher resolution.

Further, in the present embodiment, after recognizing PictBridge connection, the controller 150 associates ID with image data in image files stored in the memory card 108 or/and the internal memory 109. However, it is not necessarily required to associate IDs at this timing. The ID may be associated when image data is created or when the user selects the printing mode of the digital camera 101.

1-5-2. Processing when DPOF Setting is Made

DPOF (Digital Print Order Format) is a format which enables a user of a digital camera to specify information, for example, information about which image files in all image files stored in a storage medium such as a memory card should be printed. When making a DPOF setting on an image file stored in a storage medium, information about a number of copies, a sheet size, a title and the like can be associated at the same time with the image file on which the DPOF setting is made.

Figure 41:
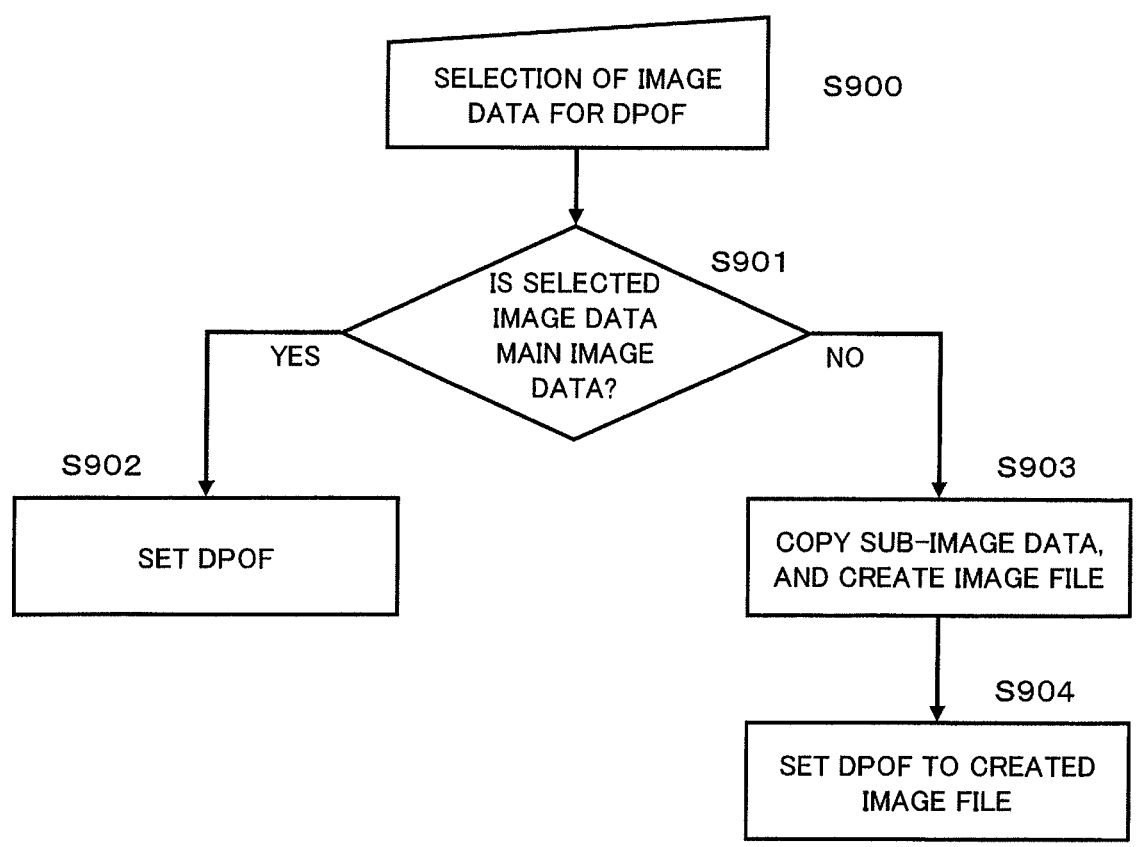
FIG. 41 is a flow chart illustrating an operation to be performed when a DPOF setting is made.

With reference to FIG. 41, there will be described processing which is performed when a DPOF setting is made on image data to be printed, with the digital camera 101 according to the present embodiment. FIG. 41 is a flow chart of processing which is performed when a DPOF setting is made on image data, according to the present embodiment. When a DPOF setting is made on an image file, a text file (DPOF file) including device information about the digital camera, information about the number of images to be printed and the like is created. The text file is stored in a memory card storing the image file on which the DPOF setting has been made. The printer can print the image file according to the setting made by the user, by referring to the DPOF file stored in the memory card.

When the memory card 108 storing plural multiple image files is inserted in the digital camera 101, the user can operate the cursor key 180 in the digital camera 101 to select image data to which a DPOF setting is to be made.

When image data to which a DPOF setting is to be made is selected (S900), the controller 150 determines whether or not the selected image data is main image data (S901).

If the selected image data is main image data, the controller 150 makes a DPOF setting on the image file storing the selected main image data. More specifically, the controller 150 describes, in the DPOF file, information about a number of prints, a print size for print and the like, in association with name of the image file on which the DOPF setting is made. Further, the information about the number of prints, the print size and the like is inputted by the user, as required.

If the selected image data is not main image data, the controller 150 copies the selected image data (namely, sub-image data). The copying of the image data is performed with a conventional technique. The controller 150 creates an image file containing the sub-image data resulting from the copying, as main image data (S903). The created image file is stored in the memory card 108 or the internal memory 109. The controller 150 makes a DPOF setting on the created image file (S904). Namely, the controller 150 edits the DPOF file to describe therein information about number of prints, print size, and the like, in association with the file name of the created new image file. Thus, the DPOF file containing the description of various types of information about the selected image file is stored in the memory card 108.

As described above, in the present embodiment, when making a DPOF setting on sub-image data stored in a multiple image file, the sub-image data is copied, a new image file is created therefrom, and then a DPOF setting is made on the new image file. Hereinafter, there will be described the reason why this arrangement is employed.

According to the conventional DPOF standard, an image to be printed is designated by identifying the file name. If the conventional DPOF standard is applied to a multiple image file capable of storing main image data and sub-image data, only the main image data stored in the multiple image file is recognized as image data to be printed, but the sub-image data is not recognized as image data to be printed. In order to overcome this problem, in the present embodiment, when making a DPOF setting on sub-image data stored in a multiple image file storing plural pieces of image data, the sub-image data is copied, and a new image file with the copied image data stored as a main image is created. The main image in the new image file is recognized as image data to be printed. Accordingly, with the aforementioned arrangement, it is possible to utilize the conventional DPOF standard, even in the case of employing formats of image files containing plural pieces of image data.

As described above, the digital camera 101 according to the present embodiment copies the sub-image data, when making a DPOF setting on sub-image data stored in a multiple image file. Unlike the splitting, the copying does not involve deletion of the sub-image data from the original multiple image file. Accordingly, it is possible to make a DPOF setting on sub-image data, without changing the structure of the original multiple image file, thereby maintaining the usability for the user.

Also, it is possible to split sub-image data on which a DPOF setting is made, to create a new image file from it, and to make a DPOF setting on the new image file. In this case, although the structure of the original multiple image file is changed, but it is possible to avoid the problem of consumption of the memory due to increase of the number of image files every time a DPOF setting is made. Further, when main image data is selected, it is possible to extract the main image data to create a new image file.

The digital camera 101 according to the present embodiment receives a selection of at least one image data from all pieces of image data stored in an image file capable of storing main image data and one or more pieces of sub-image data. When the selected image data is sub-image data, the digital camera 101 creates a new image file containing the selected sub-image data as main image data. Further, the digital camera 101 creates a print management file which contains image-file identification information for identifying the image file from which the main image data has been selected and/or the newly-created image file, and printing-method specification information indicating a method for printing images contained in the image files.

1-6. Transmission

With reference to FIGS. 42 to 46, there will be described operations for transmitting an image file or image data with the digital camera 101 according to the first embodiment of the present invention. With the digital camera 101 according to the present embodiment, image data or an image file to be transmitted can be selected. The digital camera 101 according to the present embodiment can transmit image data or/and image files to an apparatus capable of receiving image data or/and image files. The method for transmitting image files and image data is similar to those in the prior art and will not be described.

1-6-1. Flow Chart of Transmission of Image Data

Figure 42:
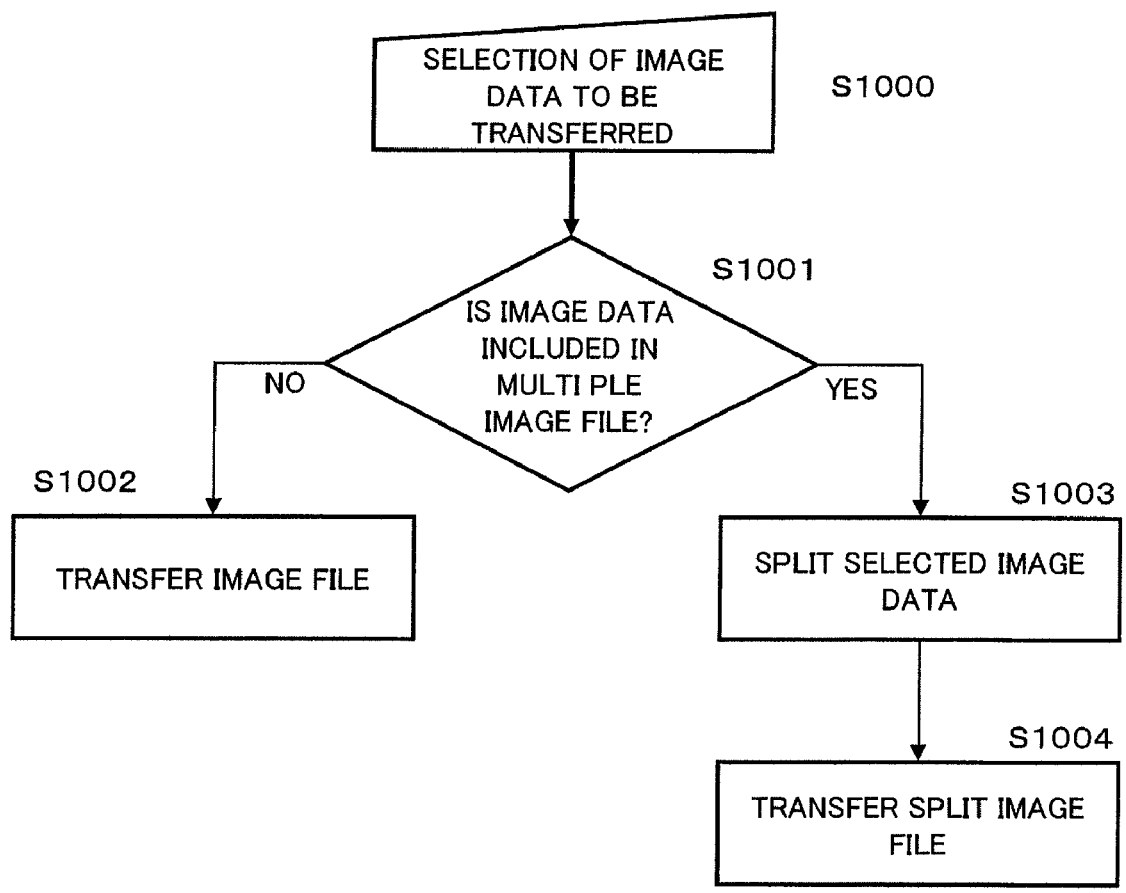
FIG. 42 is a flow chart illustrating transmission of image data.

FIG. 42 is a flow chart for transmission of image data with the digital camera 101 according to the present embodiment. The digital camera 101 according to the present embodiment can transmit some of all pieces of image data stored in a multiple image file. The user selects image data to be transmitted by operating the cursor key 180 in the digital camera 101 (S1000).

When image data is selected, the controller 150 determines whether or not the selected image data is stored in a multiple image file (S1001).

If the controller 150 determines that the selected image data is not stored in a multiple image file, the communication unit 111 transmits the image file storing the selected image data (S1002).

If the controller 150 determines that the selected image data is stored in a multiple image file, the controller 150 splits (extracts) the selected image data from the multiple image file to create a new image file therefrom (S1003). The controller 150 transmits the created new image file (S1004). In this case, the split image data and the data relating thereto are deleted from the multiple image file.

With this arrangement, even when plural pieces of image data are stored in one image file, image data contained in the one image file can be transmitted in units of image data.

Further, in the present embodiment, when the selected image data is stored in a multiple image file, the selected image data is split from the multiple image file and the split image data is transmitted. However, it is not necessarily required to split the selected image data. The selected image data may be copied and the image data resulting from the copying may be transmitted. Alternatively, only information about the selected image data in the image file storing the selected image data may be transmitted. With this arrangement, it is possible to transmit the selected image data, without changing the contents of the image file storing the selected image data.

In the present embodiment, all pieces of the image data stored in image files can be selected as image data to be transmitted. However, it is not necessarily required to employ this arrangement. Only main image data and/or original image data in image data stored in the image file may be able to be selected as image data to be transmitted. With this arrangement, it is possible to present well-selected image data to the user, as image data to be selected.

1-6-2. Flow Chart of Transmission of Image File

Figure 43:
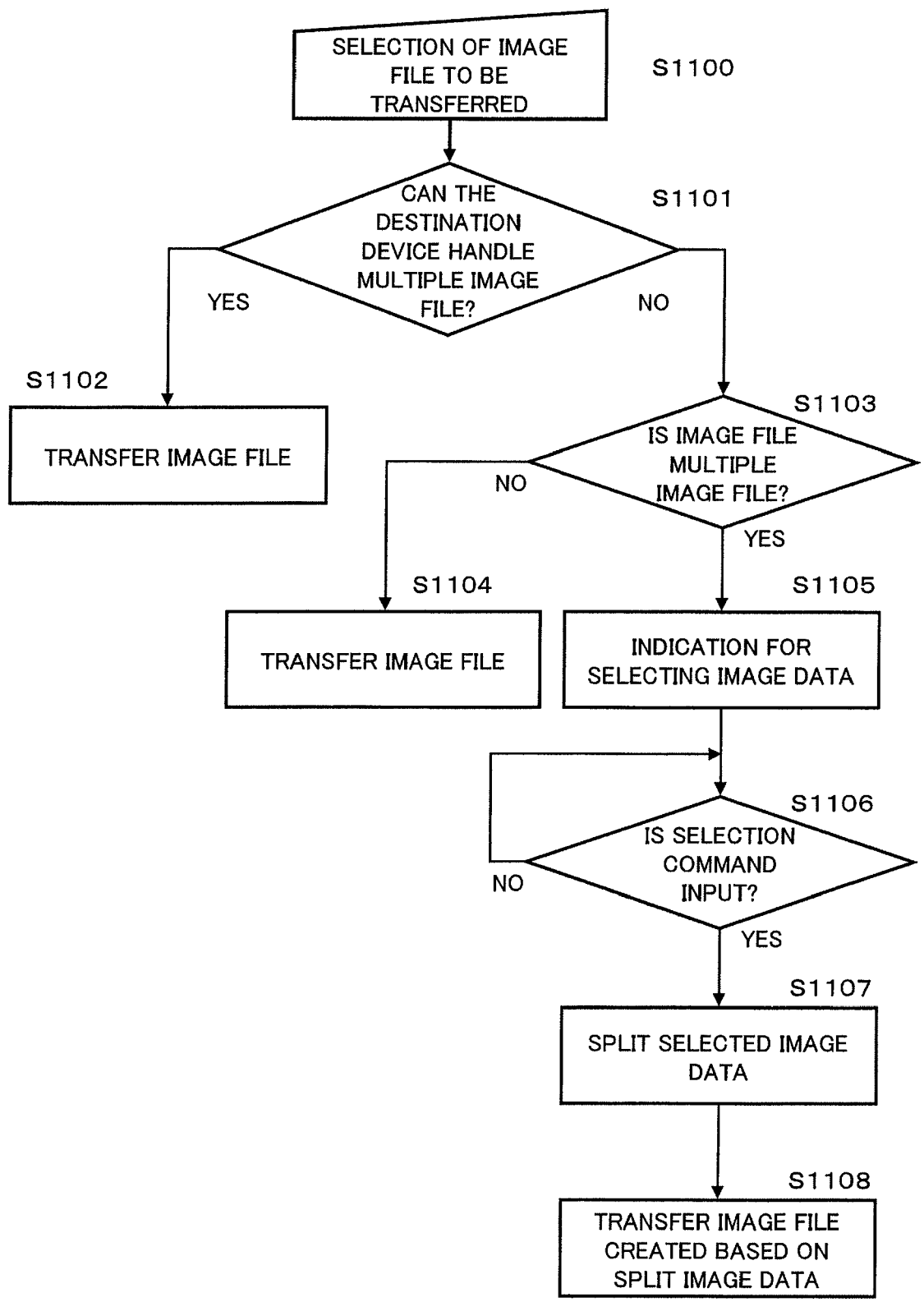
FIG. 43 is a flow chart illustrating transmission of an image file.
Figure 44:
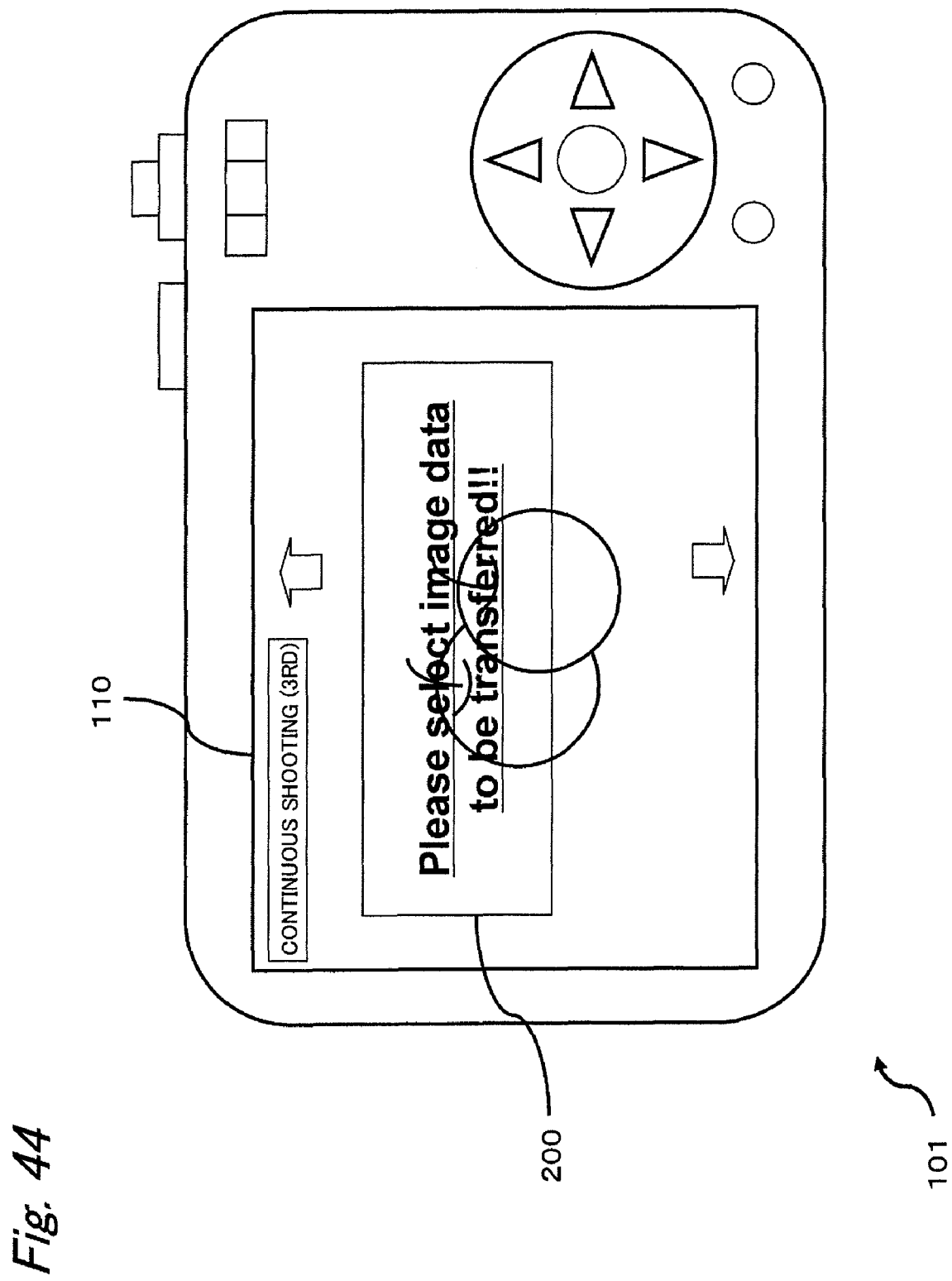
FIG. 44 is a schematic view of a screen display which prompts a user to select image data to be transmitted.

FIG. 43 is a flow chart for transmitting an image file with the digital camera 101 according to the present embodiment. FIG. 44 is a rear view of the digital camera 101 displaying, on the LCD monitor 110, an indication which prompts the user to select image data to be transmitted from image files storing plural pieces of image data. With the digital camera 101 according to the present embodiment, it is possible to select an image file as well as image data, as information about an image to be transmitted.

The user selects an image file to be transmitted by operating the cursor key 180 during the reproduction mode of the digital camera 101 (S1100). When an image file is selected, the controller 150 determines whether or not the destination device to which the image file is transmitted is adapted to a multiple image file (S1101). In this case, "the destination is adapted to a multiple image file" means that the destination device can recognize the received multiple image file, as a multiple image file. For example, the controller 150 in the digital camera 101 acquires, through the communication unit 111, version information and the like of an external apparatus which is the destination device to determine whether or not the external apparatus is adapted to a multiple image file.

If the controller 150 determines that it is adapted to a multiple image file, the controller 150 transmits the selected image file (S1102).

If the controller 150 determines that it is not adapted to a multiple image file, the controller 150 determines whether or not the selected image file is a multiple image file (S1103).

If the controller 150 determines that the selected image file is not a multiple image file, the controller 150 transmits the selected image file (S1104).

If the controller 150 determines that the selected image file is a multiple image file, the LCD monitor 110 displays an indication which prompts the user to select image data to be transmitted (S1105). For example, an indication for a transmitted data selection 200 illustrated in FIG. 44 is displayed on the LCD monitor 110. Then, the controller 150 is on standby until the user selects image data (S1106). If image data is selected, the controller 150 splits the selected image data from the multiple image file to create a new image file (S1107). After creating the new image file, the controller 150 transmits the created image file (S1108).

By changing the transmitted image file according to whether or not the destination device is adapted to a multiple image file, the user can transmit an image file without taking into consideration the image file format to which the destination device is adapted.

Further, when the destination device is not adapted to a multiple image file, the user is prompted to select the transmitted image data. This allows the digital camera 101 according to the present embodiment to transmit image data which the user really wants to transmit.

In the present embodiment, when the selected image data is stored in a multiple image file, the selected image data is split therefrom to transmit the split image data. However, it is not necessarily required to split the selected image data. The selected image data may be copied and an image file created based on the image data resulting from the copying may be transmitted. Alternatively, only information relating to the selected image data in the image file storing the selected image data may be transmitted. With this arrangement, it is possible to transmit the selected image data without changing the contents of the image file storing the selected image data.

Further, in the present embodiment, after determining whether or not the destination device is adapted to a multiple image file, it is determined whether or not the image file selected by the user is a multiple image file. However, it is not necessary to perform these determinations in the mentioned order. It may be determined whether or not the destination device is adapted to a multiple image file, after determining whether or not the image file selected by the user is a multiple image file.

1-6-3. Automatic Selection of Image Data to be Transmitted

Figure 45:
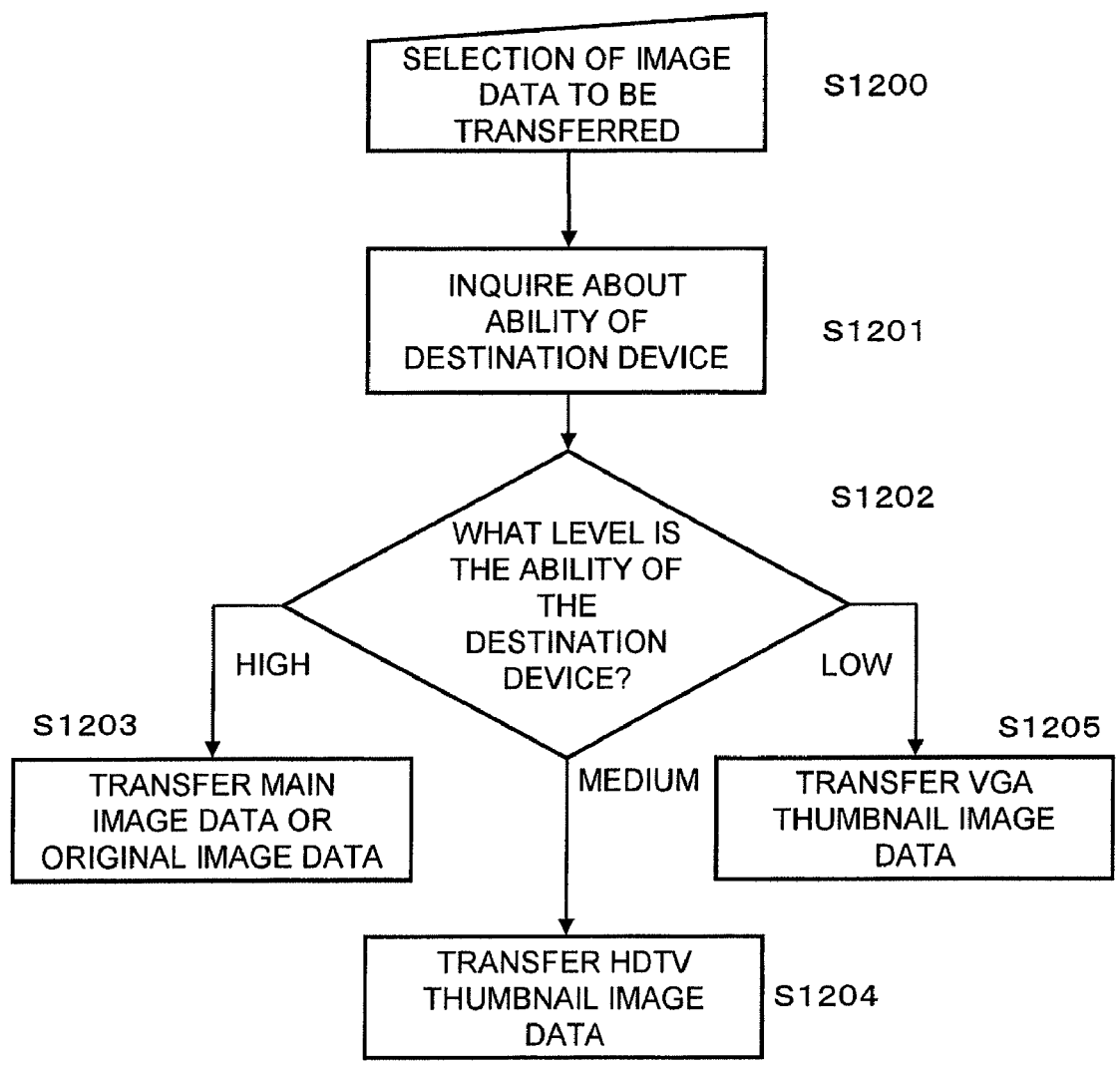
FIG. 45 is a flow chart illustrating transmission of image data.

FIG. 45 is a flow chart of processing for automatically selecting image data to be transmitted, according to the ability of the destination device, with the digital camera 101 according to the present embodiment. The user selects image data to be transmitted, by operating the cursor key 180 in the digital camera 101 (S1200). When image data to be transmitted is selected, the controller 150 inquires of the destination device about the ability of the device (S1201). In this case, the ability of the device is spec of the device, such as operating ability of CPU included in the device, storage capacity of a memory included in the device.

The controller 150 receives the response from the destination device through the communication unit 111 and determines the ability of the device (S1202).

If the controller 150 determines that the ability of the device is "High", the controller 150 transmits the main image data or original image data corresponding to the selected image data, through the communication unit 111 (S1203). In this case, "the ability of the device is "High"" refers to that the device has an ability sufficient to handle main image data or original image data.

If the controller 150 determines that the ability of the apparatus is "Medium", the controller 150 transmits HDTV thumbnail image data corresponding to the selected image data, through the communication unit 111 (S1204). In this case, "the ability of the device is "Medium"" refers to that the device has an ability sufficient to handle HDTV thumbnail image data.

If the controller 150 determines that the ability of the device is "Low", the controller 150 transmits VGA thumbnail image data corresponding to the selected image data, through the communication unit 111 (S1205). In this case, "the ability of the device is "Low"" refers to that the device has an ability which is insufficient to easily handle HDTV thumbnail image data.

With the arrangement for transmitting image data according to the ability of the destination device, as described above, the communication unit 111 can transmit image data which is most suitable for the transmission destination.

When there is no image data determined to be image data to be transmitted, image data more suitable for transmission may be selected from the existing image data to transmit it. With this arrangement, it is possible to transmit more suitable image data, even if the image data which does not have plural pieces of display-image data corresponding to the image data is transmitted.

1-6-4. Transmission of Thumbnails with PictBridge

Figure 46:
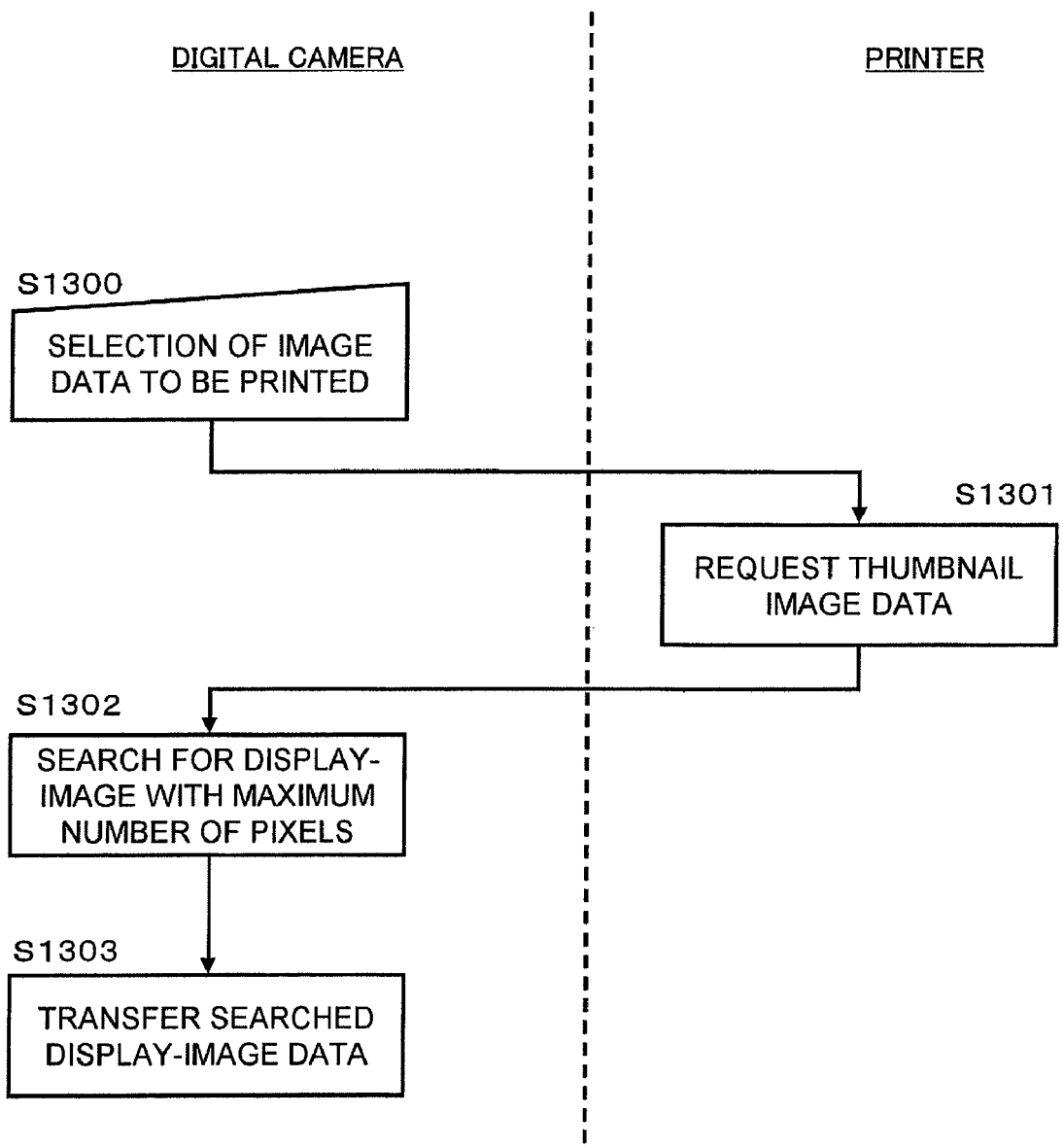
FIG. 46 is a flow chart illustrating transmission of thumbnail image data.

FIG. 46 is a flow chart of processing which is performed when the digital camera 101 according to the present embodiment receives a request for transmission of thumbnail image data from a printer which conforms to the PictBridge standard. According to the PictBridge standard, when performing thumbnail printing, the printer sends a request to the digital camera for transmission of thumbnail image data.

The user selects image data to be printed, by operating the cursor key 180 in the digital camera 101 (S1300). If image data is selected, the printer makes a request for transmission of the image data and thumbnail image data corresponding to the image data (S1301). Upon receiving the request for thumbnail image data from the printer, the controller 150 searches for display-image data having a maximum pixel count in display-image data relating to the image data to be printed (S1302). If the controller 150 finds display-image data having a maximum pixel count, the controller 150 transmits the found display-image data to the printer through the communication unit 111 (S1303). The printer prints a thumbnail image based on the received display-image data.

With the aforementioned arrangement, when printing thumbnail images, the printer can print thumbnail images using the display-image having maximum pixel counts, thereby printing a beautiful thumbnail image having large pixel counts.

2. Second Embodiment

Hereinafter, with reference to the drawings, there will be described the second embodiment where the concept of the present invention is applied to a digital camera. The matters which will not be particularly described have the same structures as those of the first embodiment.

2-1. Recording Operation (Multi Aspect Mode)

A digital camera according to the second embodiment of the present invention stores image data captured in a multi aspect mode in a memory card or an internal memory. In the present embodiment, a setting is preliminarily made as to the aspect ratios of display-image data which should be stored as sub-image data, for the captured image data. For example, it is preliminarily set so that, when capturing one image data, display-image data with an aspect ratio of 16:9 and display-image data with an aspect ratio of 4:3 should be created.

Figure 47:
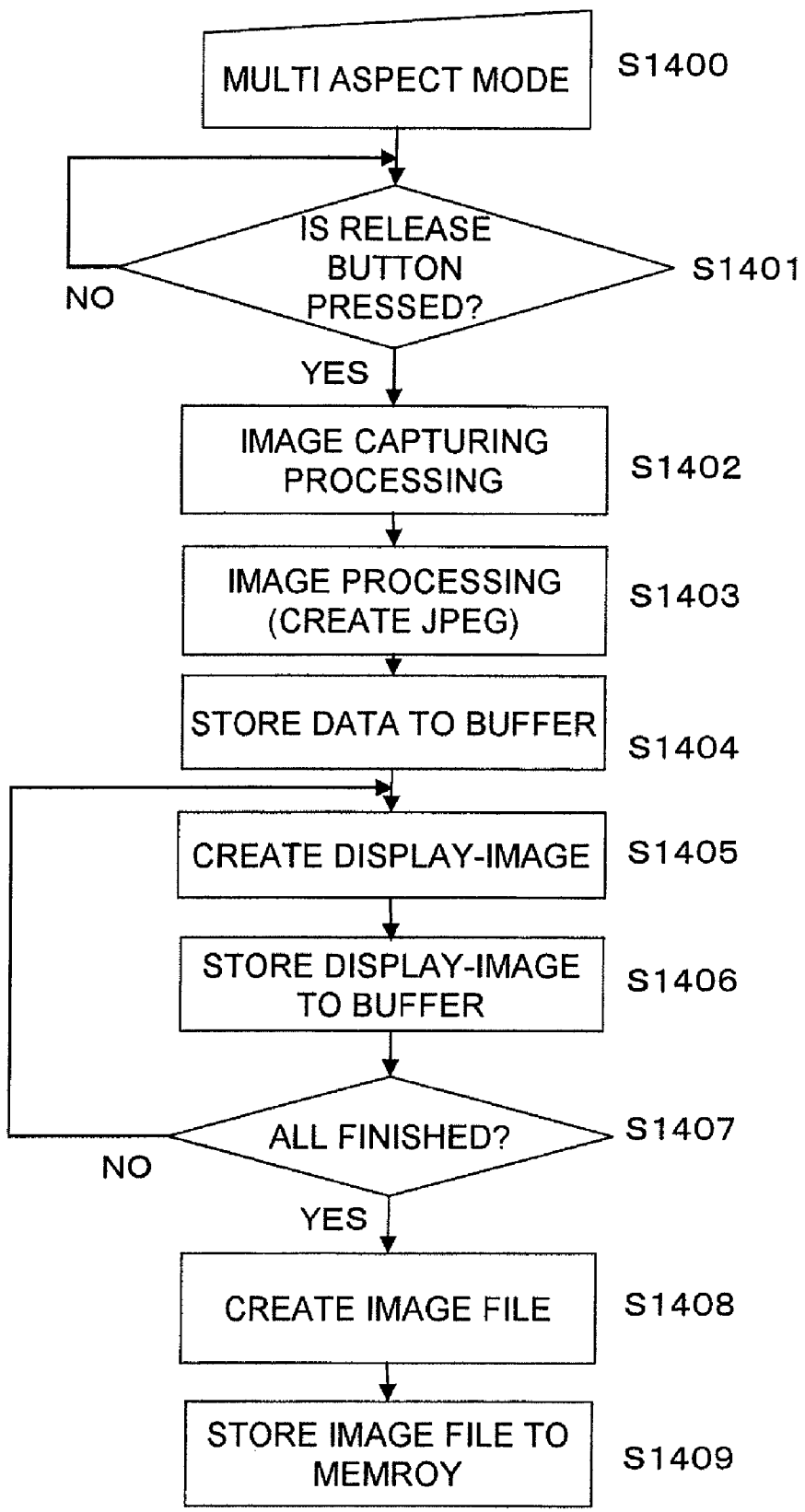
FIG. 47 is a flow chart of a recording operation in a multi aspect shooting mode.
Figure 48:
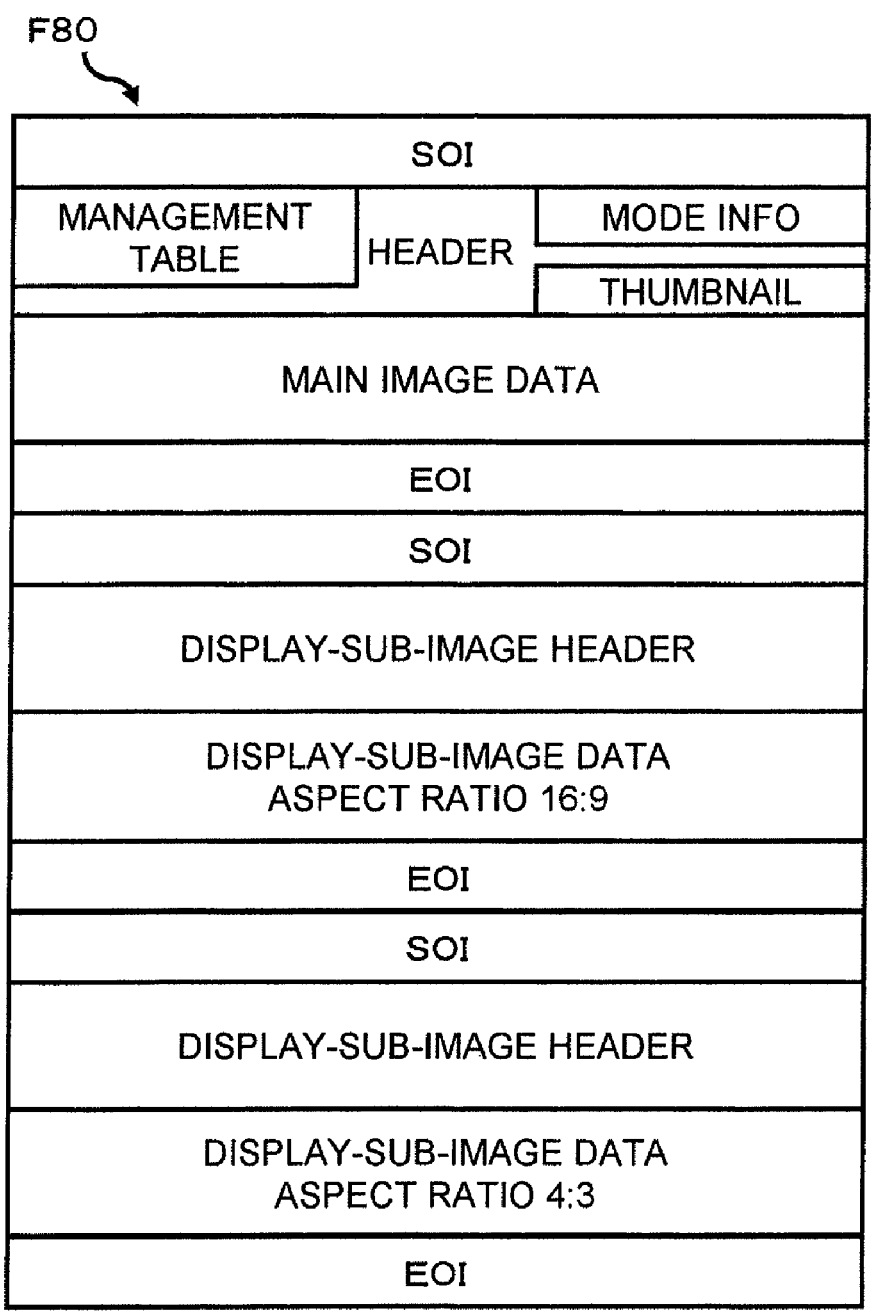
FIG. 48 is a schematic view of a single image file.

With reference to FIG. 47 and FIG. 48, there will be described an operation for recording image data with the digital camera according to the present embodiment. FIG. 47 is a flow chart of an operation for recording image data according to the present embodiment. FIG. 48 is a schematic view of an image file created by a recording operation according to the present embodiment.

The digital camera 101 is set to a multi aspect recording mode, according to user's operations on the operation unit 170 (S1400). If the digital camera 101 is set to the multi aspect recording mode, the controller 150 is on standby until the release button 171 is completely pressed (S1401). If the release button 171 is completely pressed, the CCD image sensor 141 performs an image capturing operation (S1402). After the image capturing operation is performed, the image processor 160 performs image processing such as compression processing on the captured image data to create JPEG image data (S1403). After the JPEG image data is created, the controller 150 stores the created JPEG image data in the buffer memory 115 (S1404). Thereafter, the electronic zoom processing unit 165 performs image processing such as cutting processing, thinning-out processing and interpolation processing on the JPEG image data to create display-image data with a predetermined aspect ratio (S1405). Next, the controller 150 stores the created display-image data in the buffer memory 115 (S1406).

After the display-image data is stored in the buffer memory 115, the controller 150 determines whether or not display-image data having the pre-set aspect ratios have been all created (S1407).

If it is determined that display-image data having all the pre-set aspect ratios have not been created, the processing is returned to the step S1405 where the electronic zoom processing unit 165 creates display-image having an aspect ratio which has not been created (S1405) and stores it in the buffer memory 115 (S1406). These processing are repeated until all pieces of the display-image data are created (S1407).

If the controller 150 determines that display-image data having all the pre-set aspect ratios have been created, the controller 150 combines all pieces of the image data stored in the buffer memory 115 together to create one image file (S1408). After creating the image file, the controller 150 stores the created image file in the memory card 108 or the internal memory 109 (S1409).

For example, it is assumed that it is preliminarily set that display-image data having aspect ratios of 16:9 and 4:3 should be created. In this case, if one image data is captured, then an image file containing display-image data having an aspect ratio of 16:9 and display-image data having an aspect ratio of 4:3 are created, as illustrated in FIG. 48.

By preliminarily providing display-image data having plural aspect ratios, it is possible to rapidly reproduce, on a display monitor, display-image data matching the aspect ratio of the display monitor, no matter what aspect ratio the display monitor has.

In the present embodiment, the controller 150 stores information about the aspect ratios of the respective display-image data in the main header part and/or the respective sub-image header parts.

With this arrangement, the controller 150 can select appropriate image data only by referring to the respective header parts, when selecting image data matching the aspect ratio of the display device.

Further, in the present embodiment, plural pieces of display-image data having various aspect ratios are stored as sub-image data in an image file, for a single piece of image data. However, it is not necessarily required to employ this arrangement. Plural pieces of original image data having various aspect ratios may be stored as sub-image data in an image file, for a single piece of image data.

With this arrangement, it is possible to rapidly print image data having various aspect ratios, when printing image data.

Further, in the present embodiment, after the JPEG image data is stored in the buffer, display-image data is created based on JPEG image data. However, it is not necessarily required to employ this arrangement. Before the JPEG image data is stored in the buffer, image data having various aspect ratios, such as display-image data, may be created based on JPEG image data or image data (for example, RAW data and YC data) which is the basis of JPEG image data.

2-2. Reproduction Operation (Multi Aspect Mode)

Figure 49:
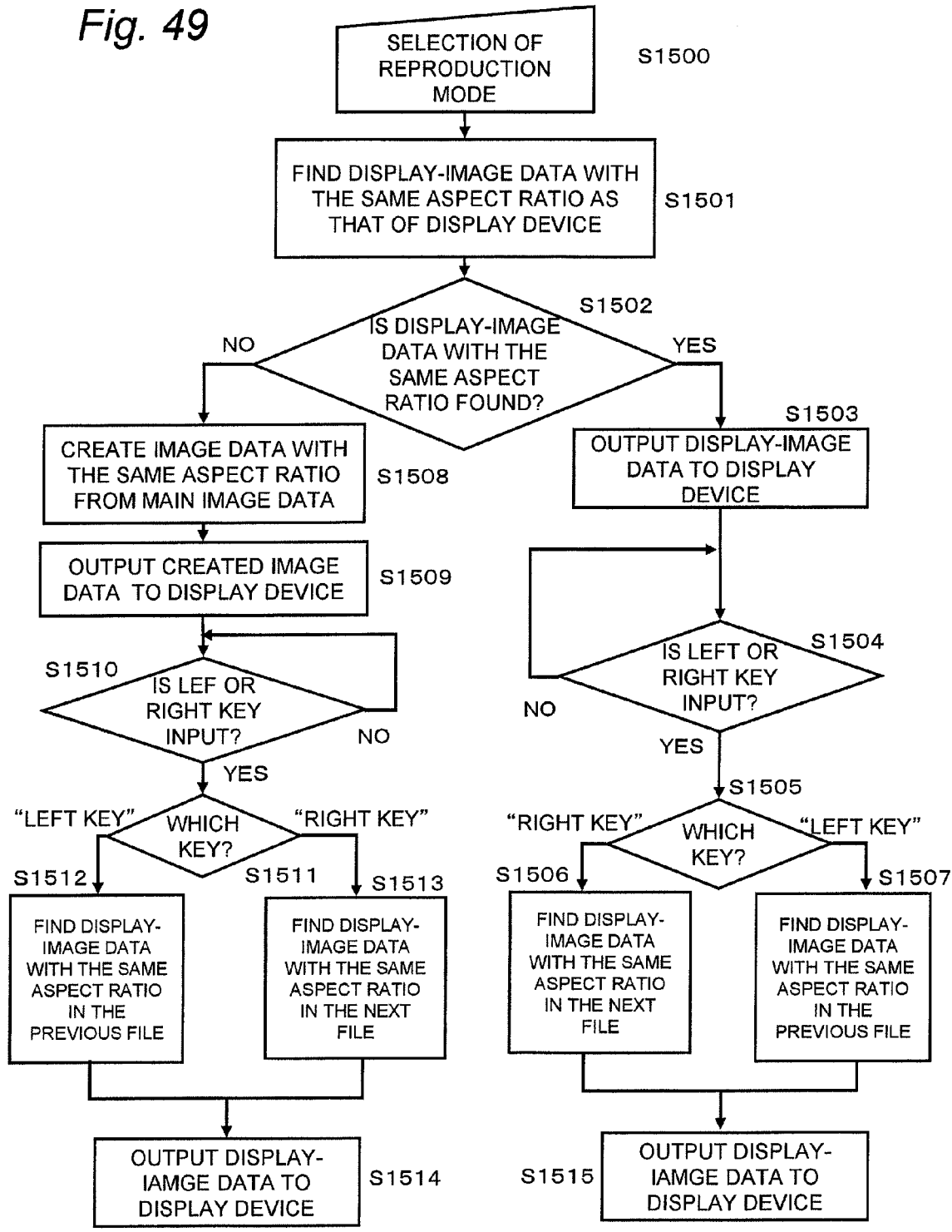
FIG. 49 is a flow chart of an operation for reproducing a multi aspect image file.

With reference to FIG. 49, there will be described an operation for reproducing image data with the digital camera according to the present embodiment. FIG. 49 is a flow chart of an operation for reproducing image data with the digital camera according to the present embodiment. When the digital camera is connected to a display device, the digital camera acquires information about specs of the display device, such as the aspect ratio of the display device.

The user can select the reproduction mode of the digital camera 101 by operating the mode dial 174. When the reproduction mode is selected (S1500), the controller 150 searches the image file storing image data to be reproduced for display-image data having an aspect ratio equal to the aspect ratio of the display device connected to the digital camera 101 (S1501).

In searching for display-image data, the controller 150 determines whether or not there is display-image data having the same aspect ratio as that of the display device (S1502).

If the controller 150 determines that there is display-image data having the same aspect ratio, the controller 150 outputs the display-image data to the display device connected to the digital camera 101 (S1503). The display device displays the display-image data received from the digital camera 101.

After outputting the display-image data, the controller 150 is on standby until the left key or the right key is pressed (S1504). When the left key or the right key is pressed, the controller 150 determines whether the left key or the right key is pressed (S1505). If the controller 150 determines that the left key is pressed, the controller 150 searches the memory card 108 for display-image data having the same aspect ratio which is stored in the image file stored before the image file storing the image data being currently reproduced (S1507), and outputs the searched display-image data to the display device (S1515). If the controller 150 determines that the right key is pressed, the controller 150 searches the memory card 108 for display-image data having the same aspect ratio which is stored in the image file stored after the image file storing the image data being currently reproduced (S1506), and outputs the searched display-image data to the display device (S1515).

On the other hand, if the controller 150 determines that there is no display-image data having the same aspect ratio, the controller 150 creates image data having the same aspect ratio as that of the display device from the main image data or original image data (S1508). The controller 150 outputs the created image data to the display device connected to the digital camera 101 (S1509). The display device displays the received image data.

After outputting the image data, the controller 150 is on standby until the left key or the right key is pressed (S1510). If the left key or the right key is pressed, the controller 150 determines which key is pressed (S1511). If the controller 150 determines that the left key is pressed, the controller 150 searches for display-image data having the same aspect ratio which is stored in the image file stored before the image file storing the image data being currently reproduced (S1512), and outputs the searched display-image data to the display device (S1514). If the controller 150 determines that the right key is pressed, the controller 150 searches for display-image data having the same aspect ratio which is stored in the image file stored after the image file storing the image data being currently reproduced (S1513) and outputs the searched display-image data to the display device (S1514).

By searching the image file for display-image data having the same aspect ratio as that of the display device connected to the digital camera, the display device connected to the digital camera 101 can display display-image data matching the aspect ratio of the display device, during reproducing image data.

Further, by creating display-image data matching the aspect ratio of the display device from main image data or original image data when there is no display-image data matching the aspect ratio of the display device in an image file, the display device connected to the digital camera 101 can always display image data matching the aspect ratio of the display device.

Namely, the digital camera 101 according to the present embodiment, upon receiving a user's command for frame advance reproduction of image data and reading out an image file, determines whether or not the new image file stores image data having the same feature as that of image data being currently reproduced. According to the determination result, the digital camera 101 according to the present embodiment decides image data to be reproduced next among the image data stored in the read new image file.

3. Third Embodiment

Hereinafter, with reference to the drawings, there will be described the third embodiment where the concept of the present invention is applied to a digital camera. The matters which will not be particularly described have the same structures as those of the first embodiment.

3-1. Recording Operation (Multi Aspect Mode 2)

Figure 50:
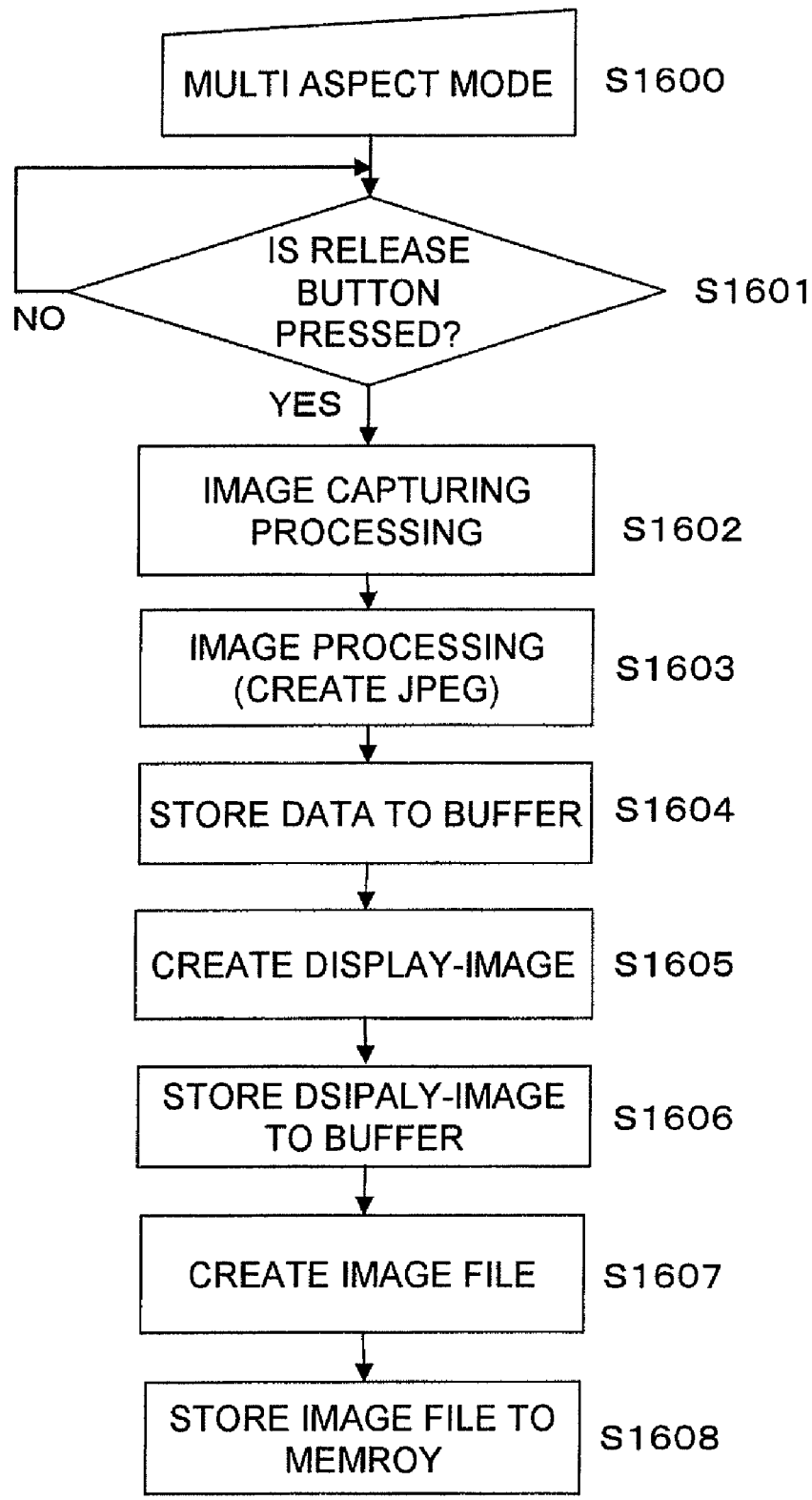
FIG. 50 is a flow chart of a recording operation in the multi aspect shooting mode.
Figure 51:
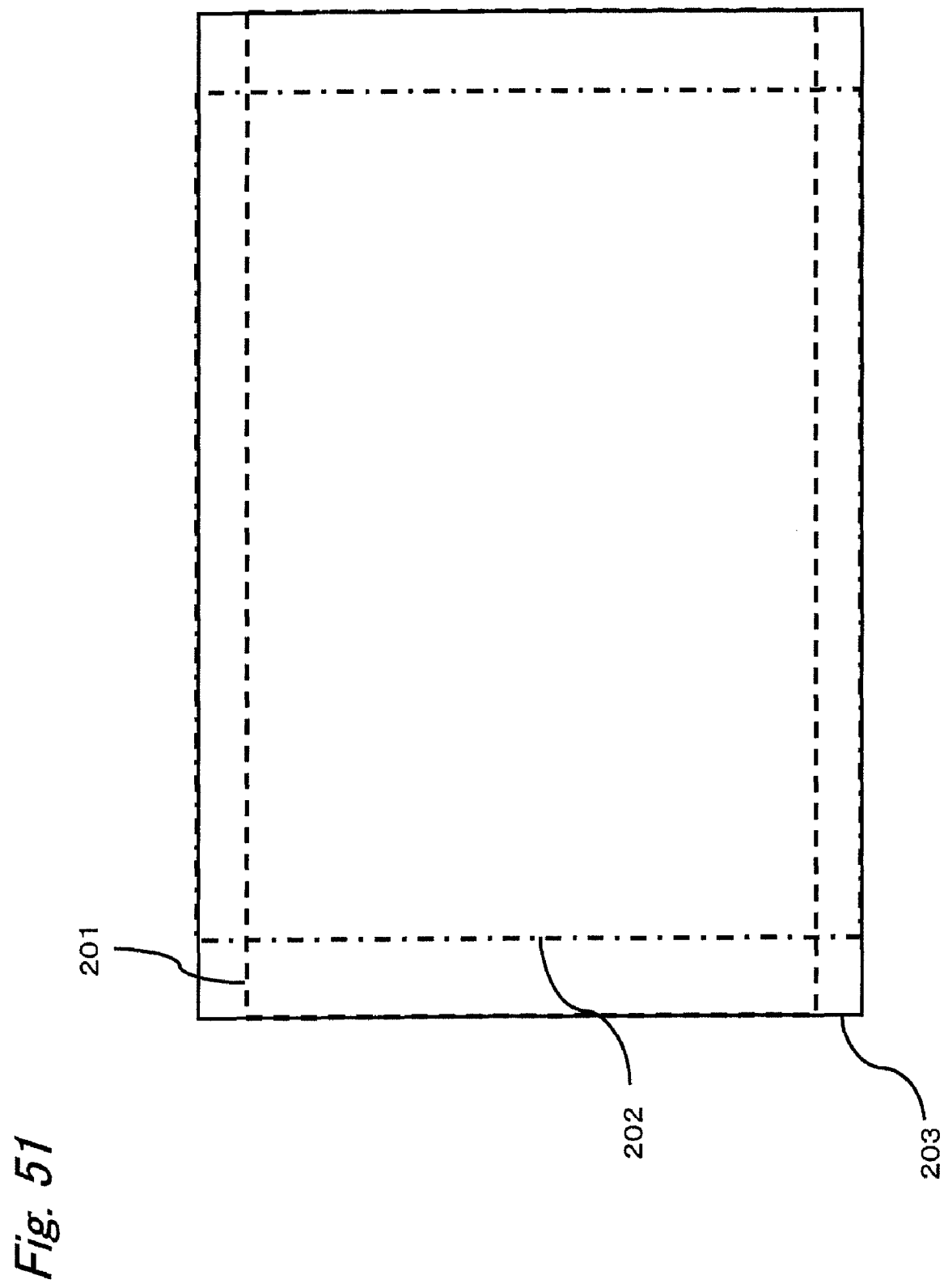
FIG. 51 is a schematic view illustrating an image including plural aspect ratios.

A digital camera according to the third embodiment of the present invention stores image data captured in the multi aspect mode in a memory card or an internal memory. With reference to FIG. 50 and FIG. 51, there will be described a recording operation according to the present embodiment. FIG. 50 is a flow chart of an operation for recording image data with the digital camera according to the present embodiment. FIG. 51 is a schematic view of a display-image stored as sub-image data during recording with the digital camera according to the present embodiment.

The user can set the digital camera 101 to the multi aspect mode by operating the operation unit 170. If the digital camera 101 is set to the multi aspect mode (S1600), the controller 150 is on standby until the release button 171 is completely pressed (S1601). When the release button 171 is completely pressed, the CCD image sensor 141 performs an image capturing operation (S1602). After the image capturing operation is performed, the image processor 160 performs image processing such as compression processing to create JPEG image data (S1603). After the JPEG image data is created, the controller 150 stores the created JPEG image data in the buffer memory 115 (S1604).

After the JPEG image data is stored in the buffer memory 115, the electric zoom processing unit 165 creates display-image data based on the created JPEG image data (S1605). This display-image data is image data having a size including all the pre-set aspect ratios. For example, in assuming that aspect ratios of 16:9 and 4:3 have been preliminarily set, image data 203 with a size designated by a solid line in FIG. 51 (hereinafter, referred to as "inclusive image data") is display-image data. In this case, image data 201 is image data with an aspect ratio of 16:9, and image data 202 is image data with an aspect ratio of 4:3. The inclusive image data 203 is image data with a size including both the image data 201 and the image data 202.

After display-image data as such inclusive image data is created, the controller 150 stores the created display-image data in the buffer memory 115 (S1606). Thereafter, the controller 150 combines all pieces of the image data stored in the buffer memory 115 together to create an image file (S1607) and stores the created image file in the memory card 108 or the internal memory 109 (S1608).

By forming display-image data from image data including all aspect ratios (inclusive image data), it does not need to store image data with the respective aspect ratios. This can save the memory in comparison with the case in which display-image data with all aspect ratios are stored. Further, it is possible to cope with various types of display devices having different aspect ratios without preliminarily storing image data having respective aspect ratios, by using the stored display-image data.

3-2. Reproduction Operation (Multi Aspect Mode 2)

Figure 52:
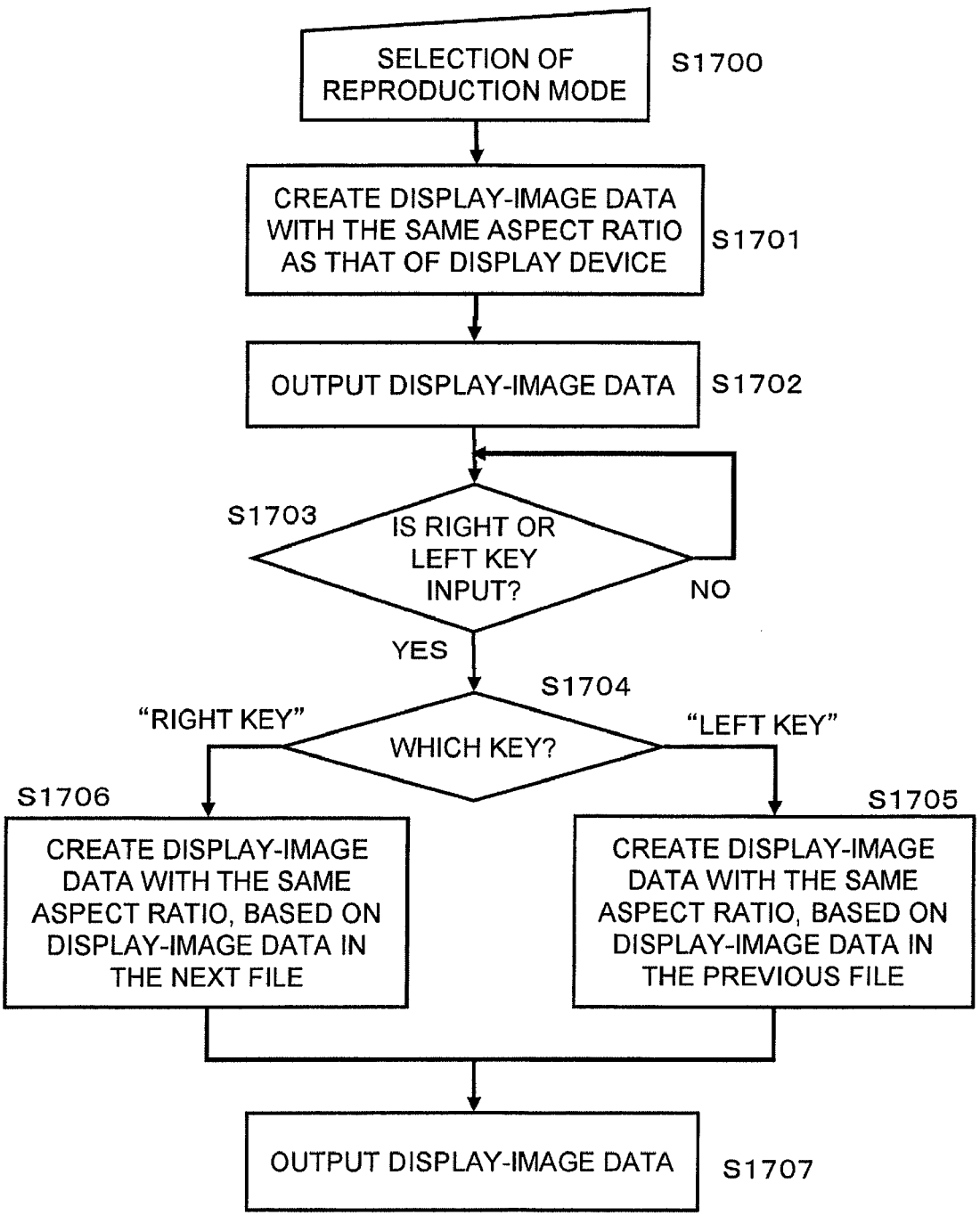
FIG. 52 is a flow chart of an operation for reproducing a multi aspect image file.

With reference to FIG. 52, there will be described a reproduction operation according to the present embodiment. FIG. 52 is a flow chart of a reproduction operation according to the present embodiment. The user can select the reproduction mode of the digital camera 101 by operating the operation unit 170.

If the reproduction mode is selected (S1700), the controller 150 creates display-image data having the same aspect ratio as that of the display device connected to the digital camera 101, based on the display-image data including plural aspect ratios which is stored in the image file being currently reproduced (S1701). In this case, the creation of display-image data is performed by execution of image processing such as cutting-out processing, thinning-out processing and interpolation processing by the electronic zoom processing unit 165.

After creating display-image data, the controller 150 outputs the created display-image data to the display device connected to the digital camera 101 (S1702). The display device displays the received display-image data. When the display device displays image data, the controller 150 is on standby until the left key or the right key is pressed (S1703).

When the left or right key is pressed, the controller 150 determines whether the left key or right key is pressed (S1704).

If it is determined that the left key is pressed, the electronic zoom processing unit 165 creates display-image data with the same aspect ratio as that of the display device connected to the digital camera 101 based on the display-image data stored in the image file stored before the image file storing the image data being currently reproduced (S1705) and then outputs the display-image data to the display device (S1707).

If it is determined that the right key is pressed, the electronic zoom processing unit 165 creates display-image data with the same aspect ratio as that of the display device connected to the digital camera 101 based on the display-image data stored in the image file stored after the image file storing the image data being currently reproduced (S1706) and then outputs the display-image data to the display device (S1707).

With the aforementioned structure, it is possible to display, on various display devices having different aspect ratios, image data suitable for the display devices at relatively higher speeds, only by preliminarily storing single display-image data.

4. Fourth Embodiment

Hereinafter, with reference to the drawings, there will be described the fourth embodiment where the concept of the present invention is applied to a digital camera. The matters which will not be particularly described have the same structures as those of the first embodiment.

4-1. Recording Operation (Panorama Mode)

Figure 53:
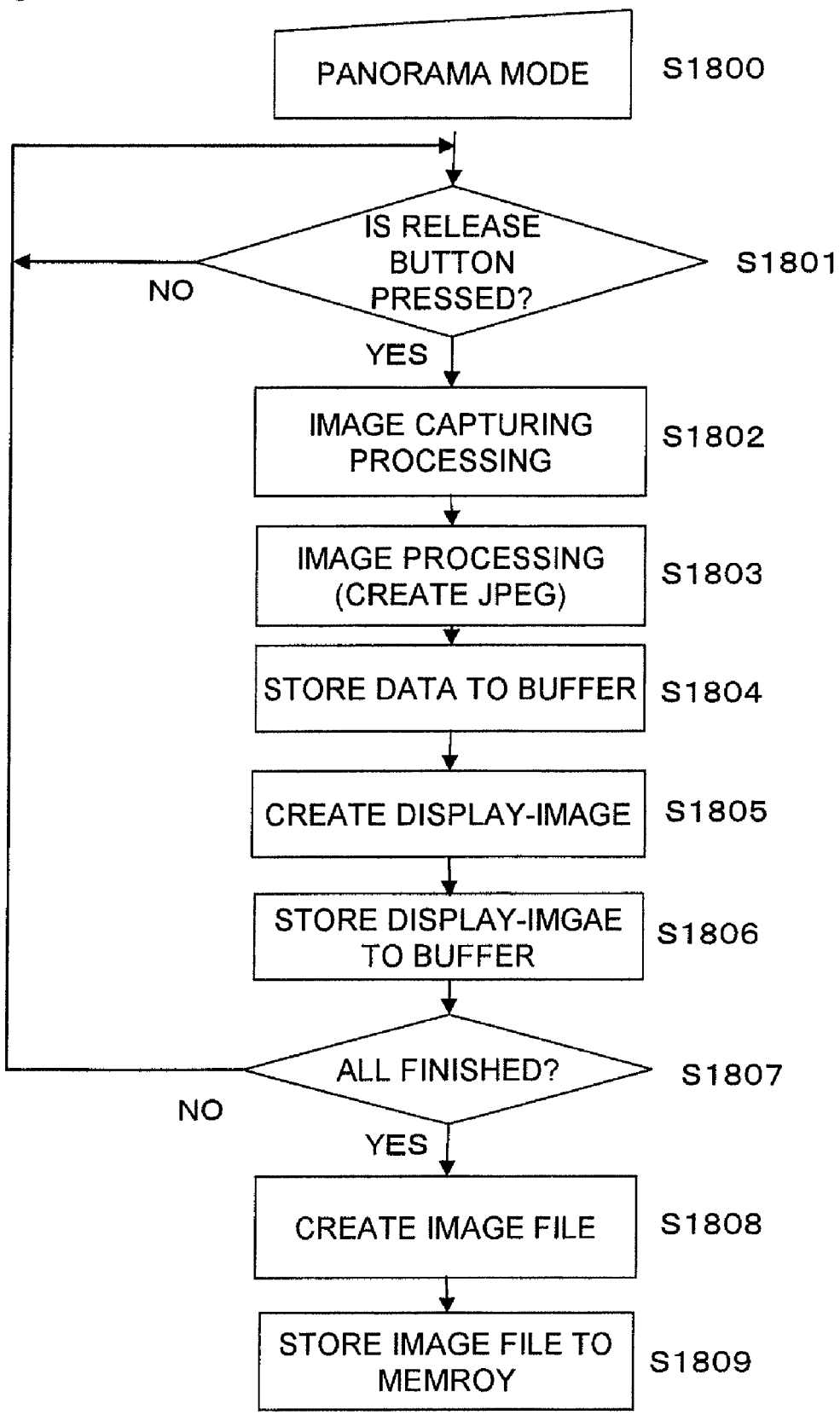
FIG. 53 is a flow chart of a recording operation in a panorama shooting mode.

A digital camera according to the fourth embodiment of the present invention stores image data captured in the panorama shooting mode in a memory card or an internal memory. Further, in the panorama shooting mode, settings is preliminarily made as to how many image data should be captured and the direction (left or right) from which the capturing image data should be started. With reference to FIG. 53, a recording operation according to the present embodiment will be described. FIG. 53 is a flow chart of an operation for recording image data with the digital camera according to the present embodiment.

The user can set the digital camera 101 to the panorama shooting mode by operating the operation unit 170. If the digital camera 101 is set to the panorama shooting mode (S1800), the controller 150 is on standby until the release button 171 is completely pressed (S1801). If the release button 171 is completely pressed, the CCD image sensor 141 performs an image capturing operation (S1802). After the image capturing operation is performed, the image processor 160 performs image processing such as compression processing to create JPEG image data (S1803). The controller 150 stores the created JPEG image data in the buffer memory 115 (S1804). After storing the JPEG image data in the buffer memory 115, the controller 150 creates display-image data based on this JPEG image data (S1805). After creating the display-image data, the controller 150 stores the created display-image data in the buffer memory 115 (S1806).

After storing the display-image data in the buffer memory 115, the controller 150 determines whether or not all pieces of image data of which number of pieces is preliminary set are captured in the panorama shooting mode (S1807).

If all pieces of image data of which number of pieces is preliminary set have been captured, the controller 150 combines all pieces of image data stored in the buffer memory 115 together to create one image file (S1808). The controller 150 stores the created image file in the memory card 108 or the internal memory 109 (S1809).

If all pieces of image data of which number of pieces is preliminary set have not been captured, the controller 150 returns the control to the step S1801 where it is on standby until the release button 171 is completely pressed. Thereafter, the same processing as the aforementioned processing is repeated until the preliminary set number of pieces of image data are captured.

With the aforementioned arrangement, it is possible to store, in one image file, plural pieces of image data which have been captured in the panorama shooting mode and are closely related to each other. By storing them in one image file, it is possible to easily handle respective image data closely related to each other.

4-2. Reproduction Operation (Panorama Mode)

Figure 54:
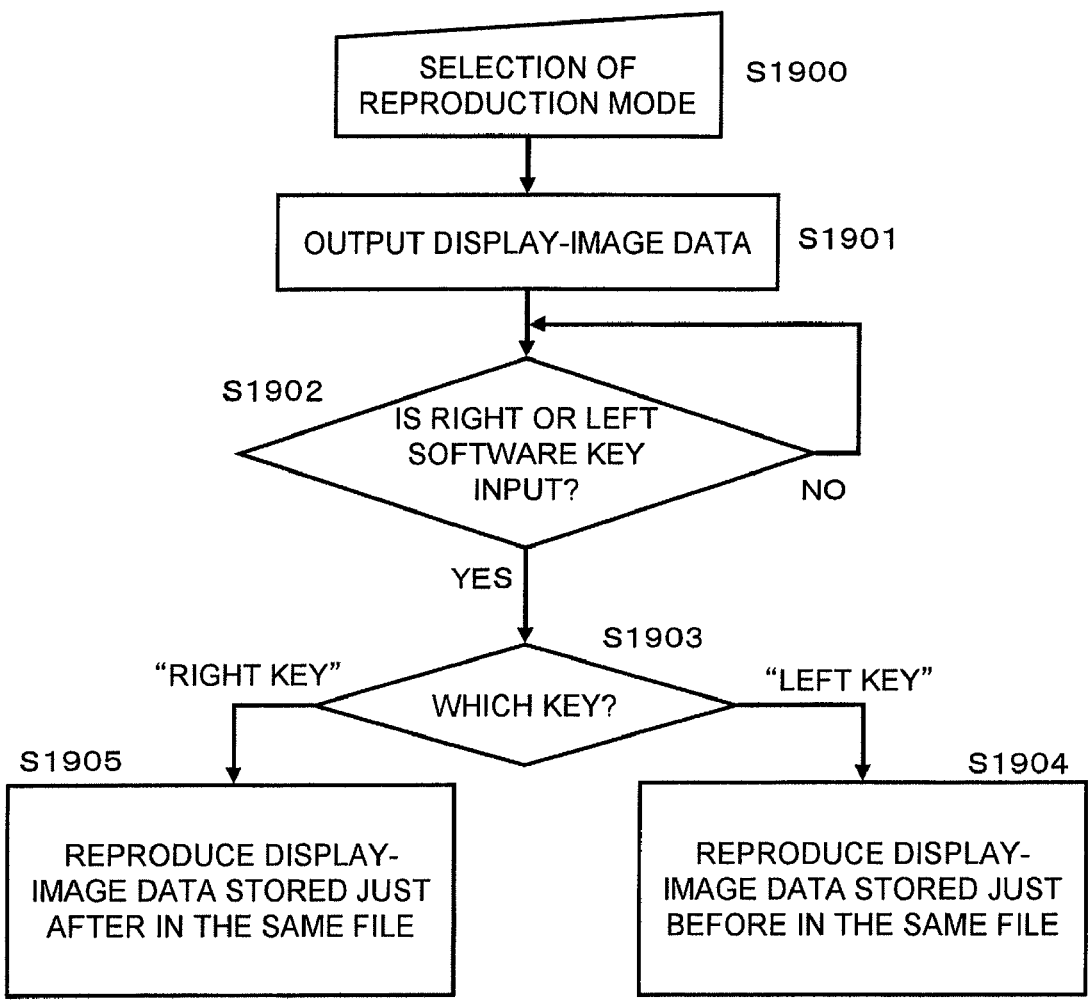
FIG. 54 is a flow chart of an operation for reproducing a panorama image file.
Figure 55:
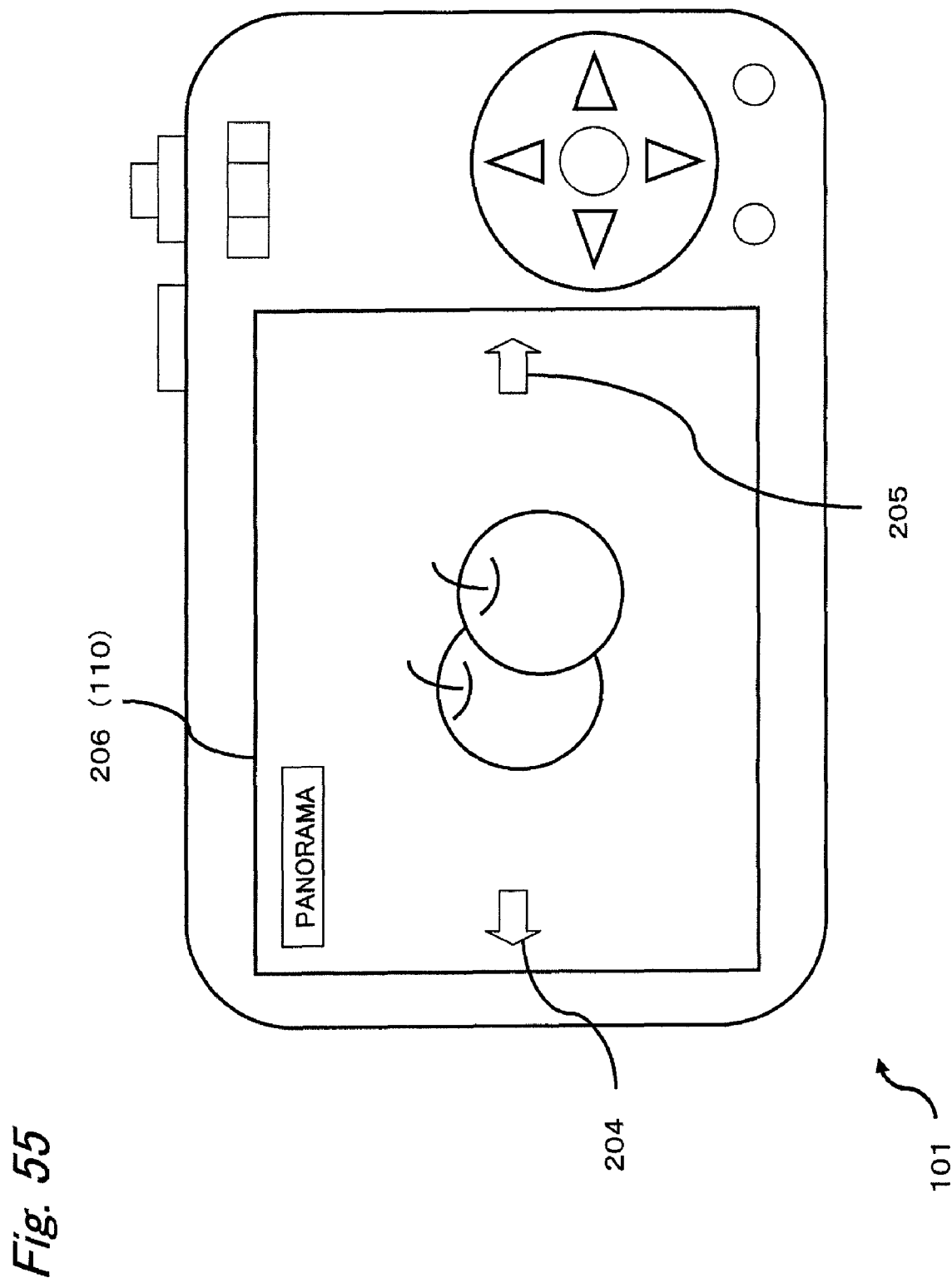
FIG. 55 is a schematic view of a screen display during reproducing a panorama image file.

With reference to FIG. 54 and FIG. 55, there will be described a reproduction operation according to the present embodiment. FIG. 54 is a flow chart of an operation for reproducing image data with the digital camera according to the present embodiment. FIG. 55 is a rear view of the digital camera 101 displaying panorama image data on a touch panel therein. Further, as illustrated in FIG. 55, the digital camera according to the present embodiment is provided with a touch panel 206 on the LCD monitor 110 on its back. The touch panel has the function of recognizing a portion of the touch panel which is pressed when the portion is pressed with a finger or a pen and transferring information about the pressed portion to the controller 150. Further, a left key 204 and a right key 205 illustrated in FIG. 55 are software keys. When these software keys are pressed with a pen or a finger, the controller 150 can acquire information about that the portion is pressed from the touch panel 206 and can perform various types of information processing based on the information.

The user can set the digital camera 101 to the reproduction mode by operating the operation unit 170. If the digital camera 101 is set to the reproduction mode (S1900), the touch panel 206 provided on the LCD monitor 110 displays the image data which is selected during the previous reproduction operation (S1900). When the image data is displayed, the controller 150 is on standby until the left or right software key is input (S1902).

If either one of the left and right software keys is input, the controller 150 determines which software key is input (S1903).

If it is determined that the left software key is input, the touch panel 206 reproduces the image data previously stored in the same file (S1904). If there is no image data previously stored therein, the image data being currently displayed is displayed.

If it is determined that the right software key is input, the touch panel 206 reproduces the image data stored after the image data being currently reproduced in the same file (S1905). If there is no image data subsequently stored therein, the image data being currently displayed is displayed.

As described above, in the present embodiment, during reproduction of panorama image data, frame advance is performed on image data continuous leftward and rightward scenically in the same image file, depending on which the input software key, that is, the left key or the right key. This permits realizing frame advance operation for image data which meets human feelings.

Further, in the present embodiment, frame advance is performed on image data in the same image file by pressing the software keys. This can make operations for frame advance among image files captured in the panorama shooting mode accord to operations (operations on the cursor key 180) for image files captured in the other shooting modes.

4-3. Resizing (Panorama Mode)

Next, there will be described resizing of image files created in the panorama shooting mode. In an image file captured in the panorama shooting mode, the original image data should be resized along with resizing of the main image data.

Regarding image data captured in a specific mode, such as the continuous shooting mode, which produces plural pieces of image data each of which is independent, it is not problem to resize each piece of image data in different way. However, regarding an image file created in the panorama shooting mode, if the resizing is not performed in the same way on the respective image data, there is a problem in that panorama image can not be created.

Accordingly, regarding the image file captured in the panorama shooting mode, when the main image data is resized, the other original image data is also resized along with the main image data. This can avoid a situation where in a file storing panorama image data, the pixel count of each piece of image data is different. Further, the user can collectively perform resizing processing, without performing individual resizing processing on respective image data.

5. Fifth Embodiment

Hereinafter, with reference to the drawings, there will be described the fifth embodiment where the concept of the present invention is applied to a digital camera. The matters which will not be particularly described have the same structures as those of the first embodiment.

5-1. Recording Operation (Auto Bracket Mode)

A digital camera according to the fifth embodiment of the present invention stores image data captured in the auto bracket mode in a memory card or an internal memory. In the auto bracket mode, a specified number of pieces of image data to be captured and specified EV value during the capturing of image data are preliminary set. During actually capturing of images, the specified number of pieces of image data are captured with the preliminary set EV value.

Figure 56:
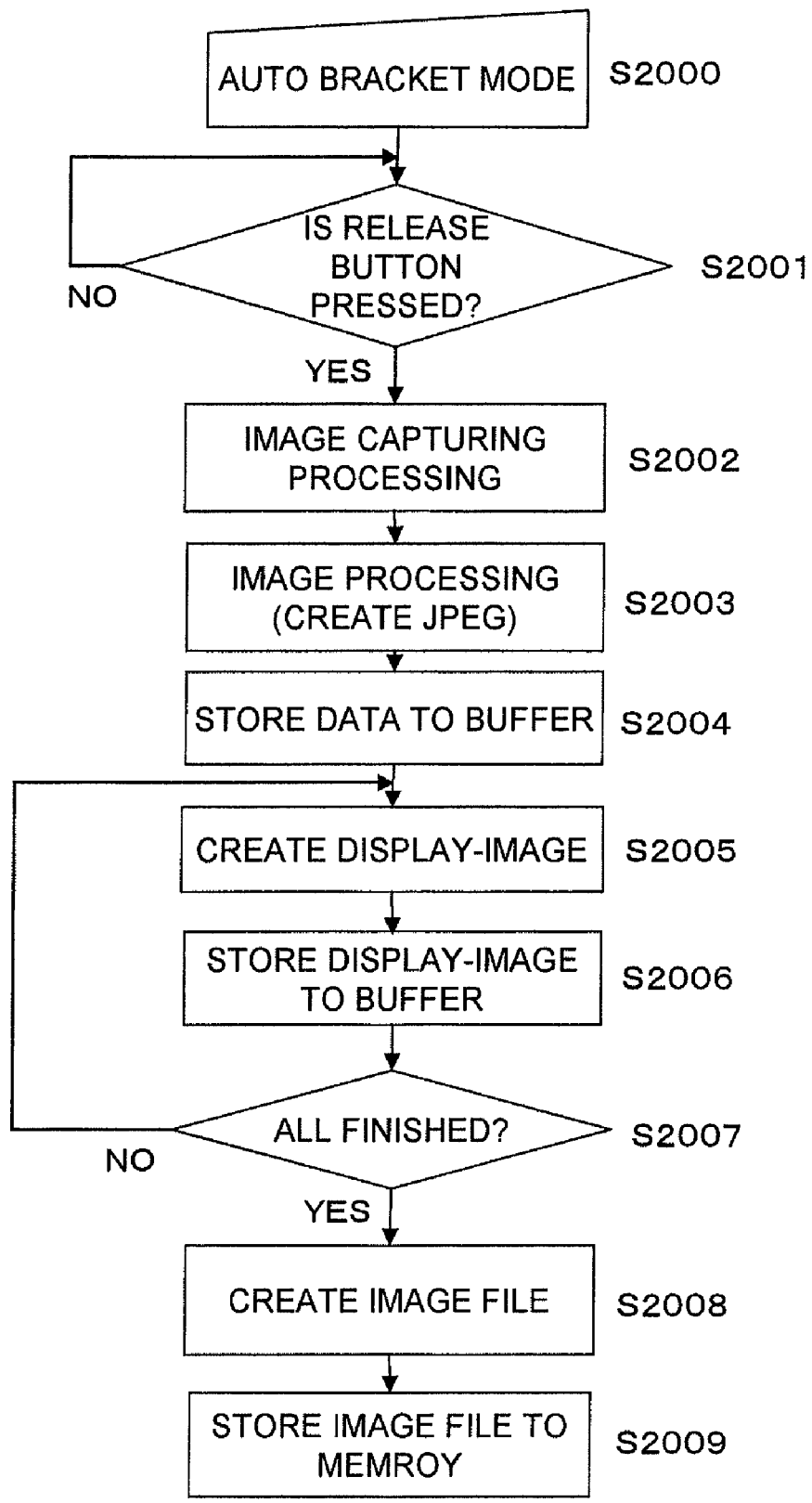
FIG. 56 is a flow chart of a recording operation in an auto bracket mode.

With reference to FIG. 56, there will be described a recording operation according to the present embodiment. FIG. 56 is a flow chart of an operation for recording image data with the digital camera according to the present embodiment.

The user can set the digital camera 101 to the auto bracket mode by operating the operation unit 170. When the digital camera 101 is set to the auto bracket mode (S2000), the controller 150 is on standby until the release button 171 is pressed (S2001). If the release button 171 is pressed, the C=D image sensor 141 performs an image capturing operation (S2002). After the image capturing operation, the image processor 160 performs image processing such as compression processing to create JPEG image data (S2003). The controller 150 stores the created JPEG image data in the buffer memory 115 (S2004). Thereafter, the controller 150 creates display-image data based on the JPEG image data (S2005) and stores the created display-image data in the buffer memory 115 (S2006).

After storing the display-image data in the buffer memory 115, the controller 150 determines whether or not the specified number of pieces of image data each having the specified EV value have been captured in the auto bracket mode (S2007).

If the specified number of pieces of image data with the specified EV value have been captured, the controller 150 combines all pieces of the image data stored in the buffer memory 115 together to create one image file (S2008). The controller 150 stores the created image file in the memory card 108 or the internal memory 109 (S2009).

On the other hand, if all pieces of image data with the specified EV value have not been captured, the CCD image sensor 141 returns to the step S2002 so as to capture an image subsequently. Then, the aforementioned processing is repeated until all pieces of image data with the specified EV value are captured (S2002 to S2007).

With the aforementioned arrangement, it is possible to store, in one image file, plural pieces of image data which have been captured in the auto bracket mode and are closely related to each other. By storing them in one image file, it is possible to easily handle respective image data closely related to each other.

In the present embodiment, display-image data is created every time image data with each EV value is captured. However, it is not necessarily required to employ this arrangement. When all pieces of image data with the respective EV values are captured, display-image data corresponding to the respective image data may be created.

5-2. Reproduction Operation (Auto Bracket Mode)

Figure 57:
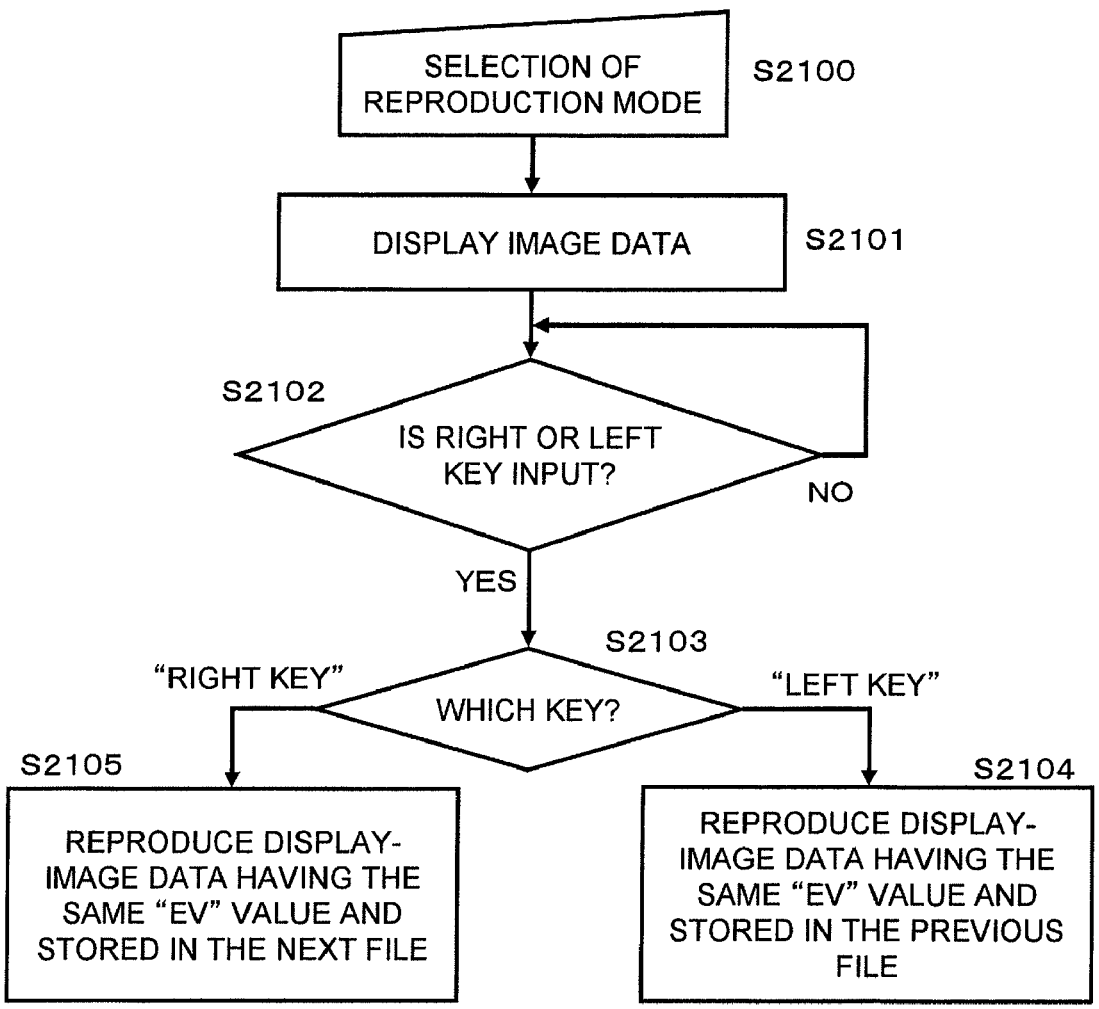
FIG. 57 is a flow chart of an operation for reproducing an auto bracket image file.
Figure 58:
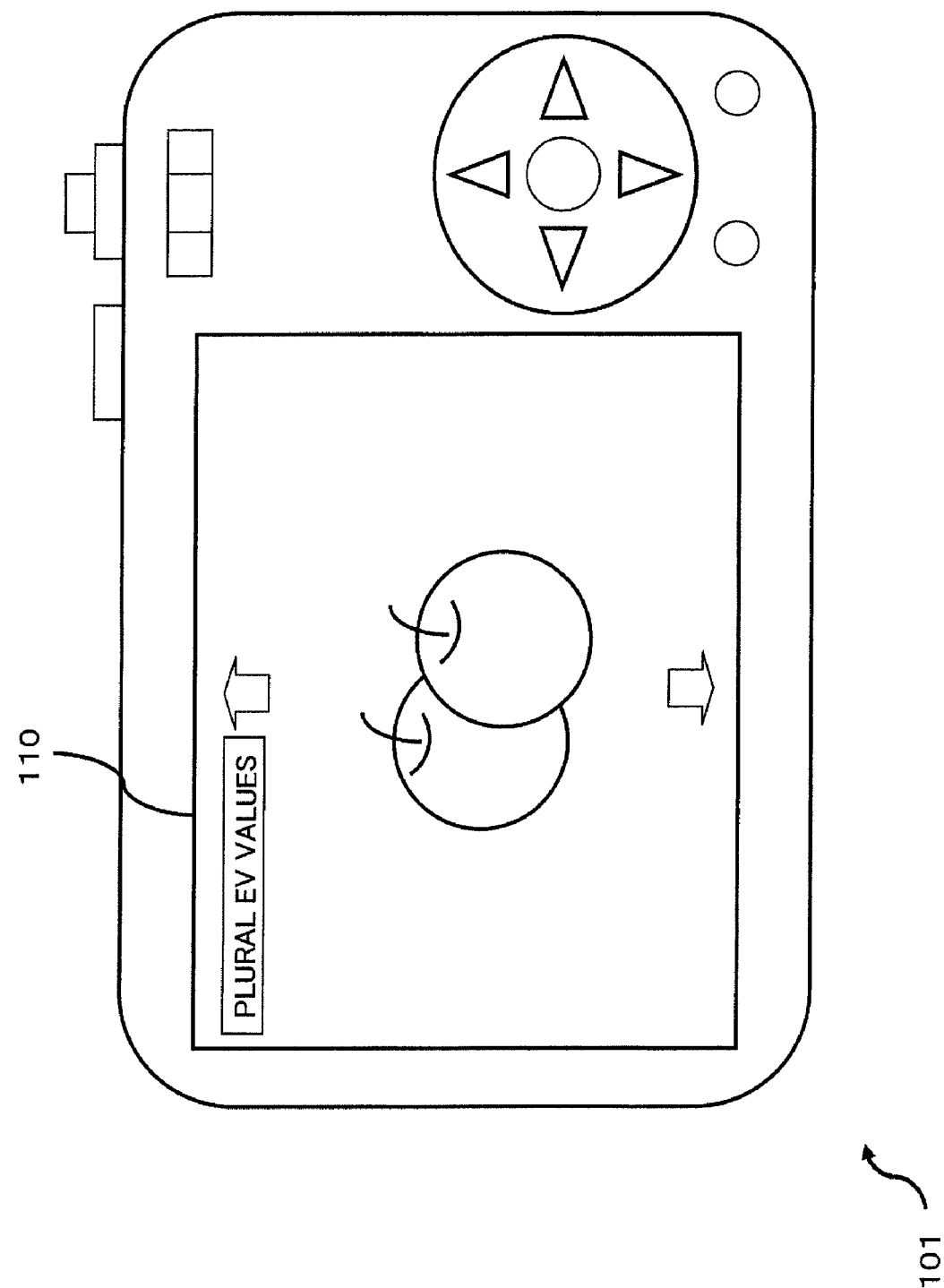
FIG. 58 is a schematic view of a screen display during reproducing an auto bracket image file.

With reference to FIG. 57 and FIG. 58, there will be described a reproduction operation according to the present embodiment. FIG. 57 is a flow chart of an operation for reproducing image data with the digital camera according to the present embodiment. FIG. 58 is a rear view illustrating the digital camera 101 displaying, on the LCD monitor 110, image data captured in the auto bracket mode.

The user can set the digital camera 101 to the reproduction mode by operating the mode dial 174. When the digital camera 101 is set to the reproduction mode (S2100), the LCD monitor 110 displays image data which is reproduced during the previous reproduction (S2101). When the image data is displayed, the controller 150 is on standby until either one of the left key and right key is input (S2102).

When any one of the left key and right key is input, the controller 150 determines whether or not the left key is input (S2103).

If it is determined that the left key is input, the LCD monitor 110 reproduces image data which has the same EV value as that of the image data being currently reproduced and is stored in the image file stored before the image file being reproduced (S2104). If there is no image data having the same EV value in the previously stored image file, any of image data stored in the previously stored image file is reproduced.

If it is determined that the right key is input, the LCD monitor 110 reproduces image data which has the same EV value as that of the image data being currently reproduced and is stored in the image file stored after the image file being reproduced (S2105). If there is no image data having the same EV value in the subsequently stored image file, any of image data stored in the subsequently stored image file is reproduced.

As described above, in the present embodiment, frame advance is performed on image data having the same EV value in image data stored in plural image files, according to the input of the left and right keys, during reproducing image data captured in the auto bracket mode. This permits frame advance of only image data with the same EV value so that the usability for the user can be improved when the user has preferred EV value.

6. Sixth Embodiment

Hereinafter, with reference to the drawings, there will be described the sixth embodiment where the concept of the present invention is applied to a digital camera. The matters which will not be particularly described have the same structures as those of the first embodiment.

6-1. Editing

Figure 32:
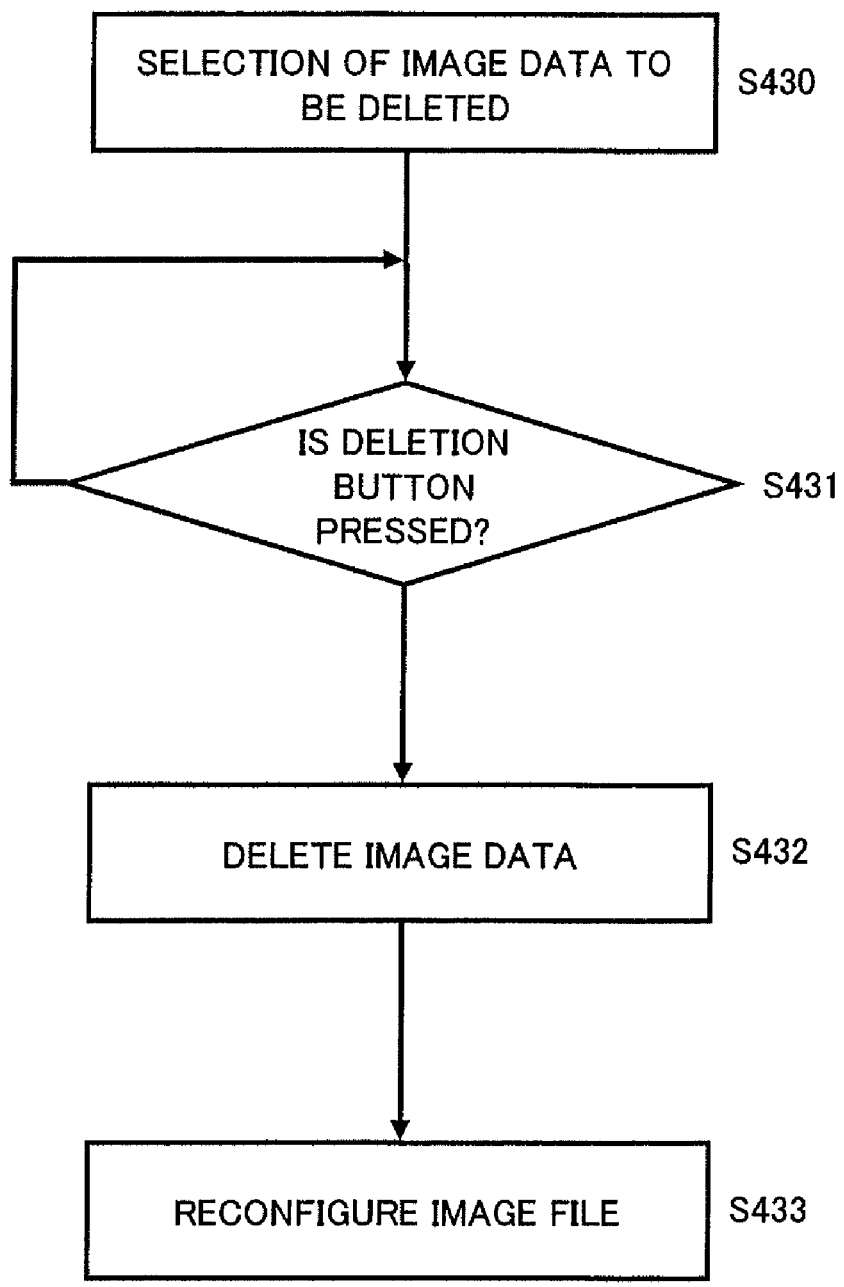
FIG. 32 is a flow chart illustrating an operation for deleting image data.
Figure 33:
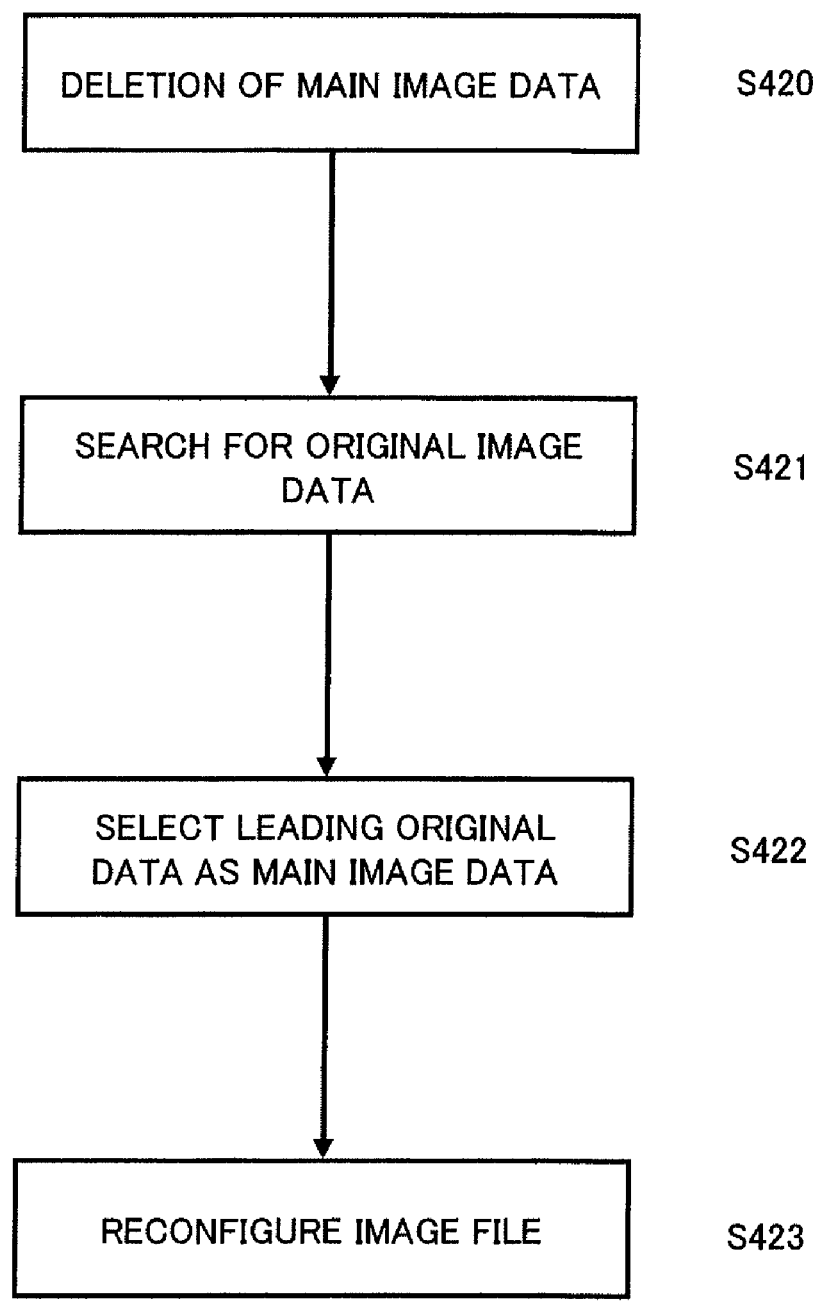
FIG. 33 is a flow chart illustrating an operation for deleting image data.

With reference to FIG. 32 and FIG. 33, there will be described editing of image data with the digital camera 101 according to the sixth embodiment of the present invention. FIG. 32 is a flow chart illustrating operations of the digital camera 101 when image data is deleted from a multiple image file, according to the present embodiment. FIG. 33 is a flow chart illustrating operations of the digital camera 101 when main image data is deleted from a multiple image file.

6-1-1. Deletion of Image Data

With reference to FIG. 32, there will be described operations of the digital camera 101 when image data is deleted from a multiple image file.

The user can select image data to be deleted by operating the cursor key 180 during the image-data reproduction mode of the digital camera 101.

If image data to be deleted is selected (S430), the controller 150 is on standby until the deletion button 186 is pressed (S431). If the deletion button 186 is pressed, the controller 150 deletes the image data selected by the user (S432). More specifically, the controller 150 accesses the memory card 108 or the internal memory 109 and deletes information about the selected image data from the management table contained in the image file storing the selected image data. The deletion of image data may be achieved by physically and completely erasing information about the image data to be deleted from a memory. Alternatively, the deletion of image data may be achieved by logically erasing the image data by releasing the address in the memory at which information about the image data to be deleted is stored so that the address is rewritable.

After deletion of the image data selected by the user, the controller 150 restructures the FAT and logically reconfigures the image file (S433).

Namely, in the present embodiment, even if main image data or original image data is deleted, the corresponding display image is not automatically deleted. Further, even if display-image data is deleted, the corresponding main image data or original image data is not automatically deleted.

6-1-2. Control Upon Deletion of Main Image Data

With reference to FIG. 33, there will be described operations of the digital camera 101 when main image data is deleted, according to the present embodiment.

The user can select and delete main image data. Namely, the user can delete all or some pieces of image data contained in image files stored in a storage medium by selecting image data to be deleted. In this case, an image file refers to a file capable of storing main image data, original image data, and display-image data, as image data, in a predetermined order. Further, the storage medium may be the internal memory 109 incorporated in the digital camera 101 or the memory card 108 which can be attached and detached to and from the digital camera 101.

More specifically, the controller 150 accesses the memory card 108 or the internal memory 109, and deletes, from the management table, information about the main image data selected by the user. The deletion of image data may be achieved by physically and completely erasing information about the image data to be deleted from a memory. Alternatively, the deletion of image data may be achieved by logically erasing the image data by releasing the address in the memory at which information about the image data to be deleted is stored so that the address is rewritable.

In this case, the main image data is image data that is stored at a position closest to the file head among the image data stored in an image file. Further, the original image data is image data having a pixel count equal to that of the main image data. Further, the display-image data is image data which has a pixel count smaller than that of the main image data or original image data, is created based on the main image data or the original image data, and is stored after the main image data or original image data which are the basis of the display-image data.

After deletion of the main image data (S420), the controller 150 searches for original image data stored in the image file which stored the deleted main image data (S421).

After starting the search, the controller 150 performs the search in the order from the file head, and selects, as new main image data, original image data stored at a position closest to the file head in the original image data (S422). Namely, when main image data stored in an image file is deleted, the controller 150 selects, as new main image data, original image data stored at a position closest to the file head in the original image data stored in the image file.

The controller 150 reconfigures an image file containing the selected original image data as main image data (S423). More specifically, the controller 150 stores the new main image data selected by the selection unit at the head position in an image file and reconfigures the image file.

In the present embodiment, when main image data is deleted, original image data stored at a position closest to the file head is selected as main image data. This can prevent display-image data from being set as main image data, when main image data is deleted. Accordingly, a situation is avoided, in which clear print images can not be created because of smaller pixel counts, even though main image data is printed with a printer.

7. Other Embodiments

There have been described the first to sixth embodiments, as embodiments of the present invention. However, the present invention is not limited to these embodiments. Other embodiments of the present invention will be described, hereinafter.

The optical system and the driving system in the digital camera to which the present invention is applied are not limited to those illustrated in FIG. 1. For example, although an optical system having a four lens group structure is illustrated in FIG. 1, it is also possible to employ a different lens structure. Further, although the zoom lens 122 is illustrated as a component of the optical system in FIG. 1, the zoom lens may be omitted and the optical system with a single focus point may be provided. Further, the OIS unit 124 is not an essential component. Further, each lens can be constituted by a single lens or a lens group constituted by plural lenses. Also, the zoom motor 132 and the focus motor 135 can share a single motor.

Although, in the first to sixth embodiments, the CCD image sensor 141 is exemplified as an imaging device, the imaging device is not limited thereto. For example, the imaging device can be constituted by a CMOS image sensor or an NMOS image sensor.

The image processor 160 and the controller 150 can be constituted by a single semiconductor chip or different semiconductor chips.

Although, in the first to sixth embodiments, the LCD monitor 110 is exemplified as the display unit, the present invention is not limited to this. For example, the display unit can be realized by an organic electroluminescence display or an inorganic electroluminescence display.

Although, in the first to sixth embodiments, display-image data are created based on main image data or original image data which are in the JPEG format, the present invention is not limited to this. For example, display-image data can be created based on YC data or RAW data which is the basis of main image data or original image data. This arrangement makes it possible to create display-image data during the creation processing of main image data or original image data, thereby simplifying the creation processing. Namely, display-image data can be created based on main image data or image data which is the basis of the main image data, or based on original image data or image data which is the basis of the original image data.

INDUSTRIAL APPLICABILITY

The present invention provides an apparatus and method for performing processing on image files containing image data other than thumbnail image data, in addition to or instead of thumbnail image data. Accordingly, the present invention is applicable to an apparatus for processing images. For example, the present invention can be applied to digital still cameras, digital video cameras, cellular phones equipped with camera functions, and the like.

Although the present invention has been described with respect to specific embodiments, other various changes, modifications and other applications will be apparent to those skilled in the art. Therefore, the scope of the present invention is not limited to these specific disclosures but can be defined by only the appended claims. Further, the present application is related to Japanese patent application Nos. 2007-301519 (filed on Nov. 21, 2007), 2007-301520 (filed on Nov. 21, 2007) and 2008-071023 (filed on Mar. 19, 2008), the contents of which are incorporated herein by reference.

What is claimed is:

1. An image file reproduction apparatus comprising:
a reproduction unit that reads an image file from a storage medium storing at least one image file capable of storing plural pieces of image data and reproduces the read image file;
a first operation unit that receives a command for selecting any one of image files stored in the storage medium; and
a second operation unit that receives a command for selecting any one of image data stored in the image file stored in the storage medium;
wherein
if the first operation unit receives a command, the reproduction unit reproduces predetermined image data stored in the image file selected by the command, and
if the second operation unit receives a command, the reproduction unit reproduces image data selected by the command received by the second operation unit, among the image data stored in the image file selected by the command received by the first operation unit.

2. The image data reproduction apparatus according to claim 1, wherein the image file capable of storing plural pieces of image data is a second image file that stores main image data and image data having a pixel count equal to that of the main image data,
the storage medium can store a first image file that stores main image data and image data having a pixel count not equal to that of the main image data,
when the second operation unit receives the command,
if the reproduction unit is reproducing image data stored in the first image file, the reproduction unit reproduces image data stored in an image file different from the image file storing image data being currently reproduced, and
if the reproduction unit is reproducing image data stored in the second image file, the reproduction unit reproduces image data which is different from the image data being currently reproduced and is stored in the image file storing the image data being currently reproduced.

3. The image data reproduction apparatus according to claim 2, wherein when the reproduction unit is reproducing image data stored in the second image file and there is no image data to be reproduced next as instructed by the frame advance command in the image file storing the image data being currently reproduced, the reproduction unit reproduces image data stored in an image file different from the image file storing the image data being currently reproduced.

4. The image data reproduction apparatus according to claim 1, wherein the image file capable of storing plural pieces of image data stores plural pieces of image data each having different feature, and
the reproduction unit comprises
a determination unit that determines whether or not the different image file stores image data having the same feature as that of the image data being currently reproduced, based on information stored in the header of the different image file, and
a decision unit that decides image data to be reproduced by the reproduction unit from the image data stored in the different image file based on the result of the determination by the determination unit, when the first operation unit receives a command.

* * * * *